United States Patent
Chen et al.

(10) Patent No.: US 9,274,974 B1
(45) Date of Patent: Mar. 1, 2016

(54) ISOLATING DATA WITHIN A COMPUTER SYSTEM USING PRIVATE SHADOW MAPPINGS

(75) Inventors: Xiaoxin Chen, Cupertino, CA (US); Carl A. Waldspurger, Palo Alto, CA (US); Pratap Subrahmanyam, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1376 days.

(21) Appl. No.: 11/584,178

(22) Filed: Oct. 20, 2006

Related U.S. Application Data

(60) Provisional application No. 60/729,185, filed on Oct. 21, 2005.

(51) Int. Cl.
    G06F 12/10 (2006.01)

(52) U.S. Cl.
    CPC .......... *G06F 12/109* (2013.01); *G06F 12/1036* (2013.01)

(58) Field of Classification Search
    CPC .......................... G06F 12/109; G06F 12/1036
    See application file for complete search history.

(56) References Cited

U.S. PATENT DOCUMENTS

| | | | |
|---|---|---|---|
| 4,787,031 A * | 11/1988 | Karger et al. | 718/100 |
| 5,230,069 A * | 7/1993 | Brelsford et al. | 718/100 |
| 5,555,385 A * | 9/1996 | Osisek | 711/1 |
| 6,055,617 A * | 4/2000 | Kingsbury | 711/203 |
| 7,111,145 B1 | 9/2006 | Chen et al. | |
| 7,761,706 B2 | 7/2010 | Lambert | |
| 8,132,003 B2 | 3/2012 | Durham et al. | |
| 8,140,820 B2 | 3/2012 | Mansell et al. | |
| 2004/0083481 A1 | 4/2004 | Shultz et al. | |
| 2005/0273783 A1 | 12/2005 | Tankov et al. | |
| 2007/0005992 A1 | 1/2007 | Schluessler et al. | |
| 2008/0077767 A1 | 3/2008 | Khosravi et al. | |
| 2008/0133875 A1 | 6/2008 | Cohen et al. | |
| 2008/0155168 A1 | 6/2008 | Sheu et al. | |
| 2009/0038017 A1 | 2/2009 | Durham et al. | |
| 2009/0113111 A1 | 4/2009 | Chen et al. | |
| 2009/0113216 A1 | 4/2009 | Chen et al. | |
| 2009/0113424 A1 | 4/2009 | Chen et al. | |
| 2009/0113425 A1 | 4/2009 | Ports et al. | |

* cited by examiner

Primary Examiner — Gary W Cygiel

(57) ABSTRACT

Virtualization software establishes multiple execution environments within a virtual machine, wherein software modules executing in one environment cannot access private memory of another environment. A separate set of shadow memory address mappings is maintained for each execution environment. For example, a separate shadow page table may be maintained for each execution environment. The virtualization software ensures that the shadow address mappings for one execution environment do not map to the physical memory pages that contain the private code or data of another execution environment. When execution switches from one execution environment to another, the virtualization software activates the shadow address mappings for the new execution environment. A similar approach, using separate mappings, may also be used to prevent software modules in one execution environment from accessing the private disk space or other secondary storage of another execution environment.

20 Claims, 20 Drawing Sheets

ISOLATING DATA WITHIN A COMPUTER SYSTEM USING PRIVATE SHADOW MAPPINGS

CROSS-REFERENCE TO RELATED APPLICATION(S)

This application claims benefit under 35 U.S.C. §119(e) of U.S. Provisional Application No. 60/729,185, filed 21 Oct. 2005.

BACKGROUND OF THE INVENTION

1. Field of the Invention

This invention relates to isolating the code and/or data of one or more software modules within a computer system.

2. Description of the Related Art

The invention may be implemented as one or more computer programs or as one or more computer program modules embodied in one or more computer readable media. The computer readable media may be based on any existing or subsequently developed technology for embodying computer programs in a manner that enables them to be read by a computer. For example, the computer readable media may comprise one or more CDs (Compact Discs), one or more DVDs (Digital Versatile Discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the invention by the customer.

This invention may be implemented in a wide variety of computer systems, having a wide variety of hardware platforms and configurations and a wide variety of software platforms and configurations. If a computer system includes multiple software entities or software modules, or at least has the potential to contain multiple software modules, then the integrity of the computer system may be improved by implementing this invention to protect the code and/or data of one or more of the software modules from other software modules in the system.

Over the years, a variety of techniques have been used for executing multiple software modules within a computer system. Early computer systems could execute multiple software programs, but they could only execute one program at a time. Such computers might load one program into memory and execute it to completion or other termination, before proceeding to a subsequent program that would then be loaded into memory and executed. As another example, various multitasking operating systems (OSs) enable multiple programs (or selected portions thereof) to be loaded into memory at one time and executed in an alternating manner, according to a scheduling algorithm. Also, some processors include multithreading capabilities, which enable multiple threads of one or more programs to be executed simultaneously on a single processor. Finally, multiprocessor computer systems have also become commonplace, in which each of multiple processors can execute one or more threads all at the same time. This invention may be advantageously implemented in any of these types of systems, as well as other possible computer systems in which multiple software modules may be executed.

Such computer systems generally attempt to isolate the code and data of the different software modules within the computer system from each other, so that, for example, one software module cannot interfere with the execution of another software module by altering its code or data. Such isolation may be provided for code and/or data that is stored on a hard drive (or other secondary data storage means) and/or that is resident in main memory (or other primary data storage means). In this patent, the term "data" is generally used in a broad sense, to include data that is operated on by the instructions (code) of a software module as well as the contents of a stack and any other possible forms of data that are associated with a software module. As one example of the isolation of code and data, many systems implement a virtual addressing mechanism, in which different software modules within the system have different virtual address spaces, with each virtual address space generally being mapped to different portions of the physical address space of the computer system, so that the virtual addresses of a given software module are generally only mapped to physical addresses that contain the code or data of that particular software module. Virtual addressing mechanisms are described in greater detail below. A given software module may attempt to access every memory location in its own virtual address space, accessing every memory location to which it has access, and it will still only be able to access its own code and data (assuming that there is no shared memory). Thus, providing a virtual addressing mechanism provides some isolation between the code and data of multiple software modules in a computer system. Various other protection mechanisms may also be implemented in such computer systems to isolate the code and/or data of multiple software modules from one another.

Although the invention may be implemented in a wide variety of computer systems, having a wide variety of hardware and software platforms and configurations, the following description is generally limited to a single hardware platform for brevity. In particular, this description is generally limited to computer systems that include one or more processors having the "x86" architecture, which is described in the IA-32 Intel Architecture Software Developer's Manual ("the IA-32 Manual") from Intel Corporation. Also for brevity, the following description is generally limited to computer systems running a Windows OS from Microsoft Corp. or a Linux OS, although there are certainly other OSs that operate on the x86 platform. A Windows OS from Microsoft Corp. may be a Windows XP OS or a Windows 2000 OS, for example, while a Linux OS may be a distribution from Novell, Inc. (SUSE Linux), Mandrakesoft S.A. or Red Hat, Inc. Based on the following description related to the x86 architecture and a Windows or Linux OS, a person of skill in the art will be able to implement the invention in a wide variety of other computer systems.

The x86 architecture provides two primary memory protection mechanisms that may be used by an OS (or other system software) to try to isolate the code and data of multiple tasks or processes that execute on the processor, namely a segmentation mechanism and a paging mechanism. The IA-32 Manual may be consulted for a detailed description of these protection mechanisms. The Windows and Linux OSs use the paging mechanism, but they generally don't take advantage of the segmentation mechanism. Instead, these OSs define segments that include the entire addressable range of the processor, so that the segmentation protection mechanism becomes ineffective in providing isolation between the code and data of multiple tasks. Thus, for simplicity, this discussion focuses on the paging mechanism of the x86 processor, which implements a virtual addressing mechanism as described briefly above and in greater detail below.

Very briefly for now, for Windows and Linux OSs, different user processes are generally given different virtual address spaces. The OS creates a different set of page tables (and a page directory) for each virtual address space, which maps the respective virtual addresses to physical addresses. Thus, the page tables for a given user process map that process's virtual addresses to the physical addresses that contain the code and data for that process. The page tables for the user processes also contain mappings for code and data of the OS, but the user processes cannot use these mappings because the user processes are executed at a Current Privilege Level (CPL) of 3 and these mappings are set to require a supervisor privilege level (a CPL of 0, 1 or 2). Otherwise, the page tables for a given user process generally only contain mappings to physical memory pages that contain that process's code and data. Therefore, a user process can generally only access its own code and data. Executing the user processes at a CPL of 3, also prevents the processes from modifying their own page tables. Otherwise, a process could add entries to its page tables that map to any physical address in the system, so that the process could give itself access to the code and data of other software modules, including other user processes and the OS.

Windows and Linux OSs generally provide adequate protection for the software modules in a computer system, so long as all of the software modules are well designed and well behaved, meaning that they are not attempting to circumvent the protection mechanism. Thus, many processes may be running concurrently in such a computer system, with the OS giving each process a share of the system resources, including processor time, memory space and hard disk space, without any of the processes interfering with the code or data of the other processes.

FIG. 1 illustrates a simple computer system 2A having multiple software modules. The computer system 2A includes system hardware 100A, an OS 20A, a first application 40A and a second application 40B. The system hardware 100A may be conventional hardware based on, for example, the x86 platform, and the OS 20A may be, for example, a Windows OS or a Linux OS. The applications 40A and 40B may be any applications designed to run on the system hardware 100A and the OS 20A. The OS 20A also includes a set of drivers 29A, which may be conventional drivers for the OS 20A, possibly including one or more drivers from a company that is different from the OS vendor (a third party vendor).

The OS 20A, in conjunction with the system hardware 100A, attempts to isolate the code and data of the applications 40A and 40B from one another. For example, the OS 20A and the system hardware 100A may implement a virtual addressing mechanism, as described above. As illustrated in FIG. 1, implementing such a protection mechanism may be characterized as establishing an isolation barrier 80B between the applications 40A and 40B, preventing (or at least hindering) one application from accessing the code and data of the other application. There may also be some code and/or data that is shared explicitly or transparently between the applications 40A and 40B. Techniques are known for allowing such sharing of code and data, while maintaining isolation between the applications 40A and 40B. For example, the OS 20A may mark physical memory pages that contain shared code or data as read only, such as when using a copy-on-write (COW) technique. The isolation barrier 80B may be referred to as an "OS isolation barrier" because it is implemented by the OS 20A, in conjunction with the system hardware 100A. The OS 20A, again in conjunction with the system hardware 100A, also establishes an OS isolation barrier 80A between the OS 20A and all applications in the system, including the applications 40A and 40B, so that the applications are prevented (or hindered) from directly accessing the code and data of the OS 20A. In the case of a Windows or Linux OS running on an x86 platform, the OS isolation barrier 80A is established by executing the applications in the system at a CPL of 3 and requiring a supervisor privilege level to access memory pages containing the code and data of the OS 20A.

Although the Windows and Linux OSs provide adequate isolation between software modules for computer systems that contain only well designed and well behaved software modules, malicious software modules have been known to wreak havoc in such computer systems by circumventing the protection mechanisms and engaging in all sorts of mischief. In particular, such malicious software modules have been known to breach the OS isolation barriers 80B and 80A, and corrupt the code and/or data of other applications in the system, and/or of the OS itself. Numerous security vulnerabilities have been discovered in the Windows OSs and, to a lesser extent, in the Linux distributions, and many of these vulnerabilities have been exploited by hackers using different types of malicious software, such as viruses, worms, etc. Microsoft Corp. acknowledges in its '006 patent (referenced below) that "open operating systems that allow users to easily install hardware and software . . . are inherently untrustworthy" (the '006 patent, paragraph [0004]). Poorly designed or implemented software may inadvertently bypass these protection mechanisms too and may also wreak havoc in a computer system. Although the description in this patent generally relates to malicious software, it also applies to software that inadvertently has the same or similar effects as malicious software.

Thus, hackers that exploit the vulnerabilities described above do so for a variety of reasons and with a variety of goals, some being relatively benign and others being quite destructive or disruptive. As one example, a malicious software module may be written and deployed that searches for sensitive data on a computer's hard drive or in its memory and transmits any such sensitive data back to the hacker that launched the malicious code. If the malicious software manages to execute at supervisor level (with a CPL of 0, 1 or 2), which is a common occurrence, then the malicious software may access a variety of system resources that are supposed to be safeguarded. For example, the malicious software can create its own page table entries, and obtain access to any address within the physical address space of the processor. The malicious software can then scan the entire physical memory for sensitive data, including memory that contains code and data of other software modules. A wide variety of other possibilities also exist.

Security threats such as these have been gaining greater notoriety, and it is widely accepted that something should be done to improve the security of the ubiquitous personal computer, and, in particular, there is a recognized need to improve the security for the vast number of computers based on the x86 architecture. Many people believe that software changes alone will not provide adequate protection. Accordingly, many different companies are working toward solutions that involve substantial changes to both the system hardware and the system software of a computer system. Many such security measures will also require substantial changes to application level software as well. Some of the security measures that have been or are being pursued by various companies are described below.

U.S. Pat. No. 6,507,904 (Ellison et al., "Executing Isolated Mode Instructions in a Secure System Running in Privilege Rings", "the '904 patent"), which was assigned to Intel Corporation, describes a computer system in which a processor operates in either a normal execution mode or an isolated execution mode. Among other features, the computer system includes an isolated region in system memory that is protected by both the processor and a chipset of the computer system. Access to the isolated region is permitted only when using special bus cycles, referred to as isolated read and write cycles. The isolated read and write cycles may only be issued by the processor when it is executing in the isolated execution mode. Execution in the isolated execution mode is restricted, so that access to the isolated memory region is also restricted, accordingly.

U.S. Pat. No. 6,820,177 (Poisner, "Protected Configuration Space in a Protected Environment", "the '177 patent"), which was also assigned to Intel Corporation, describes a computer system in which the physical address space encompasses a protected configuration space and a non-protected configuration space. Attempts to access addresses within the protected configuration space are redirected to protected configuration hardware that is external to the system memory. This protected configuration hardware holds control values, provides control information, and performs operations pertaining to a protected operating environment. Attempts to access the protected configuration space are permitted only if they are made by a processor, and only if they are made using a "protected command." Restricting access to the protected configuration hardware purportedly enables the system to maintain a protected operating environment. The protected operating environment may include blocks of protected memory, which are apparently protected from any attempted access by non-processor devices.

U.S. Pat. No. 6,986,006 (Willman et al., "Page Granular Curtained Memory via Mapping Control", "the '006 patent"), which was assigned to Microsoft Corporation, describes a method by which access to trusted memory is restricted using a paging mechanism, by not including mapping entries in page tables that map to physical memory pages that contain the trusted memory. The memory pages that contain the page tables are then restricted to read-only access when the processor is operating in a non-trusted mode to prevent non-trusted software from adding a new mapping entry or modifying an existing mapping entry to map to trusted memory. If non-trusted software attempts to write to a memory page containing a page table, a context switch is initiated into a page table entry edit module, which is trusted software. The page table entry edit module then ensures that the attempted write does not establish a mapping into trusted memory. The '006 patent does not specifically indicate how non-trusted software is prevented from changing the memory pages containing page tables to read/write access or from corrupting or supplanting the page table entry edit module to enable the non-trusted software to establish a mapping to trusted memory. The '006 patent does indicate, however, that the memory controller or other hardware may be able to restrict access to certain pages of physical memory under the control of the page table entry edit module. A new hardware platform or substantial changes to an existing hardware platform would presumably be necessary to implement such a restriction.

U.S. Pat. No. 7,058,768 (Willman et al., "Memory Isolation Through Address Translation Data Edit Control", "the '768 patent"), which is a continuation-in-part of the '006 patent and which was also assigned to Microsoft Corporation, is similar to the '006 patent, although the '768 patent uses different terminology and it goes into greater detail in some areas. The '768 patent describes a computer system that includes a trusted environment and an untrusted environment. A trusted component in the trusted environment purportedly ensures that, when the system is executing in the untrusted environment, no active address translation map includes an address mapping that maps to isolated memory, so that the isolated memory is not accessible to untrusted components. Again, the '768 patent does not specify how the trusted environment is established or maintained, but implementing the computer system described in the '768 patent presumably requires substantial hardware changes.

U.S. Patent Application Publication No. 2004/0205203 (Peinado et al., "Enforcing Isolation Among Plural Operating Systems", "the '203 application"), which was also assigned to Microsoft Corporation, describes a method for restricting the physical addresses that are accessible to Direct Memory Access (DMA) devices in a computer system in which multiple OSs run. In this method, a security kernel maintains a DMA exclusion vector that specifies which physical addresses are accessible to different DMA devices. A hardware device, referred to as a regulator, enforces the physical address restrictions specified in the DMA exclusion vector. The '203 application also briefly mentions the possibility of using a shadow page table technique to prevent one OS from accessing the private data of another OS, and the '203 application mentions the more general possibility of employing an "adjunct memory access control scheme."

U.S. Pat. No. 6,651,171 (England et al., "Secure Execution of Program Code", "the '171 patent"), which was also assigned to Microsoft Corporation, describes a system in which hardware enforces a restricted memory arrangement. Multiple curtained memory rings are arranged in a hierarchical manner, similar to the protection rings of the x86 architecture. Different code and data are associated with each of the memory rings. Software in more-privileged rings can access code and data in less-privileged rings, but software in less-privileged rings cannot access code or data in more-privileged rings. Also, there may be multiple subrings within a given ring. Software within a given ring can also access code and data within its own ring, except that it cannot access code or data within a different subring.

U.S. Patent Application Publication No. 2003/0093686 (Barnes et al., "Memory Management System and Method Providing Linear Address Based Memory Access Security", "the '686 application"), which was assigned to Advanced Micro Devices, Inc., describes a Memory Management Unit (MMU) that includes a Security Check Unit (SCU) that receives a linear address generated during the execution of a current instruction. The linear address has a corresponding physical address residing within a selected memory page. The SCU uses the linear address to access one or more security attribute data structures located in the memory to obtain a security attribute of the selected memory page. The SCU compares a numerical value conveyed by a security attribute of the current instruction to a numerical value conveyed by the security attribute of the selected memory page, and produces an output signal dependent upon a result of the comparison. The MMU accesses the selected memory page dependent upon the output signal. The security attribute of the selected memory page and the security attribute of the current instruction may each include a security identification (SCID) value indicating a security context level of the selected memory page or the current instruction, respectively.

U.S. Pat. No. 6,823,433 (Barnes et al., "Memory Management System and Method for Providing Physical Address Based Memory Access Security", "the '433 patent"), which was also assigned to Advanced Micro Devices, Inc., discloses a MMU that is similar to the MMU disclosed in the '686 application. A security unit in the MMU of the '433 patent uses a physical address, instead of a linear address, to access security attribute data structures to obtain a security attribute of a selected memory page. Otherwise, the disclosure of the '433 patent is substantially similar to the disclosure of the '686 application.

U.S. Pat. No. 7,073,059 (Worley, J R. et al., "Secure Machine Platform that Interfaces to Operating Systems and Customized Control Programs", "the '059 patent"), which was assigned to Hewlett Packard Company, describes a "Secure Platform" (SP), which includes a software layer that executes at a privileged level on a modern processor architecture, such as the IA-64 processor architecture from Intel Corporation. The SP interfaces with one or more OSs and customized control programs, and allows them to access non-privileged machine instructions and registers. However, the OSs and customized control programs purportedly have no direct access to privileged instructions and registers and firmware interfaces. Instead, the SP allows the OSs and customized control programs to invoke software routines that provide control of the hardware, without exposing the privileged machine instructions and registers. The SP also organizes the resources of the system into one or more disjoint, mutually isolated partitions, called "domains." A single OS and all user-level processes managed by that OS together comprise a domain, and each domain is allocated a separate portion of virtual memory, along with other system resources. The SP employs the region registers and region identifiers, along with protection keys, of the IA-64 processor architecture to partition memory between the different domains.

With respect to the ubiquitous x86 platform, each of the possible security measures described above would require substantial hardware changes or an entirely new hardware platform. They would also require substantial changes to existing software platforms, including system software and possibly application software. Applications in some of these implementations might also have limited access to input/output devices because of a limited supply of trusted device drivers. A widespread transition from the x86 platform to a new hardware platform will likely be a slow, gradual process. The amount of money that is invested in computer hardware and software based on the x86 architecture throughout the world is enormous. Many individuals, businesses, schools, governments and other organizations will be reluctant to scrap their current x86 systems, along with all the software that currently runs on x86 systems, and replace them with new technology. Even if a new, more secure and widely accepted hardware platform were available today, it would still take a long time for the new hardware to become anywhere near as widespread as the x86 platform is today. In the meantime, a large number and proportion of computers would remain vulnerable to the security threats described above.

Also, even those individuals and organizations that quickly adopt the new hardware and software technology may still be susceptible to adverse effects resulting from lingering vulnerabilities of x86 computers. For example, a malicious software module may attack an x86-based server computer running a web application. If the malicious software takes down the server computer, any client computer attempting to access the web application will be adversely affected no matter how secure the client computer is. As another example, a malicious software module may infect a large number of x86 computers connected to the Internet. The many instances of the malicious software module on all the x86 computers may then mount a coordinated denial of service attack on a particular website on the Internet. In this case, the server computer(s) that are hosting the website and any bonafide client computers trying to access the website may be adversely affected by the attack, again, regardless of the technology implemented in either the server computer(s) or the bonafide client computers.

As a final example, even if an individual or organization has spent the money to replace all of its own computers and software with the new technology, sensitive information of the individual or organization may still reside on some external computer that remains vulnerable to the security threats described above. Suppose, for example, that an individual forks out the money to buy a new computer system based on a new hardware and software platform, so that all the sensitive information on the individual's computer system is now relatively secure. Suppose further, however, that the individual's bank (or any other organization that has sensitive information of the individual, such as some small company running an obscure Internet website from which the individual has made a purchase) has thus far continued to use its x86 computers instead of investing in the new technology. Again, if malicious software is able to exploit a vulnerability in the bank's computer system, a hacker may be able to steal sensitive information of the individual no matter what technology the individual is using.

What is needed, therefore, is a security measure that can be implemented more quickly and easily, without requiring such a large investment in new computer hardware and software. More particularly, what is needed is a solution that provides better isolation for the code and/or data of software modules within a computer system, but that can be implemented in software, without any hardware changes and with, at most, only minor software changes.

There are some proposed security measures that may be implemented primarily in software. In particular, there are some such measures that use virtualization technology to create multiple virtual machines (VMs), where different software modules run in different VMs. It is widely recognized that a well-designed and implemented virtualization layer can generally provide much greater isolation between multiple VMs than a general OS can provide between multiple software modules. For example, U.S. Pat. No. 6,922,774 (Meushaw et al., "Device for and Method of Secure Computing Using Virtual Machines", "the '774 patent"), which was assigned to the National Security Agency of the U.S. Government, describes a computer system that includes a Virtual Machine Monitor (VMM) that allows a user to create a number of VMs. The system includes a user-definable number of non-sensitive VMs and a user-definable number of sensitive VMs, all of which are isolated from one another by the virtualization technology. Each sensitive VM provides access to a secure area in a computer system that is accessible only through encrypted and/or authenticated connections. An encryption VM is created for and connected to each sensitive VM, where each encryption VM provides encryption capabilities, as well as possibly digital signature and key exchange capabilities. The computer system may also include a server connected to each VM in the system, where the server may be another VM or a stand-alone device. Each VM in the system can send information to the server, and the server can send information to any VM in the system, except as limited by user-definable rules for when a transfer is, or is not, appropriate to be transferred from one VM to another. Thus, the server allows information to be transferred from one VM to another when appropriate while maintaining isolation between VMs.

Another proposed security measure that takes advantage of the isolation provided by implementing multiple VMs was described in a technical paper entitled "Terra: A Virtual Machine-Based Platform for Trusted Computing," which was submitted to and presented at the Symposium on Operating Systems Principles, October 19-22, 2003, by Tal Garfinkel, Ben Pfaff, Jim Chow, Mendel Rosenblum and Dan Boneh ("the Terra paper"). The Terra paper describes a trusted VMM that partitions a single tamper-resistant, general-purpose platform into multiple isolated VMs. Existing applications and OSs can each run in a standard (open-box) VM that provides the semantics of today's open platforms. Applications can also run in their own closed-box VMs that provide the functionality of running on a dedicated closed platform. Among various other aspects of the proposed security measure, VMs on a single physical machine communicate with one another over virtualized standard input/output interfaces such as network interface cards, serial ports, etc.

FIG. 2 illustrates a general computer system 2B in which multiple VMs are implemented to isolate multiple software modules from one another. The computer system 2B includes system hardware 100B, which may be conventional hardware, such as hardware based on the x86 platform. The system hardware 100B may be substantially the same as the system hardware 100A of FIG. 1, or it may be substantially different. A virtualization software 200A executes on the system hardware 100B and supports a plurality of VMs, such as a first VM 300A and a second VM 300B, in a known manner. The virtualization software 200A may comprise a VMM, for example, such as a VMM as implemented in a virtualization product of VMware, Inc., the assignee of this patent. Such a VMM and other possible units of the virtualization software 200A are described in greater detail below.

In supporting the VM 300A, the virtualization software 200A virtualizes a virtual system hardware 310A, which may be based on an existing hardware platform, such as the x86 platform. An OS 20B, along with a set of drivers 29B, run on the virtual system hardware 310A. The OS 20B may be any OS designed to run on the hardware platform virtualized in the virtual hardware 310A. For example, if the virtual hardware 310A is based on the x86 platform, the OS 20B may be a Windows OS or a Linux OS. The set of drivers 29B may be conventional drivers for the OS 20B. A first application 40C and a second application 40D run on the OS 20B. The applications 40C and 40D may be any applications designed to run on the platform of the virtual hardware 310A and the OS 20B. Similar to the OS 20A of FIG. 1, the OS 20B, in conjunction with the virtual system hardware 310A, attempts to isolate the code and data of the applications 40C and 40D from one another, establishing an OS isolation barrier 80B between the applications 40C and 40D. Also similar to the OS 20A of FIG. 1, the OS 20B, again in conjunction with the virtual system hardware 310A, also establishes an OS isolation barrier 80A between the OS 20B and all applications in the VM 300A, including the applications 40C and 40D. Thus, the VM 300A may be substantially the same as the computer system 2A, except that the virtual system hardware 310A is virtual hardware, virtualized by the virtualization software 200A, instead of physical hardware.

In supporting the VM 300B, the virtualization software 200A virtualizes a virtual system hardware 310B, which may be based on an existing hardware platform, such as the x86 platform. An OS 20C, along with a set of drivers 29C, run on the virtual system hardware 310B. The OS 20C may be any OS designed to run on the hardware platform virtualized in the virtual hardware 310B. For example, if the virtual hardware 310B is based on the x86 platform, the OS 20C may be a Windows OS or a Linux OS. The set of drivers 29C may be conventional drivers for the OS 20C. A first application 40E and a second application 40F run on the OS 20C. The applications 40E and 40F may be any applications designed to run on the platform of the virtual hardware 310B and the OS 20C. Again, similar to the OS 20A of FIG. 1, the OS 20C, in conjunction with the virtual system hardware 310B, attempts to isolate the code and data of the applications 40E and 40F from one another, establishing an OS isolation barrier 80B between the applications 40E and 40F. Also similar to the OS 20A of FIG. 1, the OS 20C, again in conjunction with the virtual system hardware 310B, establishes an OS isolation barrier 80A between the OS 20C and all applications in the VM 300B, including the applications 40E and 40F. Thus, again, the VM 300B may be substantially the same as the computer system 2A, except that the virtual system hardware 310B is virtual hardware, virtualized by the virtualization software 200A, instead of physical hardware.

The virtualization software 200A isolates the VMs in the computer system 2B from one another. For example, the virtualization software 200A allows software within the VM 300A to access portions of physical memory in the system hardware 100B and it allows software within the VM 300B to access other portions of the physical memory. The virtualization software 200A maps attempted memory accesses from the respective VMs 300A and 300B to different portions of the physical memory, ensuring that no memory address generated by software in one VM can access code or data of another VM. In a similar manner, the virtualization software 200A maps attempted hard disk accesses from the respective VMs 300A and 300B to different portions of one or more hard disks in the system hardware 100B, ensuring that one VM cannot access the hard disk space of another VM.

The virtualization software 200A also takes other precautions to isolate the VMs in the computer system 2B from one another, and from the virtualization software 200A, itself. For example, U.S. patent application Ser. No. 10/917,713 (Agesen et al., "Restricting Memory Access to Protect Data when Sharing a Common Address Space", "the '713 application"), which has been assigned to the same assignee as this patent, and which is hereby incorporated herein by reference, describes methods that may be used to enable a VMM to occupy a portion of a linear address space of a VM, while preventing the VM from accessing the memory of the VMM. There are also various other methods that may be used to enable virtualization software to coexist with VMs in a virtual computer system, while protecting or isolating the virtualization software from software within the VMs. The virtualization software 200A may also prevent software within the VMs 300A and 300B from directly accessing certain hardware resources to further isolate the VMs from one another and from the virtualization software 200A. For example, the virtualization software 200A may prevent software within the VMs 300A and 300B from directly accessing a Direct Memory Access (DMA) device to prevent the possibility that the DMA device could be used to access either the hard disk space or the memory of other VMs or of the virtualization software itself. Various other precautions may also be taken, depending on the particular implementation. In addition to the precautions described thus far, the underlying system hardware may provide further support for isolating the VMs from each other and from the virtualization software. For example, Intel Corporation has implemented its Virtualization Technology (Intel VT), and Advanced Micro Devices, Inc. has implemented its AMD Virtualization (AMD-V) or Secure Virtual Machine (SVM), which provide hardware enhancements to facilitate the implementation of virtual computer systems.

Thus, the virtualization software 200A, in conjunction with the system hardware 100B, may be said to establish a first isolation barrier 280B between the VMs 300A and 300B and a second isolation barrier 280A between the virtualization software 200A and all VMs in the computer system 2B, including the VMs 300A and 300B. The isolation barriers 280A and 280B may be referred to as "virtualization barriers" because they are implemented by the virtualization software 200A, in conjunction with the system hardware 100B. The isolation barriers 280A and 280B may also be referred to as virtualization barriers because they are established through the virtualization of hardware resources, such as the virtualization of system memory.

It is widely recognized that virtualization techniques can generally provide better security and more effective isolation between multiple software modules than general OSs provide. Thus, the virtualization barriers 280A and 280B of FIG. 2 can generally provide much better isolation between the multiple VMs 300A and 300B and the virtualization software 200A than the OS isolation barriers 80A and 80B of FIG. 1 provide between the multiple applications 40A and 40B and the OS 20A. This improved isolation can be attributed to a variety of factors, depending on the particular situation. For example, OSs, such as the OS 20A, generally provide an Application Programming Interface (API) for use by applications, such as the applications 40A and 40B. These APIs can be used by application software first to discover and then to exploit vulnerabilities within the OS. Virtualization software, in contrast, generally has no such interface, or at least a more limited and/or restricted interface, for use by the software within a VM. Also, virtualization software generally does not need to rely on the integrity of third party device drivers. In contrast, general OSs often allow third party device drivers to execute at a most privileged level on the system hardware, so that they can access restricted hardware resources. If such a device driver contains malicious software, the driver can compromise the integrity of the entire computer system. Also, virtualization software is generally smaller and, in some ways, less complex than a general OS, such as a Windows or Linux OS, which generally leads to a smaller number of vulnerabilities that may be exploited to compromise the integrity of the computer system. Thus, virtualization software is likely to have fewer vulnerabilities than a general OS, and, more importantly, by the very nature of virtualizing a computer system, the virtualization software is much more isolated from software within a VM than a general OS is from other software within a computer system, making it much harder to discover and exploit any possible vulnerabilities.

Although computer systems that establish multiple VMs and that run different software modules within the different VMs generally provide better isolation for the software modules than do general OSs, such virtual computer systems have other limitations. First, if the software within a VM becomes corrupted by malicious software, the same problems described above relative to non-virtualized computer systems can occur within the affected VM. All software modules within the particular VM may be compromised by the malicious software. This scenario may be seen in FIG. 2. Suppose a malicious software module is able to execute within the VM 300A. If the malicious software is able to circumvent the OS isolation barriers 80A and/or 80B within that VM, then the malicious software can corrupt the OS 20B and/or the applications 40C and 40D. The virtualization barriers 280A and 280B will generally contain the malicious software within the VM 300A, however, so that it is not able to corrupt the virtualization software 200A or the software within the VM 300B. Thus, while the computer system 2B of FIG. 2 is able to limit the corruption to the VM 300A, the software within the VM 300A may be no more secure than the software within the computer system 2A of FIG. 1, depending on the circumstances. Of course, more VMs can be created within the virtual computer system 2B of FIG. 2 to further isolate the software modules within the computer system, but this increased isolation aggravates a second limitation of these virtual computer systems.

Multiple VMs within a computer system are generally similar to multiple physical computer systems. The multiple VMs generally have, at most, only limited communication and interaction with one another. For example, in the computer system of the '774 patent, the multiple VMs in the system can communicate with each other by sending information to a server, which can send the information on to another VM in the system, except as limited by user-definable rules. In the computer system described in the Terra paper, VMs on a single physical machine can communicate with one another over virtualized standard input/output interfaces such as network interface cards, serial ports, etc. Many software modules within a computer system, however, require more effective interaction or communication with other software modules. For example, multiple software modules may need to use shared memory to facilitate fast and efficient communication of data, or a software module may need to call a subroutine of another software module.

Another disadvantage of a computer system in which multiple VMs are used to isolate multiple software modules is that setting up and using such a system generally takes significantly more time and effort than a computer system in which multiple software modules and a general OS run directly on physical hardware. Individuals and organizations may be reluctant to adopt a multiple VM solution or they may not use such a solution consistently enough. Anytime such a solution is not used, and multiple software modules are run directly on a physical computer system or within a single VM, the risk of corruption by a malicious software module is increased.

What is needed therefore is a computer system for executing multiple software modules that provides improved security, such as is provided by the virtualized computer systems described above, while also providing more efficient and effective communication and/or interaction between multiple software modules. It would also be advantageous if such a computer system were easy to configure, use and maintain.

SUMMARY OF THE INVENTION

One general embodiment of the invention is a computer system comprising: system hardware, the system hardware including a system memory containing a plurality of memory locations; virtualization software supporting a virtual machine (VM); and guest software executing within the VM, the guest software including a first software entity and a second software entity. In such an embodiment, the virtualization software may activate hardware address mappings that are used to map attempted memory accesses to actual physical addresses in the system memory, the attempted memory accesses resulting from the execution of the guest software and being directed to guest physical addresses within the VM; the virtualization software may activate a first set of hardware address mappings when the first software entity executes within the VM; the virtualization software may activate a second set of hardware address mappings when the second software entity executes within the VM; where the first set of hardware address mappings map attempted memory accesses directed to a first guest physical address to a first actual physical address, while the second set of hardware address mappings map attempted memory accesses directed to the first guest physical address to a second actual physical address, where the second actual physical address is different from the first actual physical address, so that attempted memory accesses directed to the first guest physical address are mapped to the first actual physical address when the first software entity is executing and to the second actual physical address when the second software entity is executing.

Another general embodiment of the invention is a method for inhibiting access to a first set of data by a second software entity, the method being performed in a computer system comprising virtualization software running on system hardware and supporting a VM, where the first set of data is stored in a system memory in the system hardware and where the first set of data is used by a first software entity. This method comprises: when the first software entity is executing within the VM, mapping, from outside the VM, attempted memory accesses to a first guest physical address within the VM to a first actual physical address in the system memory, where the first set of data is stored in the system memory at the first actual physical address; and when the second software entity is executing within the VM, mapping, from outside the VM, attempted memory accesses to the first guest physical address within the VM to a second actual physical address in the system memory, where the second actual physical address is different from the first actual physical address.

Another general embodiment of the invention is a computer program module embodied in a computer readable medium, the computer program module being executable in a computer system comprising virtualization software running on system hardware and supporting a VM, the computer program module inhibiting access to a first set of data by a second software entity, where the first set of data is stored in a system memory in the system hardware and where the first set of data is used by a first software entity, the computer program module performing the method described above.

More specific embodiments of the invention may be based on the above-described general embodiments of the invention, as described in the following paragraphs.

In other embodiments of the invention, there is a first virtualization barrier between the VM, on a first side of the first virtualization barrier, and the virtualization software and the first and second sets of hardware address mappings, on a second side of the first virtualization barrier. In other embodiments of the invention, there is a second virtualization barrier between the first software entity, on a first side of the second virtualization barrier, and the second software entity, on a second side of the second virtualization barrier.

In other embodiments of the invention, the system hardware further comprises a physical secondary storage and the VM comprises a virtual secondary storage, and an attempted access to a first location of the virtual secondary storage is mapped to a second location of the physical secondary storage when the first software entity executes within the VM and an attempted access to the first location of the virtual secondary storage is mapped to a third location of the physical secondary storage when the second software entity executes within the VM, where the third location of the physical secondary storage is different from the second location of the physical secondary storage. In other embodiments of the invention, the physical secondary storage comprises a physical disk drive and the virtual secondary storage comprises a virtual disk drive.

In other embodiments of the invention, the hardware address mappings in both the first set of hardware address mappings and the second set of hardware address mappings are shadow address mappings. In other embodiments of the invention, the first set of hardware address mappings is contained in a first shadow page table, the second set of hardware address mappings is contained in a second shadow page table, activating the first set of hardware address mappings comprises activating the first shadow page table, and activating the second set of hardware address mappings comprises activating the second shadow page table. In other embodiments of the invention, the first set of hardware address mappings is derived from a first set of guest address mappings and a first set of virtualization address mappings, the second set of hardware address mappings is derived from a second set of guest address mappings and a second set of virtualization address mappings, and the first set of virtualization address mappings maps the first guest physical address to the first actual physical address and the second set of virtualization address mappings maps the first guest physical address to the second actual physical address. In other embodiments of the invention, the first set of virtualization address mappings is contained in a first address mapping module and the second set of virtualization address mappings is contained in a second address mapping module.

In other embodiments of the invention, the hardware address mappings in both the first set of hardware address mappings and the second set of hardware address mappings are virtualization address mappings. In other embodiments of the invention, the first set of hardware address mappings is contained in a first nested page table, the second set of hardware address mappings is contained in a second nested page table, activating the first set of hardware address mappings comprises activating the first nested page table, and activating the second set of hardware address mappings comprises activating the second nested page table.

In other embodiments of the invention, the virtualization software determines whether the first software entity is executing and whether the second software entity is executing by monitoring attempts to activate different page tables. In other embodiments of the invention, the virtualization software determines whether the first software entity is executing and whether the second software entity is executing by monitoring use of address space identifiers. In other embodiments of the invention, the virtualization software determines whether the first software entity is executing and whether the second software entity is executing by monitoring code that is being executed.

In other embodiments of the invention, there is also an application stub and a bridge, where the stub executes within the VM to facilitate operation of the first software entity, where the bridge enables communications between the stub and the virtualization software and between the first software entity and the virtualization software, and where the communications between the first software entity and the virtualization software takes place through a secure application programming interface.

In other embodiments of the invention, the first set of hardware address mappings and the second set of hardware address mappings each map attempted memory accesses directed to a second guest physical address to a third actual physical address, so that both the first software entity and the second software entity may access the third actual physical address by directing attempted memory accesses to the second guest physical address.

DETAILED DESCRIPTION

Figure 1:
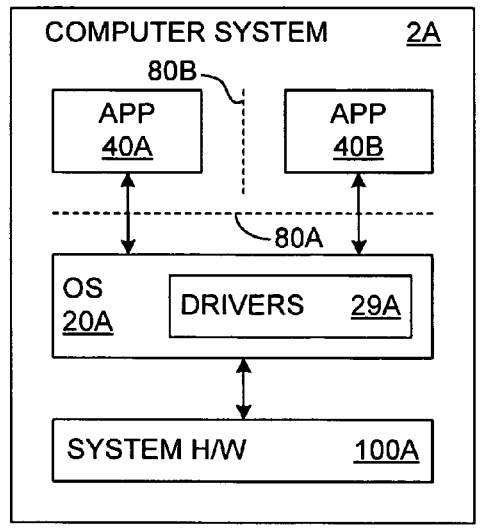
FIG. 1 illustrates a simple computer system running multiple software modules on a general operating system.

As described above, this invention may be implemented in a wide variety of computer systems, having a wide variety of hardware and software platforms and configurations. The invention involves creating one or more virtualization barriers to isolate one or more software modules from one or more other software modules in a computer system. The invention may be implemented in a wide variety of ways, in a wide variety of virtualization configurations. Several different embodiments are described below, along with some variations, but many more embodiments and variations are also possible. The invention is described below in connection with two different virtual computer system configurations. These two virtual computer system configurations are substantially similar to configurations used in commercially available products of the assignee of this patent, VMware, Inc. The invention may also be implemented in a wide variety of other virtual computer systems, however.

Also, the commercial products of the assignee and the description in this patent are based on the x86 platform, but the invention may be implemented on a wide variety of other hardware platforms. Also, in the commercial products of the assignee and in this description, the hardware platform that is virtualized within virtual machines is also based on the x86 architecture. However, the invention may also be implemented in virtual computer systems that virtualize other hardware platforms, including cross-platform virtual computer systems. This description is also based on the popular Windows and Linux OSs, although the invention may also be used in connection with other OSs as well.

Also, the commercial products of the assignee and this description are based on a full virtualization of the x86 platform, although the invention may also be implemented in other computer systems that involve less than full virtualization. Thus, the invention may be implemented in systems in which direct access is provided to some physical resources, instead of virtualizing all physical resources. In addition, this invention may be implemented in computer systems involving so-called paravirtualization. In paravirtualized computer systems, the virtualized hardware platform is not identical to an actual physical platform, so software that is designed to run on the actual physical platform must be modified or ported to run on the virtualized hardware platform. This invention may be implemented in a wide variety of virtual computer systems, ranging from systems in which only selected physical resources are virtualized to systems in which a complete, actual hardware platform is virtualized.

As is well known in the art, a virtual machine (VM) is a software abstraction—a "virtualization"—of an actual or an abstract physical computer system. The VM runs as a "guest" on an underlying "host" hardware platform. Guest software, such as a guest OS and guest applications, may be loaded onto the virtual computer for execution. The guest OS may, but need not be, the same as the OS or other system software running at the system level in the host. For example, a Windows OS may be run in the VM even though the OS used to handle actual I/O (input/output), memory management, etc., on the host might be a Linux OS. Also, as long as a suitable interface is provided between the VM and the host platform, a user of a VM need not even be aware that he is not using a "real" computer, that is, a system with hardware dedicated exclusively to his use. The existence of the underlying host can be made transparent to a user of the VM and to the guest software itself. The virtual computer systems described below, as implemented in the commercial products of the assignee of this patent, support VMs that have these characteristics.

A Hosted Virtual Computer System

Figure 3:
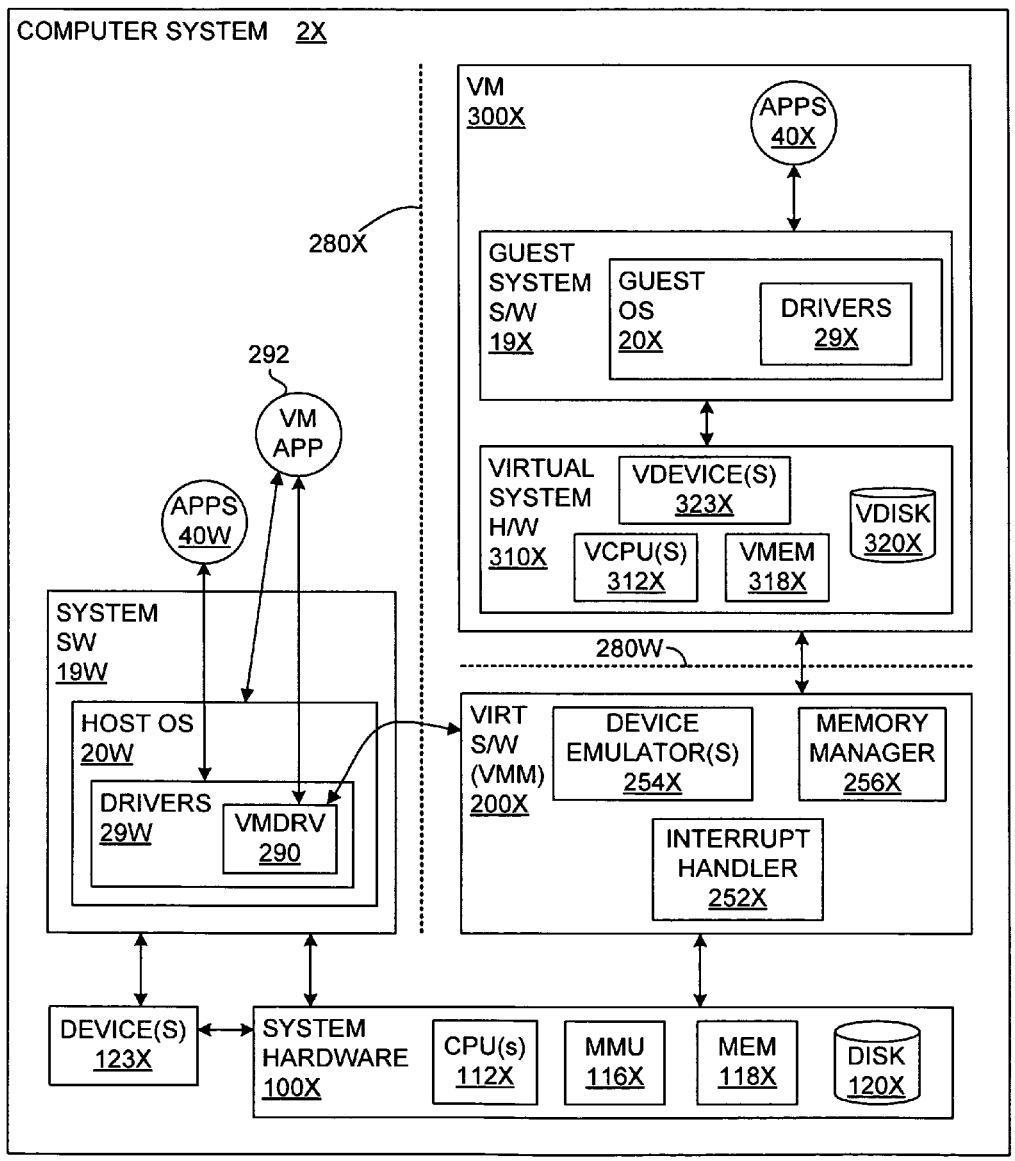
FIG. 3 illustrates a virtual computer system installed on a host platform, with a virtual machine monitor (VMM) at the same system level as the host operating system.

FIG. 3 illustrates the main components of a computer system 2X that supports a VM 300X, as generally implemented in the Workstation virtualization product of VMware, Inc. As in conventional (non-virtualized) computer systems, both system hardware 100X and system software 19W are included. The system hardware 100X includes CPU(s) 112X, which may be a single processor, or two or more cooperating processors in a known multiprocessor arrangement. The system hardware also includes system memory 118X, one or more disks 120X, and some form of Memory Management Unit (MMU) 116X. As is well understood in the field of computer engineering, the system hardware also includes, or is connected to, conventional registers, interrupt-handling circuitry, a clock, etc., which, for the sake of simplicity, are not shown in the figure.

The system software 19W either is or at least includes an operating system (OS) 20W, which has drivers 29W as needed for controlling and communicating with various devices 123X, and usually with the disk 120X as well. Conventional applications 40W, if included, may be installed to run on the hardware 100X via the system software 19W and any drivers needed to enable communication with devices.

The virtual machine (VM) 300X—also known as a "virtual computer"—is a software implementation of a complete computer system. In the VM, the physical system components of a "real" computer are emulated in software, that is, they are virtualized. Thus, the VM 300X will typically include virtualized ("guest") system hardware 310X, which in turn includes one or more virtual CPUs 312X (VCPU), virtual system memory 318X (VMEM), one or more virtual disks 320X (VDISK), and one or more virtual devices 323X (VDEVICE), all of which are implemented in software using known techniques to emulate the corresponding components of an actual computer. The concept, design and operation of virtual machines are well known in the field of computer science.

The VM 300X also includes system software 19X, which may include a guest operating system 20X, which may, but need not, simply be a copy of a conventional, commodity OS, as well as drivers 29X (DRVS) as needed, for example, to control the virtual device(s) 323X. Note that a disk—virtual or physical—is also a "device," but is usually considered separately because of its essential role. Of course, most computers are intended to run various applications, and a VM is usually no exception. Consequently, by way of example, FIG. 3 illustrates one or more applications 40X installed to run on the guest OS 20X; any number of applications, including none at all, may be loaded for running on the guest OS, limited only by the requirements of the VM. Software running in the VM 300X, including the guest OS 20X and the guest applications 40X, is generally referred to as "guest software."

Note that although the virtual hardware "layer" 310X will be a software abstraction of physical components, the VM's system software 19X may be the same as would be loaded into a hardware computer. The modifier "guest" is used here to indicate that the VM, although it acts as a "real" computer from the perspective of a user and guest software, is actually just computer code that is executed on the underlying "host" hardware and software platform 100X, 19W. Thus, for example, I/O to a virtual device 323X will actually be carried out by I/O to a corresponding hardware device 123X, but in a manner transparent to the VM.

Some interface is usually required between the VM 300X and the underlying "host" hardware 100X, which is responsible for actually executing VM-related instructions and transferring data to and from the actual, physical memory 118X and other system hardware 100X. One advantageous interface between the VM and the underlying host system is often referred to as a Virtual Machine Monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 19W, or directly on the hardware, and virtualizes the resources of the (or some) hardware platform. FIG. 3 shows virtualization software 200X, which may be implemented as a VMM, running directly on the system hardware 100X. The virtualization software 200X is also referred to as a VMM 200X herein, although it may alternatively comprise other virtualization software that may not be considered or called a VMM. The VMM 200X will typically include at least one device emulator 254X, which may also form the implementation of the virtual device(s) 323X. The interface exported to the respective VM is usually such that the guest OS 20X cannot determine the presence of the VMM. The VMM also usually tracks and either forwards (to the host OS 20W) or itself schedules and handles all requests by its VM for machine resources, as well as various faults and interrupts. FIG. 3 therefore illustrates an interrupt (including fault) handler 252X within the VMM. The VMM also includes a memory manager 256X, the general operation of which is described below. The general features of VMMs are well known and are therefore not discussed in further detail here.

FIG. 3 illustrates a single VM 300X merely for the sake of simplicity; in many installations, there will be more than one VM installed to run on the common hardware platform; all may have essentially the same general structure, although the individual components need not be identical. Also in FIG. 3, a single VMM 200X is shown acting as the interface for the single VM 300X. It would also be possible to include the VMM as part of its respective VM. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In all of these configurations, there must be some way for the VM to access hardware devices, albeit in a manner transparent to the VM itself. One solution would of course be to include in the VMM all the required drivers and functionality normally found in the host OS 20W to accomplish I/O tasks. Two disadvantages of this solution are increased VMM complexity and duplicated effort—if a new device is added, then its driver would need to be loaded into both the host OS and the VMM. A third disadvantage is that the use of a hardware device by a VMM driver may confuse the host OS, which typically would expect that only the host's driver would access the hardware device. In its Workstation virtualization product, VMware, Inc. has implemented a different method, which is better in some situations. This method is also illustrated in FIG. 3.

In the system illustrated in FIG. 3, both the host OS and the VMM are installed at system level, meaning that they both run at the greatest privilege level and can therefore independently modify the state of the hardware processor(s). For I/O to at least some devices, however, the VMM may issue requests via the host OS 20W. To make this possible, a special driver VMDRV 290 is installed as any other driver within the host OS 20W and exposes a standard API to a user-level application VMAPP 292. When the system is in the VMM context, meaning that the VMM is taking exceptions, handling interrupts, etc., but the VMM wishes to use the existing I/O facilities of the host OS, the VMM calls the driver VMDRV 290, which then issues calls to the application VMAPP 292, which then carries out the I/O request by calling the appropriate routine in the host OS.

Figure 2:
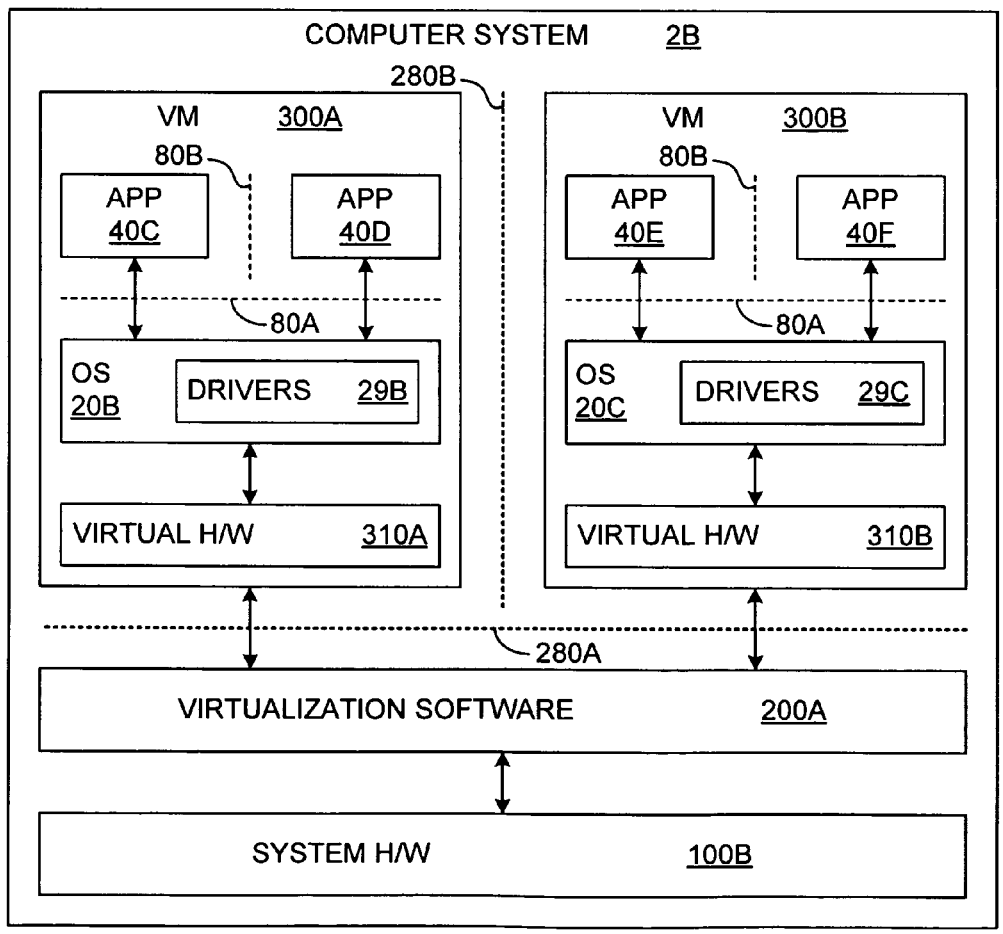
FIG. 2 illustrates a virtual computer system with multiple virtual machines (VMs) for running multiple software modules.

In FIG. 3, a vertical line 280X symbolizes the boundary between the virtualized (VMNMM) and non-virtualized (host software) "worlds" or "contexts." The driver VMDRV 290 and application VMAPP 292 thus enable communication between the worlds even though the virtualized world is essentially transparent to the host system software 19W. The line 280X may also be characterized as a "virtualization barrier", as that term is used above. However, the virtualization barrier 280X does not provide as complete a barrier, or as secure a barrier, between the host OS 20W and the VM 300X as the virtualization barrier 280B provides between the VM 300A and the VM 300B of FIG. 2. This is primarily because the system software 19W has direct access to the system hardware 100X, including all of the memory 118X and the disk 120X, including, in particular, the memory and disk space that contains the code and data of the VMM 200X and the VM 300X. Accordingly, the virtualization barrier 280X may be referred to more specifically as a "limited virtualization barrier," while the virtualization barrier 280B may be referred to more specifically as a "complete virtualization barrier" or as a "bidirectional virtualization barrier." Another virtualization barrier would be established between the VM 300X and any other VM in the computer system 2X, although no such other virtualization barrier is illustrated in FIG. 3 because only one VM is illustrated. FIG. 3 does show a virtualization barrier 280W between the VM 300X and the VMM 200X. The virtualization barrier 280W may be substantially the same as the virtualization barrier 280A of FIG. 2.

A Kernel-Based Virtual Computer System

In the computer system 2X of FIG. 3, the VMM is co-resident at system level with a host operating system. Both the VMM and the host OS can independently modify the state of the host processor, but the VMM calls into the host OS via a driver and a dedicated user-level application to have the host OS perform certain I/O operations on behalf of the VM. The virtual computer in this configuration is thus fully hosted in that it runs on an existing host hardware platform and together with an existing host OS.

Figure 4:
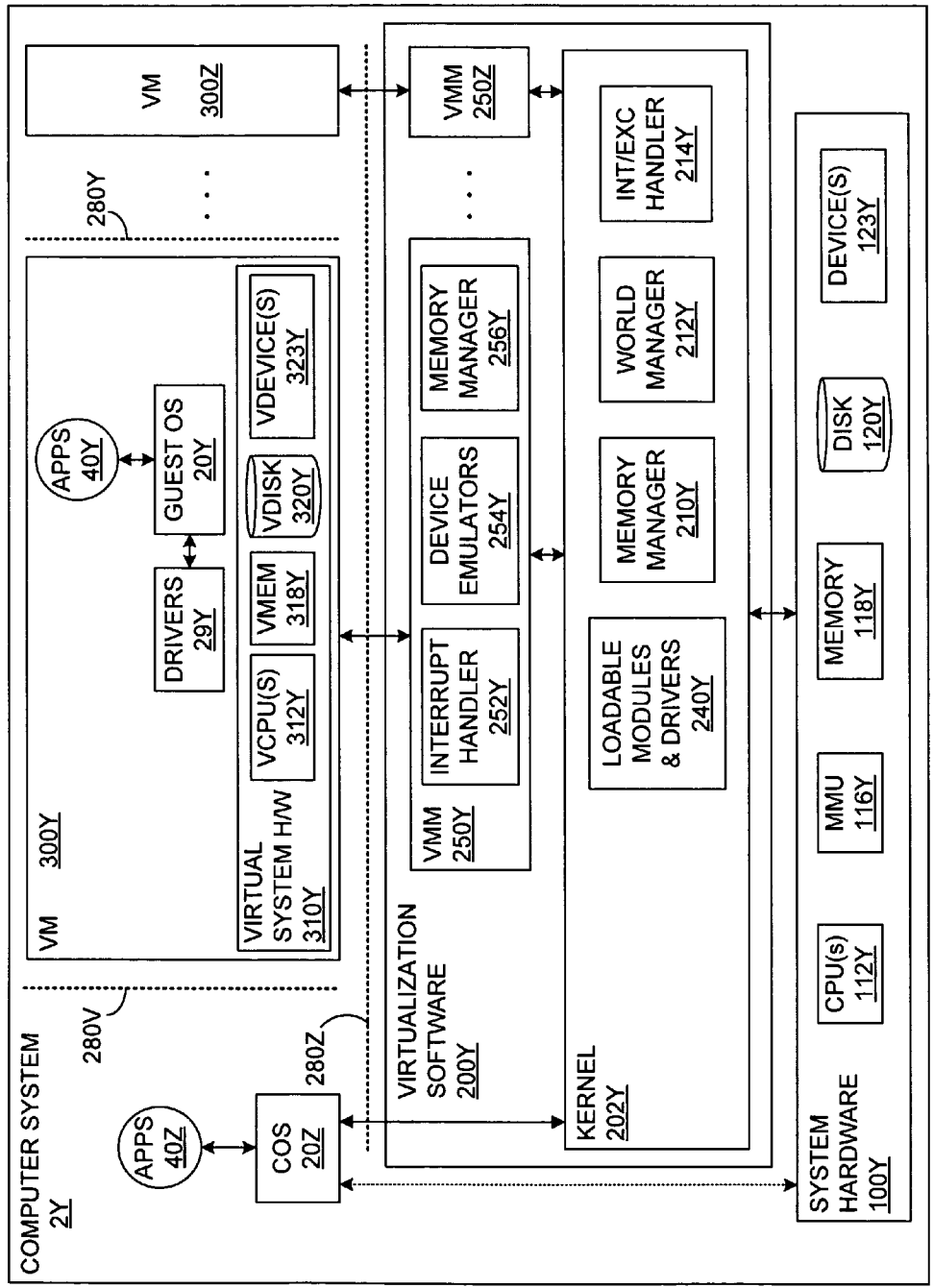
FIG. 4 illustrates an alternative configuration of a virtual computer system, which includes a kernel on which the VMM runs.

In other implementations, a dedicated kernel takes the place of and performs the conventional functions of the host OS, and virtual computers run on the kernel. FIG. 4 illustrates a "kernel-based" virtual computer system, in which a kernel serves as the system software for one or more VMM/VM pairs. Compared with a system in which VMMs run on a host OS, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server virtualization product of VMware, Inc., has such a configuration. A kernel-based virtualization system of the type illustrated in FIG. 4 is described in U.S. Pat. No. 6,961,941 (Nelson et al., "Computer Configuration for Resource Management in Systems Including a Virtual Machine", "the '941 patent"), which has been assigned to the same assignee as this patent, and which is hereby incorporated herein by reference.

FIG. 4 illustrates the general configuration of a kernel-based virtual computer system 2Y, including one or more virtual machines (VMs), such as a first VM 300Y and a second VM 300Z, each of which is installed as a "guest" on a "host" hardware platform 100Y. As FIG. 4 shows, the hardware platform 100Y includes one or more processors (CPUs) 112Y, system memory 118Y, and one or more disks 120Y. The hardware 100Y may also include other conventional mechanisms such as a Memory Management Unit (MMU) 116Y and various devices 123Y.

The VM 300Y includes virtual system hardware 310Y, which typically includes at least one virtual CPU 312Y, at least one virtual disk 320Y, a virtual system memory 318Y, and various virtual devices 323Y. The VM 300Y also includes a guest operating system 20Y (which may simply be a copy of a conventional operating system) running on the virtual system hardware 310Y, along with a set of drivers 29Y for accessing the virtual devices 323Y and the virtual disk 320Y. One or more applications 40Y may execute in the VM 300Y on the guest OS 20Y and the virtual system hardware 310Y. All of the components of the VM may be implemented in software using known techniques to emulate the corresponding components of an actual computer. This implementation of the VM 300Y may generally be substantially the same as the implementation of the VM 300X in FIG. 3.

The VMs 300Y and 300Z are supported by a virtualization software 200Y comprising a kernel 202Y and a set of VMMs, including a first VMM 250Y and a second VMM 250Z. In this implementation, each VMM supports one VM. Thus, the VMM 250Y supports the VM 300Y and the VMM 250Z supports the VM 300Z. The VMM 250Y includes, among other components, device emulators 254Y, which may constitute the virtual devices 323Y that the VM 300Y accesses. The VMM 250Y may also include a memory manager 256Y, the general operation of which is described below. The VMM also usually tracks and either forwards (to some form of system software) or itself schedules and handles all requests by its VM for machine resources, as well as various faults and interrupts. A mechanism known in the art as an exception or interrupt handler 252Y may therefore be included in the VMM. The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as a console OS as described below. The VMM may forward still other interrupts to the VM.

The computer system 2Y may initially have an existing operating system 20Z that may be at system level, and the kernel 202Y may not yet even be operational within the system. The initial system level interface between the OS 20Z and the system hardware 100Y is shown by a dashed line in FIG. 4. In such case, one of the functions of the OS 20Z may be to make it possible to load the kernel 202Y, after which the kernel runs on the native hardware 100Y and manages system resources. In effect, the kernel, once loaded, displaces the OS 20Z. Thus, the kernel 202Y may be viewed either as displacing the OS 20Z from the system level and taking this place itself, or as residing at a "sub-system level." When interposed between the OS 20Z and the hardware 100Y, the kernel 202Y essentially turns the OS 20Z into an "application," which has access to system resources only when allowed by the kernel 202Y. The kernel then schedules the OS 20Z as if it were any other component that needs to use system resources. Accordingly, another interface is shown between the OS 20Z and the kernel 202Y for enabling the OS 20Z to access the system hardware 100Y. This second interface is shown with a solid line in FIG. 4.

The OS 20Z may also be included to allow applications unrelated to virtualization to run; for example, a system administrator may need such applications to monitor the hardware 100Y or to perform other administrative routines. The OS 20Z may thus be viewed as a "console" OS (COS). In such implementations, the kernel 202Y preferably also includes a remote procedure call (RPC) mechanism to enable communication between, for example, the VMM 250Y and any applications 40Z installed to run on the COS 20Z.

As described in the '941 patent, the kernel 202Y handles the various VMM/VMs and the COS 20Z as entities that can be separately scheduled, which are referred to as "worlds". The worlds are controlled by a world manager, represented in FIG. 4 within the kernel 202Y as module 212Y. The kernel 202Y preferably also includes an interrupt/exception handler 214Y that is able to intercept and handle interrupts and exceptions for all devices on the machine.

The kernel 202Y also includes a system memory manager 210Y that manages all machine memory that is not allocated exclusively to the COS 20Z. When the kernel 202Y is loaded, the information about the maximum amount of memory available on the machine is available to the kernel, as well as information about how much of it is being used by the COS. Part of the machine memory is used for the kernel 202Y itself and the rest is used for the virtual machine worlds. Virtual machine worlds use machine memory for two purposes. First, memory is used to back portions of each world's memory region, that is, to store code, data, stacks, etc. For example, the code and data for the VMM 250Y is backed by machine memory allocated by the kernel 202Y. Second, memory is used for the guest memory of the virtual machine. The memory manager may include any algorithms for dynamically allocating memory among the different VM's.

In some embodiments of the invention, the kernel 202Y is responsible for providing access to all devices on the physical machine. In addition to other modules that the designer may choose to load onto the system for access by the kernel, the kernel will therefore typically load conventional drivers as needed to control access to devices. Accordingly, FIG. 4 shows a module 240Y containing loadable kernel modules and drivers. The kernel 202Y may interface with the loadable modules and drivers in a conventional manner, using an API or similar interface.

FIG. 4 also shows a first virtualization barrier 280V between the COS 20Z and the VMs 300Y and 300Z, a second virtualization barrier 280Y between the VMs 300Y and 300Z, and a third virtualization barrier 280Z between the virtualization software 200Y and the VMs 300Y and 300Z, as well as the COS 20Z. There would also be additional virtualization barriers between any other VMs in the computer system. The virtualization barriers 280V and 280Y may be substantially the same as the virtualization barrier 280B of FIG. 2, while the virtualization barrier 280Z may be substantially the same as the virtualization barrier 280A.

Overview of Memory Mapping in a Virtual Computer System

When memory addresses are generated in the VM 300X of FIG. 3, either by the applications 40X or the guest system software 19X, the addresses are generally mapped to corresponding addresses in the physical memory 118X. Both the guest OS 20X and the memory manager 256X are involved in this mapping process. Similarly, when memory addresses are generated in the VM 300Y of FIG. 4, either by the applications 40Y or the system software of the VM 300Y, the guest OS 20Y and the memory manager 256Y are involved in the process of mapping the addresses to corresponding addresses in the physical memory 118Y. These address mapping processes are substantially similar in both the hosted virtual computer system 2X of FIG. 3 and the kernel-based virtual computer system 2Y of FIG. 4. Thus, the following description is generally limited to the process of mapping addresses from the VM 300X of FIG. 3 to the physical memory 118X, although it generally also applies to the corresponding process of FIG. 4, and to corresponding processes in other virtual computer systems.

Most modern computers implement a "virtual memory" mechanism, as described briefly above, which allows user-level software to specify memory locations using a set of virtual addresses. These virtual addresses are then translated or mapped into a different set of physical addresses that are actually applied to physical memory to access the desired memory locations. The range of possible virtual addresses that may be used by user-level software constitute a virtual address space, while the range of possible physical addresses that may be specified constitute a physical address space. The virtual address space is typically divided into a number of virtual memory pages, each having a different virtual page number, while the physical address space is typically divided into a number of physical memory pages, each having a different physical page number. A memory "page" in either the virtual address space or the physical address space typically comprises a particular number of memory locations, such as either a four kilobyte (KB) memory page or a two megabyte (MB) memory page in an x86 computer system.

In a conventional, non-virtualized computer system, system-level software generally specifies mappings from memory pages in the virtual address space using virtual page numbers to memory pages in the physical address space using physical page numbers. The terms "virtual address" and "virtual address space" relate to the well-known concept of a virtual memory system, which should not be confused with the computer virtualization technology described elsewhere in this patent, involving other well-known concepts such as VMMs and VMs. A well-known technique of memory paging may be used to enable an application to use a virtual address space that is larger than the amount of physical memory that is available for use by the application. The code and data corresponding to some of the pages in the virtual address space may reside in physical memory, while other pages of code and data may be stored on a disk drive, for example. If the application attempts to access a memory location in the virtual address space for which the corresponding data is stored on the disk drive, instead of in physical memory, then the system software typically loads a page worth of data from the disk drive including the desired data into a page of physical memory (possibly first storing the contents of the memory page to disk). The system software then allows the attempted memory access to complete, accessing the physical memory page into which the data has just been loaded.

Now suppose that the host OS 20W of FIG. 3 implements a virtual memory system, with memory paging. Now if an application 40W requests access to the hardware memory 118X, for example, the request is issued with a virtual address, which must be mapped to a physical address that is issued to the actual hardware memory. This mapping, or translation, is typically specified by the OS 20W, which includes some form of memory management module for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When accessing a given memory location specified by a virtual address, the processor breaks the virtual address into a virtual page number (higher-order address bits) plus an offset into that page (lower-order address bits). The virtual page number (VPN) is then translated using mappings established by the OS into a physical page number (PPN) based on a page table entry (PTE) for that VPN in the page tables associated with the currently active address space. The page tables will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of the hardware Memory Management Unit (MMU) 116X. The TLB contains, among other information, VA-to-PA mapping entries at least for VPNs that have been addressed recently or frequently. Rather than searching all the page tables, the TLB is searched first instead. If the current VPN is not found in the TLB, then a "TLB miss" occurs, and the page tables in memory are consulted to find the proper translation, and the TLB is updated to include this translation. The OS thus specifies the mapping, but the hardware MMU 116X usually actually performs the conversion of one type of page number to the other. Below, for the sake of simplicity, when it is stated that a software module "maps" page numbers, the existence and operation of a hardware device such as the MMU 116X may be assumed.

An extra level of addressing indirection is typically implemented, however, in virtualized systems in that a VPN issued by an application 40X in the VM 300X is remapped twice in order to determine which page of the hardware memory is intended. A mapping module within the guest OS 20X translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

The memory manager 256X therefore takes the GPPN issued by the guest OS 20X and maps it to a hardware page number PPN that can be used to address the hardware memory 118X. Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN-PPN mapping performed by the VMM is transparent to the guest system.

Figure 5:
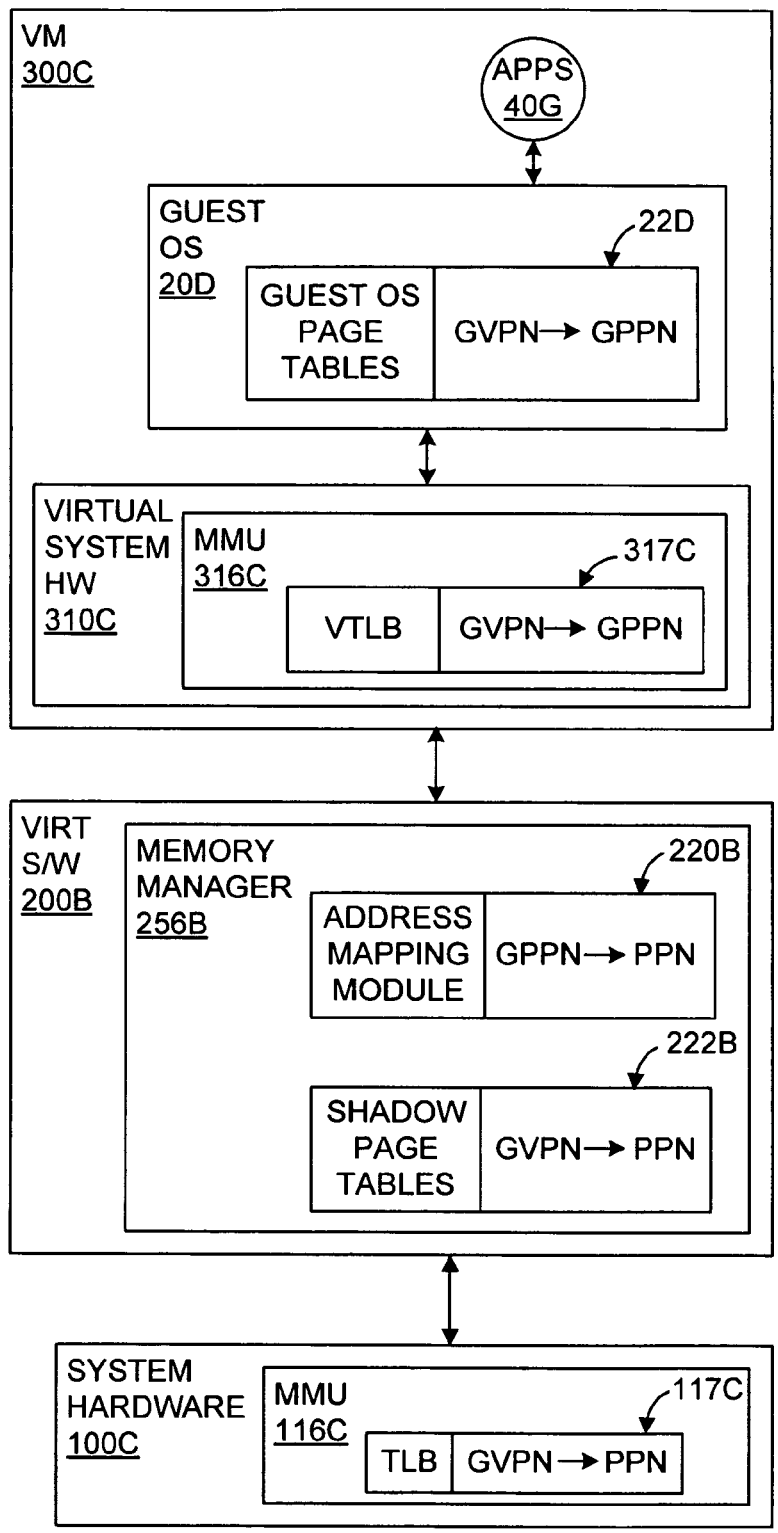
FIG. 5 illustrates an extra level of address indirection when mapping virtual memory addresses in a virtual computer system.

FIG. 5 shows a more abstract virtual computer system that can represent either the computer system 2X of FIG. 3 or the computer system 2Y of FIG. 4. FIG. 5 illustrates the address mapping process described above and some of the functional units that are involved in this process. FIG. 5 shows a system hardware 100C, which includes an MMU 116C, which further includes a TLB 117C. The MMU 116C may be the same as the MMU 116X of FIG. 3 or the MMU 116Y of FIG. 4.

Virtualization software 200B executes on the system hardware 100C, and may be substantially the same as the virtualization software 200X of FIG. 3 or the virtualization software 200Y of FIG. 4. The virtualization software 200B includes a memory manager 256B, which further includes an address mapping module 220B and a set of shadow page tables 222B. The memory manager 256B may be substantially the same as the memory manager 256X of FIG. 3 or the memory manager 256Y of FIG. 4.

The virtualization software 200B supports a VM 300C, which may be substantially the same as the VM 300X of FIG. 3 or the VM 300Y of FIG. 4. The VM 300C includes virtual system hardware 310C, which further includes an MMU 316C, which may further include a virtual TLB (VTLB) 317C, although the MMU 316C may also be implemented without a virtual TLB. The VM 300C also includes a guest OS 20D and a set of one or more applications 40G. The guest OS 20D includes a set of guest OS page tables 22D.

The guest OS 20D generates the guest OS page tables 22D that map the guest software virtual address space to what the guest OS perceives to be the physical address space. In other words, the guest OS 20D maps GVPNs to GPPNs. Suppose, for example, that a guest application 40G attempts to access a memory location having a first GVPN, and that the guest OS has specified in the guest OS page tables that the first GVPN is backed by what it believes to be a physical memory page having a first GPPN.

The address mapping module 220B keeps track of mappings between the GPPNs of the guest OS 20D and the "real" physical memory pages of the physical memory within the system hardware 100C. Thus, the address mapping module 220B maps GPPNs from the guest OS 20D to corresponding PPNs in the physical memory. Continuing the above example, the address mapping module translates the first GPPN into a corresponding PPN, let's say a first PPN.

The memory manager 256B creates a set of shadow page tables 222B that are used by the MMU 116C. The shadow page tables 222B include a number of shadow PTEs that generally correspond to the PTEs in the guest OS page tables 22D, but the shadow PTEs map guest software virtual addresses to corresponding physical addresses in the actual physical memory, instead of to the physical addresses specified by the guest OS 20D. In other words, while the guest OS page tables 22D provide mappings from GVPNs to GPPNs, the shadow PTEs in the shadow page tables 222B provide mappings from GVPNs to corresponding PPNs. Thus, continuing the above example, instead of containing a mapping from the first GVPN to the first GPPN, the shadow page tables 222B would contain a shadow PTE that maps the first GVPN to the first PPN. Thus, when the guest application attempts to access a memory location having the first GVPN, the MMU 116C loads the mapping from the first GVPN to the first PPN in the shadow page tables 222B into the physical TLB 117C, if the mapping is not already there. This mapping from the TLB 117C is then used to access the corresponding memory location in the physical memory page having the first PPN.

For purposes of this patent, certain address mapping phrases are defined as follows: address mappings or translations from guest virtual addresses to guest physical addresses (e.g. mappings from GVPNs to GPPNs) are defined as "guest address mappings" or just "guest mappings;" address mappings or translations from guest physical addresses to actual physical addresses (e.g. mappings from GPPNs to PPNs) are defined as "virtualization address mappings" or just "virtualization mappings;" and address mappings or translations from guest virtual addresses to actual physical addresses (e.g. from GVPNs to PPNs) are defined as "shadow address mappings" or just "shadow mappings." "Hardware address mappings" or "hardware mappings" are defined more generally as any address mappings or translations that provide mappings to actual physical memory, such that "hardware address mappings" include both "virtualization address mappings" and "shadow address mappings."

Example of Guest Address Mapping

Figure 6:
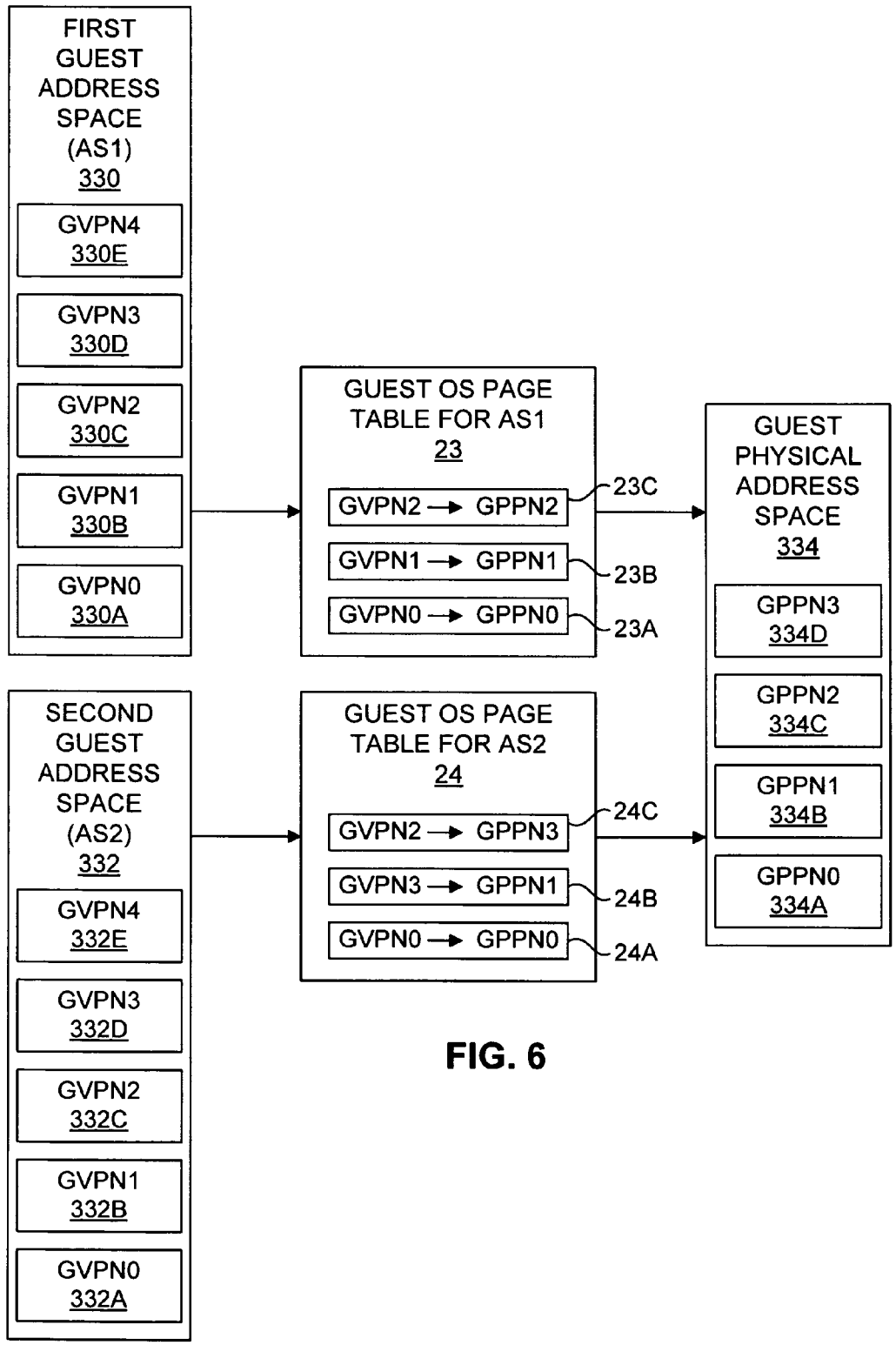
FIG. 6 illustrates the mapping of guest virtual addresses to guest physical addresses within a VM.

FIG. 6 begins a simplified example of memory address mapping in a virtual computer system that continues through subsequent figures. FIG. 6 illustrates the mapping of virtual addresses by a guest OS within a VM to what the guest OS believes are physical memory pages. Thus, the guest OS of FIG. 6 (not shown) could be the guest OS 20X within the VM 300X of FIG. 3, or the guest OS 20Y within the VM 300Y of FIG. 4, or the guest OS 20D within the VM 300C of FIG. 5. FIG. 6 shows a first guest virtual address space (AS1) 330, a second guest virtual address space (AS2) 332 and a guest physical address space 334. Thus, the guest virtual address spaces 330 and 332 contain GVPNs, while the guest physical address space 334 contains GPPNs. More specifically, FIG. 6 shows the first guest virtual address space 330 as containing a first set of five virtual memory pages, namely a GVPN0 330A, a GVPN1 330B, a GVPN2 330C, a GVPN3 330D and a GVPN4 330E; it shows the second guest virtual address space 332 as containing a second set of five virtual memory pages, namely a GVPN0 332A, a GVPN1 332B, a GVPN2 332C, a GVPN3 332D and a GVPN4 332E; and it shows the guest physical address space 334 as containing a set of four guest physical memory pages, namely a GPPN0 334A, a GPPN1 334B, a GPPN2 334C, and a GPPN3 334D.

FIG. 6 also shows a first guest OS page table 23 for mapping addresses from the first guest virtual address space 330 to the guest physical address space 334, and a second guest OS page table 24 for mapping addresses from the second guest virtual address space 332 to the guest physical address space 334. The guest OS page table 23 may actually represent a set of page tables and a page directory, such as are used in x86 systems, that together define a single virtual address space, but the multiple, related page tables and page directory are referred to herein as a single page table for simplicity. The same caveat applies to the guest OS page table 24 and generally to other page tables throughout the remainder of this patent. The guest OS page table 23 contains three mappings or PTEs mapping GVPNs to GPPNs, namely, a PTE 23A that maps the GVPN0 330A to the GPPN0 334A, a PTE 23B that maps the GVPN1 330B to the GPPN1 334B, and a PTE 23C that maps the GVPN2 330C to the GPPN2 334C. The guest OS page table 24 also contains three PTEs mapping GVPNs to GPPNs, namely, a PTE 24A that maps the GVPN0 332A to the GPPN0 334A, a PTE 24B that maps the GVPN3 332D to the GPPN1 334B, and a PTE 24C that maps the GVPN2 332C to the GPPN3 334D.

To further explain the example of FIG. 6, suppose the guest OS page tables 23 and 24 were created by the guest OS 20D of FIG. 5. Suppose further that the first guest virtual address space 330 is used by a first guest application and the second guest virtual address space 332 is used by a second guest application, where the first and second guest applications are applications 40G of FIG. 5. Thus, when the guest OS 20D allows the first guest application to run, it configures the virtual system hardware 310C so that the MMU 316C uses the first guest OS page table 23 for address translations; and, when the guest OS 20D allows the second guest application to run, it configures the virtual system hardware 310C so that the MMU 316C uses the second guest OS page table 24 for address translations. For example, in an x86 system, the guest OS 20D attempts to write an appropriate address to a virtual CR3 (Control Register 3) to activate either the guest OS page table 23 or the guest OS page table 24. In this case, if the first guest application generates an attempted memory access to the GVPN0 330A, the MMU 316C in the virtual system hardware 310C maps the virtual address to the GPPN0 334A based on the PTE 23A; if the first guest application generates an attempted memory access to the GVPN1 330B, the MMU 316C maps the virtual address to the GPPN1 334B based on the PTE 23B; and, if the first guest application generates an attempted memory access to the GVPN2 330C, the MMU 316C maps the virtual address to the GPPN2 334C based on the PTE 23C. On the other hand, if the second guest application generates an attempted memory access to the GVPN0 332A, the MMU 316C maps the virtual address to the GPPN0 334A based on the PTE 24A; if the second guest application generates an attempted memory access to the GVPN3 332D, the MMU 316C maps the virtual address to the GPPN1 334B based on the PTE 24B; and, if the second guest application generates an attempted memory access to the GVPN2 332C, the MMU 316C maps the virtual address to the GPPN3 334D based on the PTE 24C.

Address Mapping by Virtualization Software

Figure 7:
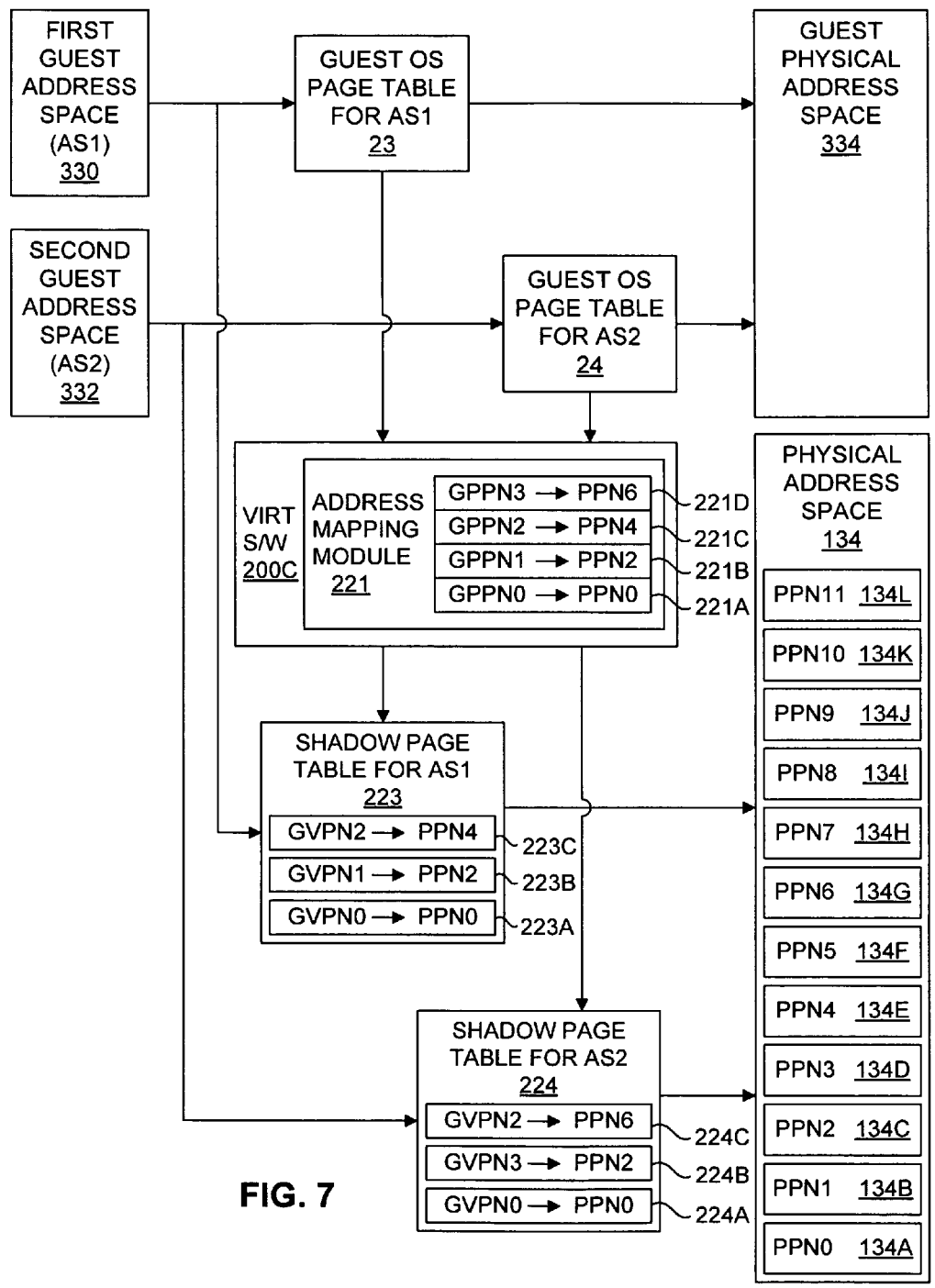
FIG. 7 illustrates the mapping of guest virtual addresses to actual physical addresses in a virtual computer system.

FIG. 7 extends the example of address mapping that was begun in FIG. 6 to show the mapping of guest virtual addresses by virtualization software 200C to an actual physical address space 134 of a physical computer system. The virtualization software 200C of FIG. 7 could be the virtualization software 200X of FIG. 3, or the virtualization software 200Y of FIG. 4, or the virtualization software 200B of FIG. 5. FIG. 7 shows the same elements that are shown in FIG. 6, namely, the first guest virtual address space (AS1) 330, the second guest virtual address space (AS2) 332, the first guest OS page table 23, the second guest OS page table 24 and the guest physical address space 334. FIG. 7 does not show the details of these elements, but these details may be assumed to be the same as shown in FIG. 6. FIG. 7 shows the physical address space 134 as containing a set of twelve physical memory pages, namely a PPN0 134A, a PPN1 134B, a PPN2 134C, a PPN3 134D, a PPN4 134E, a PPN5 134F, a PPN6 134G, a PPN7 134H, a PPN8 134I, a PPN9 134J, a PPN10 134K, and a PPN11 134L.

FIG. 7 also shows an address mapping module 221, which may be substantially the same as the address mapping module 220B of FIG. 5. The address mapping module 221 is created by the virtualization software 200C and provides mappings from the guest physical address space 334 to the actual physical address space 134, providing mappings from GPPNs to PPNs. Specifically, the address mapping module 221 contains four entries or mappings, namely a first entry 221A that maps the GPPN0 334A to the PPN0 134A, a second entry 221B that maps the GPPN1 334B to the PPN2 134C, a third entry 221C that maps the GPPN2 334C to the PPN4 134E, and a fourth entry 221D that maps the GPPN3 334D to the PPN6 134G. What this means is that the code and/or data that the guest OS believes to be stored in the GPPN0 334A is actually stored in the PPN0 134A; the code and/or data that the guest OS believes to be stored in the GPPN1 334B is actually stored in the PPN2 134C; the code and/or data that the guest OS believes to be stored in the GPPN2 334C is actually stored in the PPN4 134E; and the code and/or data that the guest OS believes to be stored in the GPPN3 334D is actually stored in the PPN6 134G.

FIG. 7 also shows a first shadow page table 223 for mapping addresses from the first guest virtual address space 330 to the actual physical address space 134, and a second shadow page table 224 for mapping addresses from the second guest virtual address space 332 to the physical address space 134.

The shadow page tables 223 and 224 may be substantially the same as the shadow page tables 222B of FIG. 5. The entries in the shadow page table 223 are derived from the entries in the guest OS page table 23 and the entries in the address mapping module 221, while the entries in the shadow page table 224 are derived from the entries in the guest OS page table 24 and the entries in the address mapping module 221. Specifically, if a guest OS page table maps a first GVPN to a first GPPN, and an address mapping module maps the first GPPN to a first PPN, then the corresponding shadow page table will generally map the first GVPN to the first PPN. For example, the guest OS page table 23 indicates that the GVPN0 330A maps to the GPPN0 334A, and the address mapping module 221 indicates that the GPPN0 334A maps to the PPN0 134A, so the shadow page table 223 should generally contain a PTE that maps the GVPN0 330A to the PPN0 134A. Thus, as shown in FIG. 7, the first shadow page table 223 contains three mappings or PTEs mapping GVPNs to PPNs, namely, a PTE 223A that maps the GVPN0 330A to the PPN0 134A, a PTE 223B that maps the GVPN1 330B to the PPN2 134C, and a PTE 223C that maps the GVPN2 330C to the PPN4 134E. The second shadow page table 224 also contains three PTEs, mapping GVPNs to PPNs, namely, a PTE 224A that maps the GVPN0 332A to the PPN0 134A, a PTE 224B that maps the GVPN3 332D to the PPN2 134C, and a PTE 224C that maps the GVPN2 332C to the PPN6 134G.

To further explain the example of FIG. 7, suppose the scenario described above, in which the guest OS page tables 23 and 24 were created by the guest OS 20D of FIG. 5 and the first guest virtual address space 330 is used by a first guest application and the second guest virtual address space 332 is used by a second guest application, is extended so that the address mapping module 221 and the shadow page tables 223 and 224 are created by the memory manager 256B of FIG. 5. When the guest OS 20D attempts to activate the first guest OS page table 23 before allowing the first guest application to run, the virtualization software 200C intercepts the attempted activation and, instead, activates the first shadow page table 223; while, when the guest OS 20D attempts to activate the second guest OS page table 24 before allowing the second guest application to run, the virtualization software 200C intercepts the attempted activation and, instead, activates the second shadow page table 224. In this case, if the first guest application generates an attempted memory access to the GVPN0 330A, the MMU 116C in the physical system hardware 100C maps the virtual address to the PPN0 134A based on the PTE 223A; if the first guest application generates an attempted memory access to the GVPN1 330B, the MMU 116C maps the virtual address to the PPN2 134C based on the PTE 223B; and, if the first guest application generates an attempted memory access to the GVPN2 330C, the MMU 116C maps the virtual address to the PPN4 134E based on the PTE 223C. On the other hand, if the second guest application generates an attempted memory access to the GVPN0 332A, the MMU 116C maps the virtual address to the PPN0 134A based on the PTE 224A; if the second guest application generates an attempted memory access to the GVPN3 332D, the MMU 116C maps the virtual address to the PPN2 134C based on the PTE 224B; and, if the second guest application generates an attempted memory access to the GVPN2 332C, the MMU 116C maps the virtual address to the PPN6 134G based on the PTE 224C.

Establishing an Isolated Execution Environment

Figure 8:
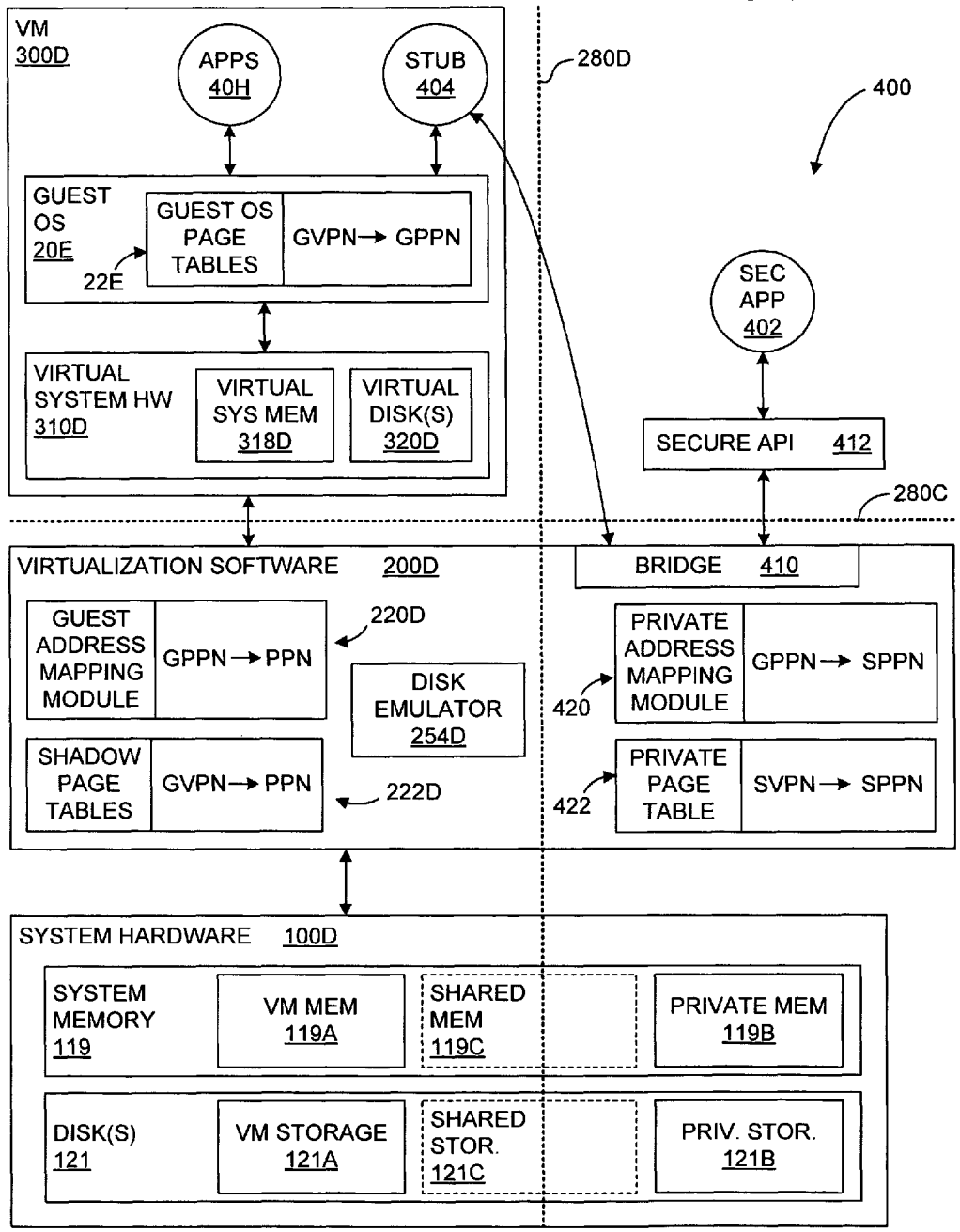
FIG. 8 illustrates a first embodiment of the invention, in which a secure application is isolated from other software modules in a VM by using private shadow address mappings in a private shadow page table.

FIGS. 3 and 4 illustrate two different general configurations that are used in the existing virtualization products of VMware, Inc. FIGS. 5, 6 and 7, and the example depicted therein, illustrate the mapping of guest virtual addresses in existing virtual computer systems, such as the existing virtualization products of VMware, Inc. FIG. 8, however, proceeds to illustrate a first embodiment of this invention, in which an isolated execution environment (IEE) is established within a virtual computer system. This first embodiment of the invention is referred to as an "isolated execution" embodiment or a "single IEE" embodiment.

Much of what is illustrated in FIG. 8 may be substantially the same as corresponding elements that have been described above, in connection with FIGS. 3 to 7. Thus, FIG. 8 shows a system hardware 100D, which includes a system memory 119 and one or more disks 121. The system hardware 100D may be substantially the same as the system hardware 100X of FIG. 3, the system hardware 100Y of FIG. 4, or the system hardware 100C of FIG. 5. FIG. 8 also shows virtualization software 200D, which includes a guest address mapping module 220D and a set of shadow page tables 222D. Except as described below, the virtualization software 200D may be substantially the same as the virtualization software 200X of FIG. 3, the virtualization software 200Y of FIG. 4, or the virtualization software 200B of FIG. 5. The guest address mapping module 220D may be substantially the same as the address mapping module 220B of FIG. 5, and the shadow page tables 222D may be substantially the same as the shadow page tables 222B of FIG. 5.

FIG. 8 also shows a VM 300D, which includes a virtual system hardware 310D, a guest OS 20E, one or more guest OS page tables 22E, and one or more applications 40H. Except as described below, the VM 300D may be substantially the same as the VM 300X of FIG. 3, the VM 300Y of FIG. 4, or the VM 300C of FIG. 5. The virtual system hardware 310D may be substantially the same as the virtual system hardware 310X of FIG. 3, the virtual system hardware 310Y of FIG. 4 or the virtual system hardware 310C of FIG. 5. The guest OS 20E may be substantially the same as the guest OS 20X of FIG. 3, the guest OS 20Y of FIG. 4, or the guest OS 20D of FIG. 5. The guest OS page tables 22E may be substantially the same as the guest OS page tables 22D of FIG. 5. Also, the applications 40H may be substantially the same as the applications 40X of FIG. 3, the applications 40Y of FIG. 4 or the applications 40G of FIG. 5. The virtual system hardware 310D also includes a virtual system memory 318D and one or more virtual disks 320D. The virtual system memory 318D may be substantially the same as the virtual memory 318X of FIG. 3, the virtual memory 318Y of FIG. 4, or the virtual memory of FIG. 5 (not shown). The virtual disk(s) 320D may be substantially the same as the virtual disk 320X of FIG. 3 or the virtual disk 320Y of FIG. 4.

All of the elements of FIG. 8 that have been identified thus far are generally found in existing virtual computer systems. These elements (and other elements that are not illustrated for simplicity) generally implement a virtual computer system that may be substantially the same as existing virtual computer systems. The virtualization software 200D supports a VM 300D that may have substantially the same characteristics as existing VMs, such as the VMs that are supported by the virtualization products of VMware, Inc. Thus, for example, the VM 300D may be a virtualization of an ordinary x86 computer; the guest OS 20E may be an ordinary, general-purpose OS, such as a Windows OS or a Linux OS; and the applications 40H may be ordinary applications that are designed to run on the OS 20E. Everything that has been described thus far, relative to FIG. 8, may comprise a general-purpose virtual computer system on which a wide variety of system-level software and application level software may run.

As described above, such a general-purpose virtual computer system does not provide a secure environment for software execution. If malicious software is able to execute within the VM 300D, it will generally be able to compromise all the software within the VM, including the guest OS 20E and all the applications 40H. As described above, however, the virtualization software 200D establishes a virtualization barrier 280C between itself and the VM 300D, which generally provides better security and more effective isolation between multiple software modules than a general OS provides. Thus, even if malicious software is able to compromise all the software modules within the VM 300D, it is still not likely to be able to penetrate the virtualization barrier 280C and compromise the virtualization software 200D.

The virtualization software 200D also establishes a second virtualization barrier 280D, as shown in FIG. 8. This second virtualization barrier 280D isolates the ordinary virtual computer system described thus far from an isolated execution environment (IEE) 400. One or more applications may execute in the IEE, and the virtualization barrier 280D isolates these applications from the software modules in the VM 300D. Applications that execute within the IEE 400 are referred to herein as "secure applications", not because the applications themselves necessarily implement any security features, but because they are made more secure by the operation of the virtualization barrier 280D. Thus, for example, FIG. 8 shows a secure application 402, which may generally be an ordinary application that can run in other execution environments. For example, the secure application 402 may be an application that could also be run in the VM 300D. Alternatively, the secure application 402 may be customized in one or more ways for execution in the IEE 400.

As described below, the virtualization software 200D uses a private address mapping module 420 and a private shadow page table 422 to effectively provide the secure application 402 with its own private physical memory 119B, which is isolated from the software modules in the VM 300D. In effect, the virtualization software 200D divides the system memory 119 into a VM memory 119A for use by the VM 300D and a private memory 119B for use by the secure application 402. However, the system memory 119 may be ordinary physical memory as found in a conventional physical computer system, and there need not be any physical distinction whatsoever between the VM memory 119A and the private memory 119B. The system memory 119 may comprise one or more physical components that implement a contiguous or noncontiguous physical address space, comprising a number of physical memory pages, where the physical characteristics of the individual memory pages may be indistinguishable from one another. A first arbitrary selection of contiguous or non-contiguous memory pages in the system memory 119 may constitute the VM memory 119A, and a second, arbitrary, mutually exclusive selection of contiguous or noncontiguous memory pages in the system memory 119 may constitute the private memory 119B. Also, the particular physical memory pages that constitute the VM memory 119A and those that constitute the private memory 119B may vary over time. Also, the system memory 119 typically includes additional physical memory pages that are used by the virtualization software 200D or by other software modules running on the system hardware 100D.

Also, in some embodiments of the invention, one or more memory pages within the system memory 119 may be accessible to both the secure application 402 and the software modules in the VM 300D. Thus, FIG. 8 also shows the system memory 119 as including an optional shared memory 119C.

Figure 9A:
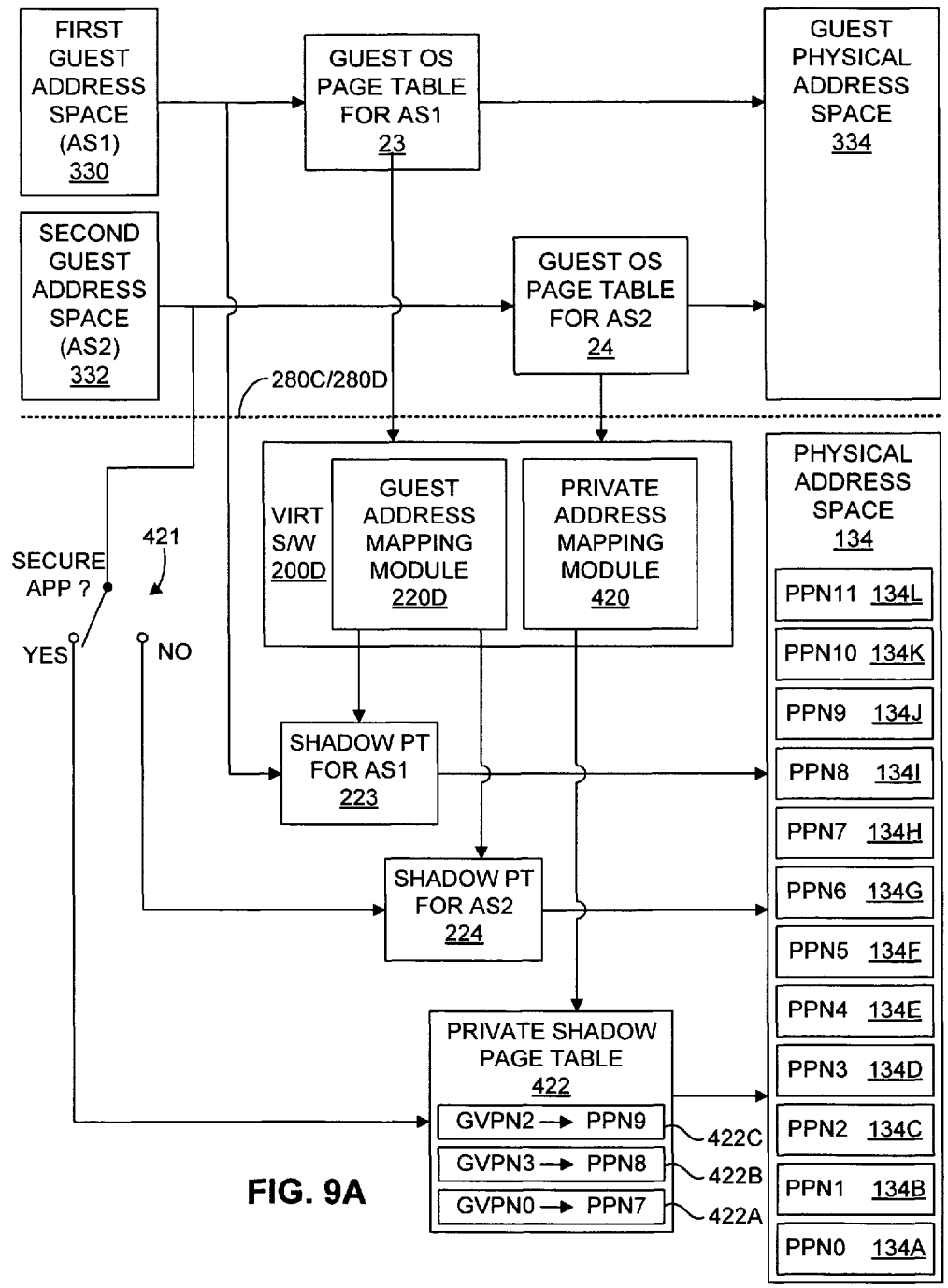
FIG. 9A illustrates the mapping of guest virtual addresses to actual physical addresses, using the private shadow page table of FIG. 8 when the virtual addresses are issued by the secure application.

The use of the private address mapping module 420 and the private shadow page table 422 to isolate the private memory 119B from the software modules in the VM 300D is illustrated in FIGS. 9A and 96. These figures extend the example of address mapping that was begun in FIGS. 6 and 7, and they apply the extended example to the virtual computer system of FIG. 8 to show how the virtualization software 200D maps virtual addresses to a physical address space of a computer system.

FIG. 9A shows many of the same elements that are shown in FIGS. 6 and 7, namely, the first guest virtual address space (AS1) 330, the second guest virtual address space (AS2) 332, the first guest OS page table 23, the second guest OS page table 24, the guest physical address space 334, the first shadow page table 223, the second shadow page table 224 and the physical address space 134. FIG. 9A does not show the details of most of these elements, but these details may be assumed to be the same as shown in FIGS. 6 and 7. FIG. 9A does show the physical address space 134 as containing the same set of twelve physical memory pages as shown in FIG. 7, namely the PPN0 134A, the PPN1 134B, the PPN2 134C, the PPN3 134D, the PPN4 134E, the PPN5 134F, the PPN6 134G, the PPN7 134H, the PPN8 134I, the PPN9 134J, the PPN10 134K, and the PPN11 134L. FIG. 9A also shows the same virtualization software 200D as is shown in FIG. 8, including the guest address mapping module 220D, the private address mapping module 420 and the private shadow page table 422.

In this case, the guest OS page tables 22E of FIG. 8 comprise the first guest OS page table 23 and the second guest OS page table 24. The guest OS 20E creates the first guest OS page table 23 to map addresses from the first guest virtual address space 330 to the guest physical address space 334; and the guest OS 20E creates the second guest OS page table 24 to map addresses from the second guest virtual address space 332 to the guest physical address space 334.

Figure 9B:
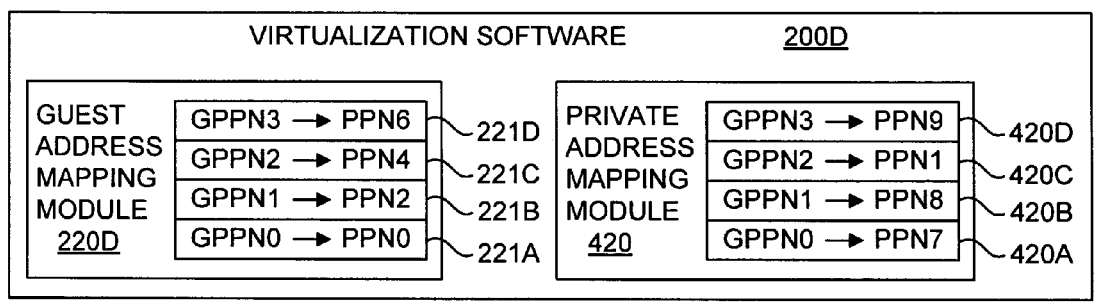
FIG. 9B illustrates a guest address mapping module and a private address mapping module of FIG. 9A.

The virtualization software 200D creates the guest address mapping module 220D to map addresses in the guest physical address space 334 to the actual physical address space 134. The contents of the guest address mapping module 220D are shown in FIG. 9B, and, for this example, these contents are the same as the contents of the address mapping module 221 of FIG. 7. Thus, the guest address mapping module 220D contains four entries or mappings, namely a first entry 221A that maps the GPPN0 334A to the PPN0 134A, a second entry 221B that maps the GPPN1 334B to the PPN2 134C, a third entry 221C that maps the GPPN2 334C to the PPN4 134E, and a fourth entry 221D that maps the GPPN3 334D to the PPN6 134G. Again, what this means is that the code and/or data that the guest OS believes to be stored in the GPPN0 334A is actually stored in the PPN0 134A; the code and/or data that the guest OS believes to be stored in the GPPN1 334B is actually stored in the PPN2 134C; the code and/or data that the guest OS believes to be stored in the GPPN2 334C is actually stored in the PPN4 134E; and the code and/or data that the guest OS believes to be stored in the GPPN3 334D is actually stored in the PPN6 134G.

The virtualization software 200D also creates the first shadow page table 223 for mapping addresses from the first guest virtual address space 330 to the physical address space 134 and the second shadow page table 224 for mapping addresses from the second guest virtual address space 332 to the physical address space 134. Again, the entries in the shadow page table 223 are derived from the entries in the guest OS page table 23 and the entries in the guest address mapping module 220D, and the entries in the shadow page table 224 are derived from the entries in the guest OS page table 24 and the entries in the guest address mapping module 220D, both in the same manner as described above.

All of the elements of FIG. 9A that have been described thus far (everything in FIG. 9A except for the private address mapping module 420, the private shadow page table 422 and a software switch 421) operate in substantially the same manner as the corresponding elements of FIG. 7. Thus, suppose that a scenario is applied to FIG. 9A that is analogous to the scenario that was applied to FIG. 7 above, so that the guest OS page tables 23 and 24 are created by the guest OS 20E of FIG. 8, the first guest virtual address space 330 is used by a first guest application and the second guest virtual address space 332 is used by a second guest application, where the first and second guest applications are applications 40H in the VM 300D, and the guest address mapping module 220D and the shadow page tables 223 and 224 are created by a memory manager in the virtualization software 200D. Again, when the guest OS 20E attempts to activate the first guest OS page table 23 before allowing the first guest application to run, the virtualization software 200D activates the first shadow page table 223 instead; and, when the guest OS 20E attempts to activate the second guest OS page table 24 before allowing the second guest application to run, the virtualization software 200D activates the second shadow page table 224 instead. In this case, if the first guest application generates an attempted memory access to the GVPN0 330A, a MMU (not shown) in the physical system hardware 100D maps the virtual address to the PPN0 134A based on the PTE 223A (see FIG. 7); if the first guest application generates an attempted memory access to the GVPN1 330B, the MMU maps the virtual address to the PPN2 134C based on the PTE 223B; and, if the first guest application generates an attempted memory access to the GVPN2 330C, the MMU maps the virtual address to the PPN4 134E based on the PTE 223C. On the other hand, if the second guest application generates an attempted memory access to the GVPN0 332A, the MMU maps the virtual address to the PPN0 134A based on the PTE 224A; if the second guest application generates an attempted memory access to the GVPN3 332D, the MMU maps the virtual address to the PPN2 134C based on the PTE 224B; and, if the second guest application generates an attempted memory access to the GVPN2 332C, the MMU maps the virtual address to the PPN6 134G based on the PTE 224C.

In the example of FIGS. 9A and 9B, the secure application 402 uses the second guest virtual address space 332, sharing the virtual address space with one or more software modules within the VM 300D, including possibly the guest OS 20E and one or more applications 40H. However, using this invention, the secure application 402 generally does not share any of the actual physical address space 134 with any software module within the VM 300D.

To accomplish this, the virtualization software 200D creates the private address mapping module 420, which is a corresponding, alternate data structure to the guest address mapping module 220D, and the private shadow page table 422, which is a corresponding, alternate data structure to the second shadow page table 224. Like the guest address mapping module 220D, the private address mapping module 420 provides mappings from the guest physical address space 334 to the actual physical address space 134, providing mappings from GPPNs to PPNs. However, the private address mapping module 420 maps the GPPNs of the guest physical address space 334 to a set of PPNs of the actual physical address space 134 that is generally mutually exclusive with the PPNs to which the guest address mapping module 220D maps to guest physical address space 334. Specifically, as shown in FIG. 9B, the private address mapping module 420 contains four entries or mappings, namely a first entry 420A that maps the GPPN0 334A to the PPN7 134H, a second entry 420B that maps the GPPN1 334B to the PPN8 134I, a third entry 420C that maps the GPPN2 334C to the PPN1 134B, and a fourth entry 420D that maps the GPPN3 334D to the PPN9 134J.

Also, like the second shadow page table 224, the private shadow page table 422 provides mappings from the second guest virtual address space 332 to the physical address space 134, providing mappings from GVPNs to PPNs. The entries in the private shadow page table 422 are derived from the entries in the guest OS page table 24 and the entries in the private address mapping module 420 in the same manner that the entries in the shadow page table 224 are derived from the entries in the guest OS page table 24 and the entries in the guest address mapping module 220D. Thus, for example, the guest OS page table 24 indicates that the GVPN0 332A maps to the GPPN0 334A, and the private address mapping module 420 indicates that the GPPN0 334A maps to the PPN7 134H, so the private shadow page table 422 should generally contain a PTE that maps the GVPN0 332A to the PPN7 134H. Thus, as shown in FIG. 9A, the private shadow page table 422 contains three PTEs, namely, a PTE 422A that maps the GVPN0 332A to the PPN7 134H, a PTE 422B that maps the GVPN3 332D to the PPN8 134I, and a PTE 422C that maps the GVPN2 332C to the PPN9 134J.

Now when a software module executes that is using the first guest virtual address space 330, the virtualization software 200D activates the first shadow page table 223, so that the MMU in the system hardware 100D uses this page table for address translations. When a software module from within the VM 300D executes that is using the second guest virtual address space 332, the virtualization software 200D activates the second shadow page table 224. When the secure application 402 executes, the virtualization software 200D activates the private shadow page table 422. Thus, when the second guest address space 332 is used, the virtualization software 200D effectively implements a software switch 421 as illustrated in FIG. 9A. If the secure application 402 is executing, then the private shadow page table 422 is used to translate virtual addresses to physical addresses, while, if a software module within the VM 300D is executing (and using the second guest virtual address space), then the second shadow page table 224 is used to translate virtual addresses to physical addresses.

The private address mapping module 420 indicates the PPNs in the physical address space 134 that contain the code and/or data of the secure application 402. Thus, all of the PPNs to which the private address mapping module 420 maps the guest physical address space 334 constitute the private memory 119B, assuming that there is no shared memory 119C. In the example of FIGS. 9A and 9B, the private memory 119B comprises the memory pages PPN7 134H, PPN1 134B, PPN8 134I and PPN9 134J. However, there is actually no need for the entry 420C in the private address mapping module 420, mapping the GPPN2 334C to the PPN1 134B, because the private address mapping module 420 only applies to the second guest virtual address space 332 and there is no mapping in the second guest virtual address space 332 to the GPPN2 334C (see the second guest OS page table 24 in FIG. 6). Thus, the private memory 119B can actually comprise only the memory pages PPN7 134H, PPN8 134I and PPN9 134J.

The guest address mapping module 220D indicates the PPNs in the physical address space 134 that contain the code and/or data of the software modules within the VM 300D. Thus, all of the PPNs to which the guest address mapping module 220D maps the guest physical address space 334 constitute the VM memory 119A, again assuming that there is no shared memory 119C. In the example of FIGS. 9A and 9B, the VM memory 119A comprises the memory pages PPN0 134A, PPN2 134C, PPN4 134E and PPN6 134G.

The memory pages that constitute the VM memory 119A and the memory pages that constitute the private memory 119B are mutually exclusive because the PPNs to which the guest address mapping module 220D maps and the PPNs to which the private address mapping module 420 maps are mutually exclusive. So long as this relationship holds and the shadow page tables 223, 224 and 422 are configured and used as described above, no software modules within the VM 300D will be able to access the private memory 119B of the secure application 402. The virtualization barriers 280C and 280D protect the virtualization software 200D and these data structures from the software modules in the VM 300D to ensure that this situation is maintained.

Suppose again that malicious software is able to execute within the VM 300D. The malicious software may gain full access to the guest OS page tables 23 and 24, and it may then use the guest OS page tables 23 and 24 to gain access to any memory page in the guest physical address space 334. The guest physical address space 334 constitutes the entire system memory 318D of the VM 300D, which is the only memory that is "visible" from within the VM 300D. As long as the virtualization software 200D is well designed and well implemented, there will be no way for any software in the VM 300D to determine that there is any memory in the computer system besides the guest system memory 318D. And yet, accessing the entire system memory 318D does not give any access to the private memory 119B of the secure application 402.

This isolation, which is achieved through the virtualization of the system memory, and which is represented by the virtualization barriers 280C and 280D, is further illustrated in FIG. 9A. Malicious software within the VM 300D may obtain full access to the guest virtual address spaces 330 and 332, the guest OS page tables 23 and 24, and the guest physical address space 334. However, the virtualization barriers 280C and 280D prevent such malicious software from accessing or directly affecting the operation of the virtualization software 200D, the guest address mapping module 220D, the private address mapping module 420, the software switch 421, and the shadow page tables 223, 224 and 422, all of which restrict access to the physical address space 134 as described above. So long as the virtualization barriers 280C and 280D are able to protect these software modules and data structures, the private memory 119B will be effectively isolated from all software within the VM 300D.

Also, although the isolated execution embodiment illustrated in FIGS. 8, 9A and 9B involves the use of specific data structures and software modules to maintain the data needed to isolate the private memory 119B, other data structures and software modules could be used in other embodiments. For example, the guest address mapping module 220D and the private address mapping module 420 could be combined into a single software module or they could use a single data structure, so long as some means is provided to maintain distinct, mutually exclusive mappings for the VM 300D and the IEE 400. Alternatively, the guest address mapping module 220D and/or the private address mapping module 420 could be further divided into a larger number of software modules or data structures. Also, in other embodiments, the shadow mappings contained in the shadow page tables 223, 224 and 422 may be configured into other arrangements and/or into other data structures.

More generally, a first set of hardware address mappings is used for the VM 300D and a second set of hardware address mappings is used for the IEE 400. In addition, for this embodiment, a first set of virtualization address mappings is used for the VM 300D and a second set of virtualization address mappings is used for the IEE 400. In other embodiments, the information contained in the multiple sets of virtualization address mappings may be determined, retained and/or conveyed in other manners.

Returning now to FIG. 8, like the system memory 119, the disk 121 in the physical system hardware 100D is also divided into a VM storage area 121A for use by software modules in the VM 300D, a private storage area 121B for use by the secure application 402, and an optional shared storage area 121C that is accessible to both the secure application 402 and the software modules in the VM 300D. As is well known, storage disks and other secondary storage devices are typically divided into a number of data blocks, with a unique block number being associated with each block on a disk. Also, different disks in a system are typically identified by different disk numbers or names. Thus, the one or more disks 121 may comprise a number of data blocks, each of which may be uniquely identified by a disk number or name, combined with a block number. The following description assumes that the disk(s) 121 constitute only a single disk for simplicity, although it can also be applied to systems containing multiple disks or other secondary storage devices.

So, the virtualization software 200D divides the blocks of the disk 121 into the VM storage 121A, the private storage 121B, and possibly the shared storage 121C. The blocks of the VM storage 121A and the blocks of the private storage 121B may each be contiguous or noncontiguous, and the blocks in each of these storage areas are generally mutually exclusive. Also, the disk 121 will typically include additional data blocks that are not included in the VM storage 121A, the private storage 121B or the shared storage 121C; these additional blocks may be used by other software entities running on the system hardware, such as the virtualization software 200D.

As described above, the virtualization software 200D provides software modules in the VM 300D with access to secondary storage by creating one or more virtual disks 320D in the virtual system hardware 310D, which may be substantially the same as the virtual disk 320X of FIG. 3 or the virtual disk 320Y of FIG. 4. This description also assumes that the virtual disk(s) 320D constitute only a single disk for simplicity. The virtual disk 320D is also divided into a number of blocks, with each block having a unique block number.

The software within the VM 300D can access a particular block in the virtual disk 320D by specifying an appropriate block number. The virtualization software 200D then maps this virtual block number to a corresponding physical block number in the disk 121. This mapping of data blocks is substantially similar to the mapping of memory addresses described above, except that, for the mapping of data blocks, there is no need to translate from a guest virtual address to a guest physical address within the VM 300D.

To isolate the private storage 121B from the software modules in the VM 300D, the virtualization software 200D uses a method that may be substantially the same as the method described above for isolating the private memory 119B from the software modules in the VM 300D. This method may be performed, in particular, by the disk emulator 254D, which may be substantially the same as a device emulator 254X of FIG. 3 or a device emulator 254Y of FIG. 4. The device emulator 254D may also use data structures that are comparable to the data structures used in isolating the private memory 119B from the software modules in the VM 300D. Thus, the device emulator 254D may create and maintain a guest mapping data structure 255 (see FIG. 10) and a private mapping data structure 257 (see FIG. 10), each of which contains mappings from virtual block numbers to physical block numbers, with the guest mapping data structure 255 mapping to the physical data blocks that contain the code and/or data of the software modules within the VM 300D (i.e. mapping to the VM storage 121A) and the private mapping data structure 257 mapping to the physical data blocks that contain the code and/or data of the secure application 402 (i.e. mapping to the private storage 121B). The disk emulator 254D may also write values into the metadata of the disk 121 to indicate for each physical data block, whether it belongs to the VM storage 121A or the private storage 121B, or whether the data block has some other use.

Again, the physical data blocks to which the guest mapping data structure maps and the physical data blocks to which the private mapping data structure maps are generally mutually exclusive to ensure that the VM storage 121A and the private storage 121B are mutually exclusive, except for possible physical data blocks in the optional shared storage area 121C to which both the guest mapping data structure and the private mapping data structure map. When software within the VM 300D is executing, the guest mapping data structure 255 is used, mapping disk accesses to the VM storage 121A. When the secure application 402 is executing, the private mapping data structure 257 is used, mapping disk accesses to the private storage 121B. Again, so long as these two mapping data structures are maintained in a mutually exclusive manner and the operation of the virtualization software 200D is not compromised, no software within the VM 300D will be able to access the private storage area 121B. The virtualization of the secondary storage may be implemented in a manner that ensures that these conditions are satisfied, so that the virtualization software 200D, the guest and private mapping data structures and the private storage 121B are isolated from the software in the VM 300D. This isolation is also represented by the virtualization barriers 280C and 280D of FIG. 8.

A few important issues have yet to be addressed in this description of the isolated execution embodiment of FIGS. 8, 9A and 9B. One such issue is how the configuration of FIGS. 8, 9A and 9B is established. Another is how system services are provided to the secure application 402. Another is how and under what circumstances execution is switched between the IEE 400 and the environment of the VM 300D. Another issue is what communication and interaction there is between the secure application 402 and software modules in the VM 300D, and how this communication and interaction is facilitated, without creating (or while limiting) vulnerabilities to the IEE 400.

The technical literature in the field of computer science is replete with descriptions and explanations of a wide variety of methods and configurations that may be used to address these issues, or similar, analogous issues, in a wide variety of hardware and software implementations. Different techniques may be appropriate in different embodiments of the invention, depending on the particular hardware and software configurations and the relative importance that is placed on a variety of factors, including the degree of security desired and the amount and nature of communication and interaction that is desired between the secure application 402 and the software modules in the VM 300D.

One configuration that may be used to address these issues is also illustrated in FIG. 8. In addition to all of the other components that have been described thus far, FIG. 8 shows an application stub 404, a bridge 410 and a secure API 412. In this particular implementation, one objective is to allow the guest OS 20E to manage hardware resources for the secure application 402, along with managing hardware resources for the applications 40H, without the OS 20E (or other software modules in the VM 300D) having access to the private code and data of the secure application 402 in the private memory 119B and in the private storage 121B. Another objective of this implementation is to minimize changes that need to be made to existing OSs and applications to implement the guest OS 20E, the applications 40H and the secure application 402. In other embodiments of the invention, as mentioned above, the secure application 402 may be substantially different from an ordinary application that can run in a conventional operating environment. For example, an explicit API, such as a hypercall interface, may be established between the secure application 402 and the virtualization software 200D, which may require substantial modifications to the secure application 402.

Suppose initially that the stub 404, the secure application 402 and the secure API 412 have not been loaded into the computer system, but that the bridge 410 is implemented as a part of the virtualization software 200D. A secure installer may be started from outside the VM 300D, so that the installer can interface directly with the virtualization software 200D. The installer may interact with the virtualization software 200D to install the secure API 412 and the secure application 402 into the private storage 121B. The secure application 402 may be linked to the secure API 412 prior to installation, or they may be linked after installation by a secure dynamic loader when the secure application 402 first executes. If the secure API 412 provides functional equivalence to the API of an existing OS, then using the dynamic loader allows an existing application to run in the IEE 400, without even having to recompile the existing application. The installer may also initiate or activate a process within the VM 300D to interact with the guest OS 20E. This process may then obtain space in the VM storage 121A from the guest OS 20E in a conventional manner, and install the stub 404 generally in a conventional manner.

After the stub 404, the secure application 402 and the secure API 412 have been installed, the stub 404, or a portion thereof, may be loaded into the VM memory 119A and it may begin to execute, such as in response to the activation of the stub by a user. The stub 404 may use the second guest virtual address space 332, for example, possibly sharing it with one or more other guest applications 40H. From within the VM 300D, the stub 404 may initiate and support the execution of the secure application 402 through the use of hypervisor calls.

A hypervisor call is a special function that allows select software modules to communicate with the virtualization software 200D through the bridge 410. For example, a software module in the VM 300D, such as the stub 404, may place information into one or more registers or into memory and then execute an instruction that causes a hardware fault, such as an IN or OUT instruction in the current x86 platform, or an instruction such as VMCALL from the new Vanderpool or Virtualization Technology from Intel Corporation. The virtualization software 200D then responds to the hardware fault, obtains the information passed by the stub 404 and reacts accordingly. For example, the virtualization software 200D may switch the hardware context to allow the secure application 402 to execute, and the virtualization software 200D may pass information received from the stub 404 to the secure application 402, using the bridge 410 and the secure API 412. The virtualization software 200D may also communicate with the secure application 402 through the bridge 410 and the secure API 412 for other reasons.

A wide variety of restrictions may be placed on the making of hypervisor calls and on the passing of information using hypervisor calls, depending on the requirements of the implementation. For example, a policy can be enforced that a hypervisor call can only be made through a predefined set of entrances into a special gate page of memory in which all valid hypervisor calls are defined. Also, certain checks can be made on the software module that places a hypervisor call, such as running a hash algorithm on the memory page(s) containing the calling software module, and comparing the outcome of the hash to expected values for software modules that are allowed to make hypervisor calls. As another alternative, hypervisor calls may be permitted only from specific portions of code in the code cache of a binary translation system within the virtualization software 200D, where those specific portions of code are created by the same vendor as the virtualization software and the code is generated and distributed along with the virtualization software 200D, for example. Hypervisor calls can also be secured with other validity checks commonly used in secure communications.

Other software modules within the VM 300D may also interact and/or communicate with the secure application 402 by first interacting and/or communicating with the stub 404 and relying on the stub 404 to relay the interaction and/or communication to the secure application 402. Depending on the implementation, such interaction and/or communication may be limited to the guest OS 20E, or it may be extended to guest applications 40H as well. The range of possibilities for types and amounts of interactions and communications that may be permitted is extensive, depending on the particular implementation.

The secure application 402 may also initiate communications and interactions with other software modules by making system calls using the secure API 412. The secure API 412 may include a library for handling all system calls that are supported by the guest OS 20E, for example, along with separate code to start and finish the secure application 402. The system calls from the secure application 402 are generally reissued as corresponding system calls to be handled by the guest OS 20E, although some of the system calls may be handled by the virtualization software 200D instead.

When the secure application 402 makes a system call that is to be handled by the guest OS 20E, a hypervisor call is first made by the secure API 412 to the virtualization software 200D. The virtualization software 200D stores the current CPU state, and switches to a CPU state that enables the stub 404 to execute. The virtualization software 200D then causes the stub 404 to begin executing at a point where the stub 404 issues a corresponding system call to the guest OS 20E. In addition, if the secure application 402 makes a system call using a memory pointer, the secure API 412 copies the data structure pointed to by the memory pointer (or some portion of memory that includes the data structure) from the private memory 119B to the VM memory 119A, at corresponding locations in the virtual address space.

After the guest OS 20E completes a system call on behalf of the secure application 402 (through the stub 404), the stub 404 makes another hypervisor call to switch execution back to the IEE 400. The virtualization software 200D restores the CPU context of the secure application 402 that was saved before switching to the stub 404. The virtualization software 200D may also update certain registers as part of implementing the system call. For example, a register may contain a return value of the call. Also, if necessary, the secure API 412 copies data representing results of the system call from the VM memory 119A to the private memory 119B. The secure application 402 is now able to continue execution with the system call having been completed just as would normally be expected by the secure application. In this manner, the guest OS 20E and/or the virtualization software 200D may provide a full complement of system services to the secure application 402.

Returning to the process for beginning to execute the stub 404 and the secure application 402, after the stub 404 begins executing, the stub issues a hypervisor call that causes the virtualization software 200D and/or the secure API 412 to begin executing the secure application 402. At least a portion of the secure application 402 is loaded from the private storage 121B to the private memory 119B for execution. The virtualization software 200D also switches the hardware context to that of the IEE 400. In particular, the virtualization software effectively operates the figurative software switch 421 of FIG. 9A to activate the private shadow page table 422, instead of the second shadow page table 224. The secure application 402 then begins to execute.

Figure 10A:
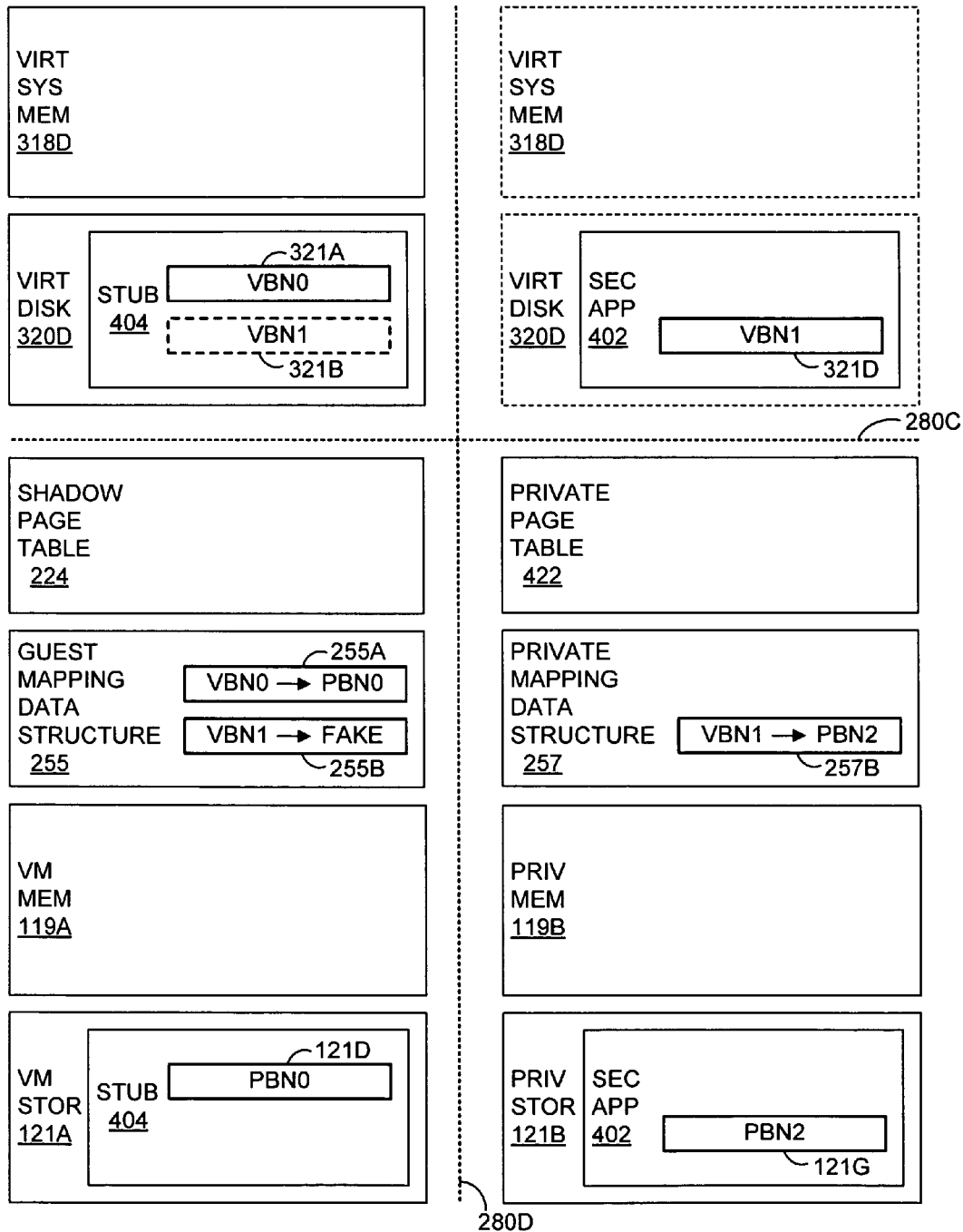
FIGS. 10A, 10B and 10C illustrate the installation, loading and initial execution of a stub and a secure application in a first specific implementation of the embodiment of FIG. 8.
Figure 10B:
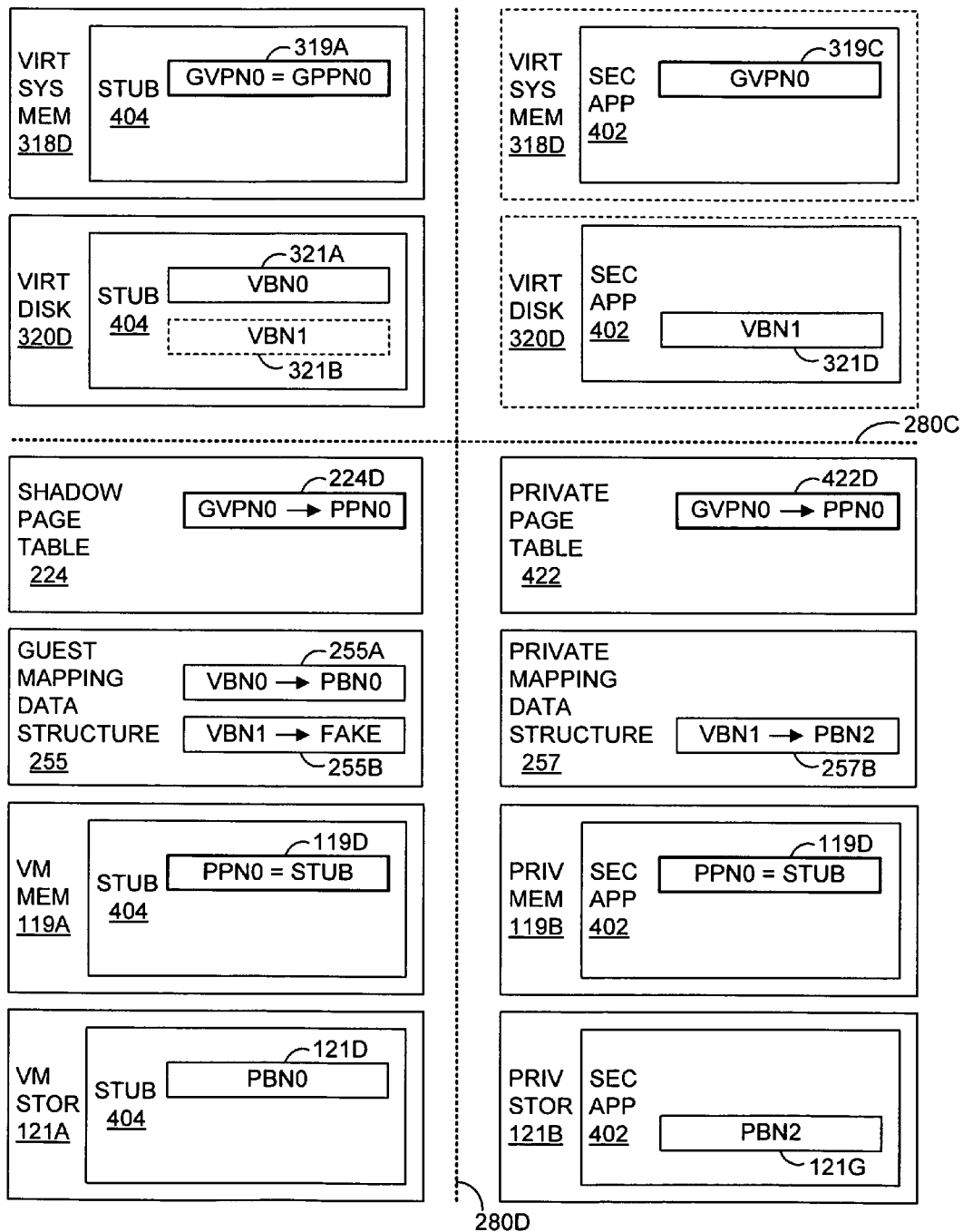
Figure 10C:
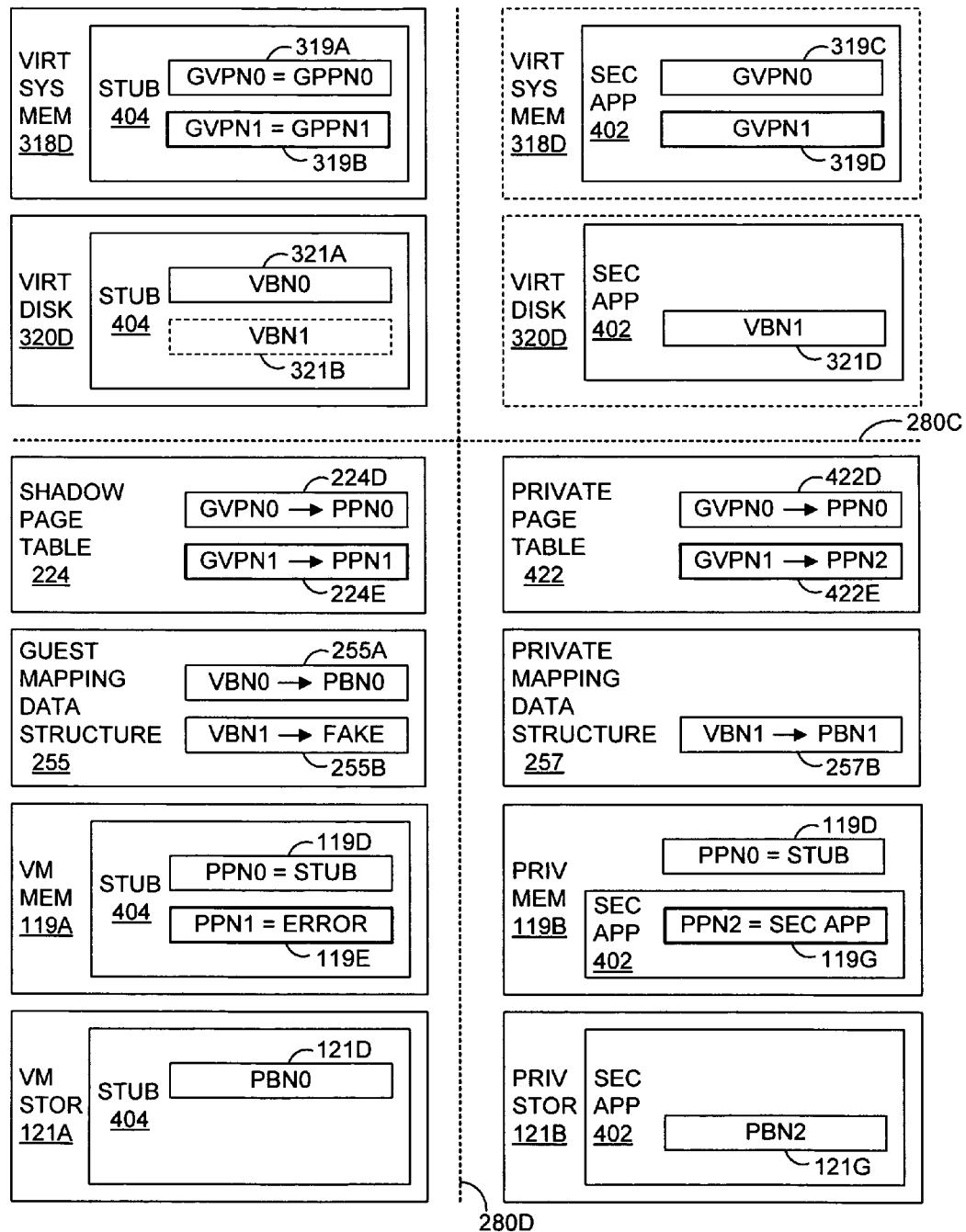
Figure 11A:
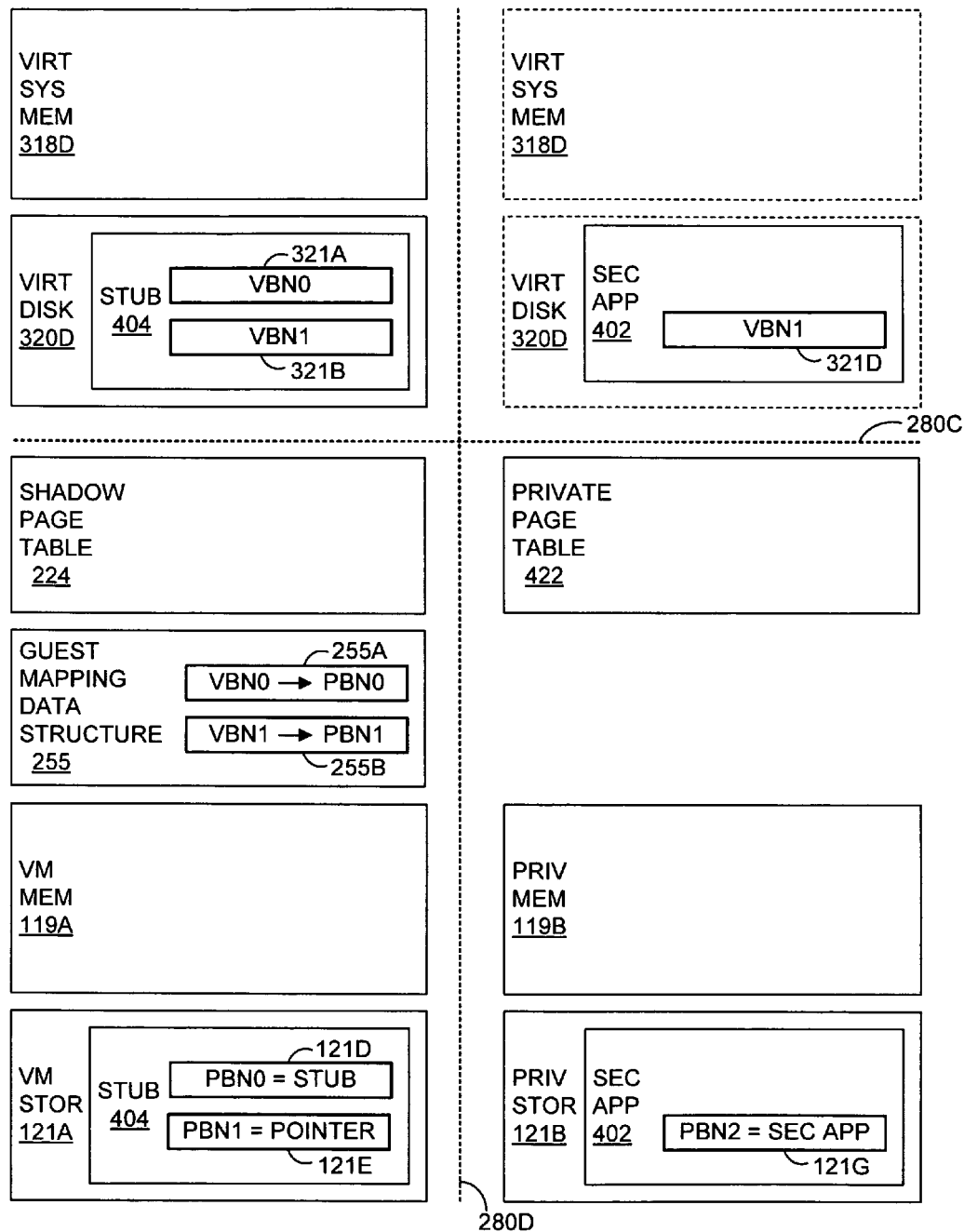
FIGS. 11A, 11B and 11C illustrate the installation, loading and initial execution of a stub and a secure application in a second specific implementation of the embodiment of FIG. 8.
Figure 11B:
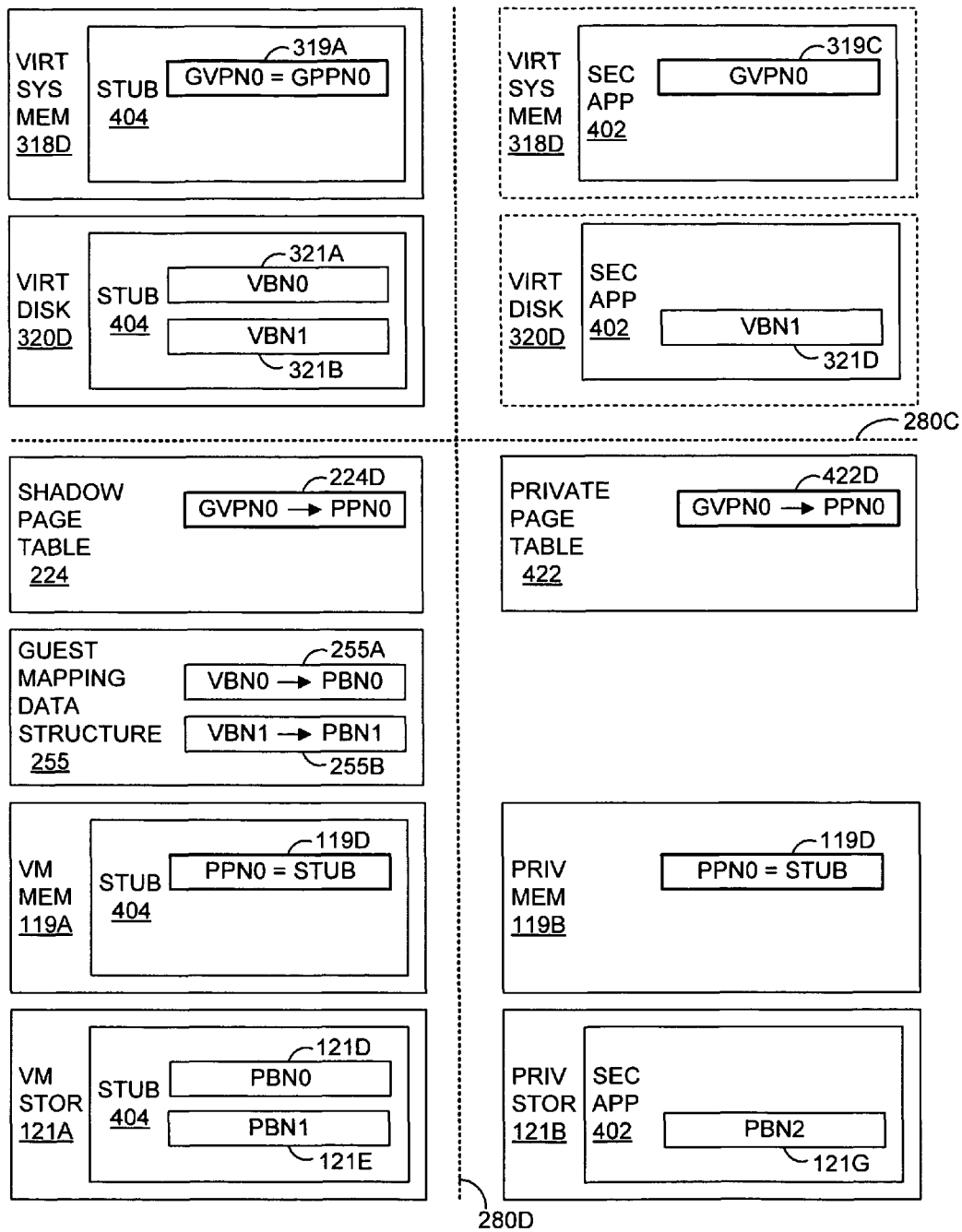
Figure 11C:
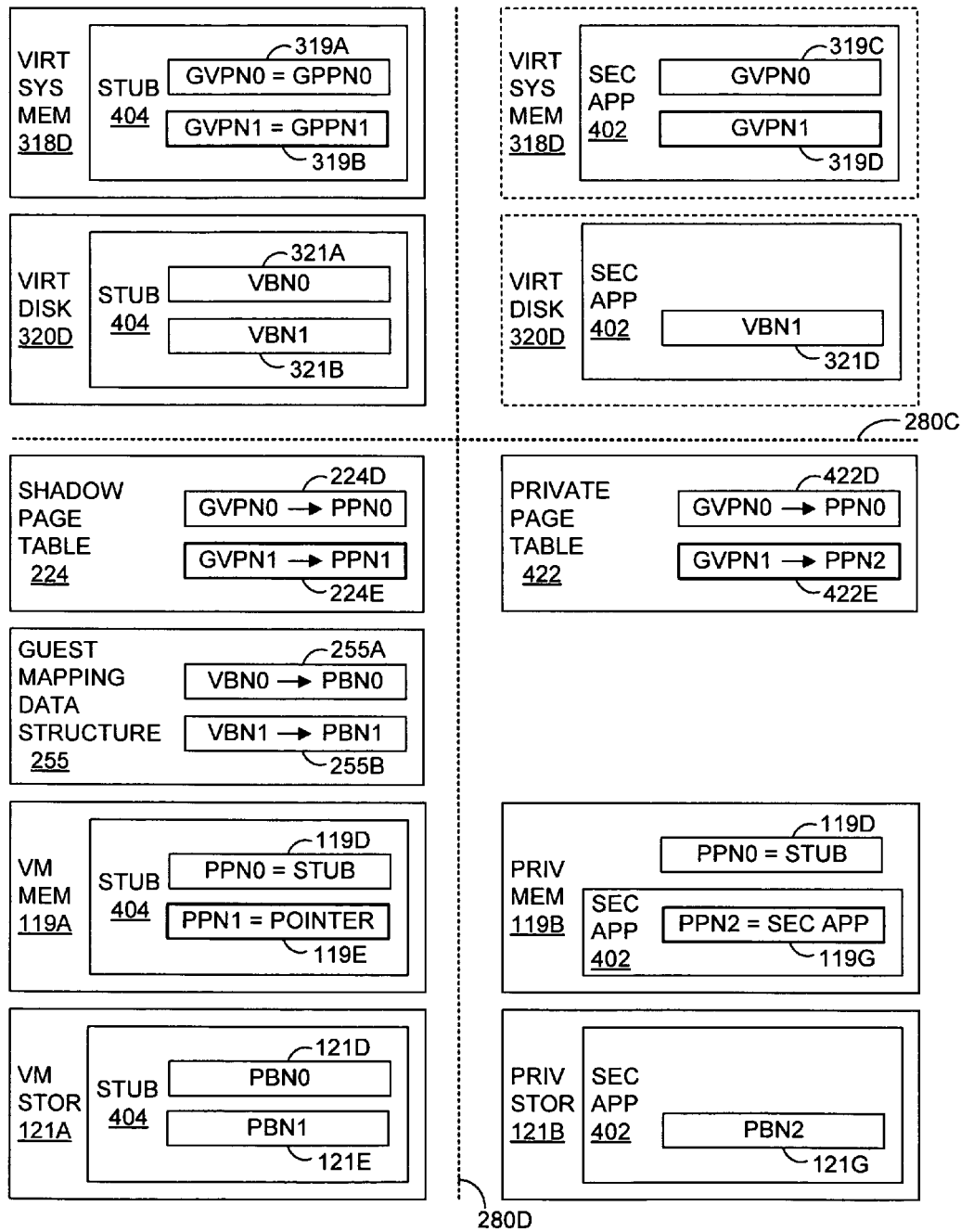

The particular method by which the execution of the stub 404 and the secure application 402 is initiated can also vary substantially in different embodiments of the invention. FIGS. 10A to 10C illustrate a first method for installing, loading and initiating execution of the stub 404 and the secure application 402, while FIGS. 11A to 11C illustrate a second method for installing, loading and initiating execution of the stub 404 and the secure application 402. The isolated execution embodiment of FIGS. 8, 9A and 9B may be considered a more general embodiment that encompasses a number of more specific embodiments. FIGS. 10A to 10C illustrate a first such more specific embodiment, which may be referred to as a dual mapping embodiment, while FIGS. 11A to 11C illustrate a second such more specific embodiment, which may be referred to as an indirection embodiment. The methods of FIGS. 10A to 10C and 11A to 11C are illustrated by stepping through a common, simplified example in which the stub 404 and the secure application 402 are each installed into the disk 121, loaded into the system memory 119, and then executed. The example is simplified by assuming that blocks of the disk 121, blocks of the virtual disk 320D, memory pages of the system memory 119 and memory pages of the virtual system memory 318D are all the same size. Also, it is assumed that the code and data of the stub 404 fits in a single block or page, and that the code and data of the secure application 402 also fits in a single block or page. Also, this example does not consider the installation, loading and execution of the secure API 412, but this can be done along with and in substantially the same manner as the secure application 402.

FIGS. 10A, 10B, 10C, 11A, 11B and 11C all illustrate the virtual disk 320D, into which the guest OS 20E believes the stub 404 is installed, the VM storage 121A, into which the stub 404 is actually installed, and the guest mapping data structure 255 for mapping from the virtual disk 320D to the VM storage 121A when the VM 300D is active. FIGS. 10A, 10B, 10C, 11A, 11B and 11C also illustrate the virtual system memory 318D, into which the guest OS 20E believes the stub 404 is loaded, the VM memory 119A, into which the stub 404 is actually loaded, and the shadow page table 224 for mapping from the guest virtual address space to the VM memory 119A when the VM 300D is active. FIGS. 10A, 10B, 10C, 11A, 11B and 11C also illustrate the private storage 121B, into which the secure application 402 is installed, and FIGS. 10A, 10B and 10C illustrate the private mapping data structure 257 for mapping from the virtual disk 320D to the private storage 121B when the secure application 402 is active. FIGS. 10A, 10B, 10C, 11A, 11B and 11C also illustrate the virtual disk 320D, as seen from within the IEE 400, namely with the secure application 402 appearing to be installed therein. FIGS. 10A, 10B, 10C, 11A, 11B and 11C also illustrate the private memory 119B, into which the secure application 402 is loaded, and the private page table 422 for mapping from the guest virtual address space to the private memory 119B when the secure application 402 is active. FIGS. 10A, 10B, 10C, 11A, 11B and 11C also illustrate the virtual system memory 318D, as seen from within the IEE 400, namely with the secure application 402 appearing to be loaded therein. FIGS. 10A, 10B, 10C, 11A, 11B and 11C also show the virtualization barriers 280C and 280D.

Referring first to FIGS. 10A, 10B and 10C, assume initially that neither the stub 404 nor the secure application 402 have been installed. FIG. 10A illustrates the installation of the stub 404 into the VM storage 121A and the installation of the secure application 402 into the private storage 121B. First, the secure installer initiates or activates a process within the VM 300D, which interfaces with the guest OS 20E to attempt to install the stub 404 into the virtual disk 320D. Although the stub 404 only occupies a single block, the installer process requests two blocks from the guest OS 20E in the virtual disk 320D. Suppose the guest OS 20E allocates a Virtual Block Number 0 (VBN0) 321A and a Virtual Block Number 1 (VBN1) 321B. The installer process then attempts to write the stub 404 into the VBN0 321A. The disk emulator 254D translates this attempted disk write to a corresponding write to the VM storage 121A. Thus, the stub 404 is actually written to a block of the VM storage 121A, such as a block having a Physical Block Number 0 (PBN0) 121D. The disk emulator 254D also adds an entry 255A into the guest mapping data structure 255, mapping the VBN0 321A of the virtual disk 320D to the PBN0 121D of the VM storage 121A.

The installer process does not have any data that needs to be written to the VBN1 321B because the entire stub 404 was written to the VBN0 321A. The installer process may nonetheless attempt to write some sort of data to the VBN1 321B to convince the guest OS 20E that the VBN1 is being used for the stub 404. The disk emulator 254D determines that the data written to the VBN1 321B is not real data, and so the disk emulator 254D does not write the data to any physical block in the disk 121. This determination may be made in a variety of ways. For example, the disk emulator 254D may coordinate with the secure installer. The disk emulator may be aware that the stub 404 is being installed and that the stub only takes up a single block. This way, when the disk emulator 254D sees the installer process attempting to write a second block, it knows that the data of the second block is not real. In any case, upon determining that the data to be written to the VBN1 321B is fake, the disk emulator 254D adds another entry 255B into the guest mapping data structure 255 to indicate that the VBN1 321B is not backed by real data in the physical disk 121.

Next, the secure installer writes the secure application 402 into a block of the private storage 121B, such as into a block having a Physical Block Number 2 (PBN2) 121G. From the perspective of the IEE 400, the secure application 402 occupies the VBN1 of the virtual disk 320D, which is identified as the VBN1 321D in the IEE. Thus, the disk emulator 254D adds an entry 257B into the private mapping data structure 257, mapping the VBN1 321D of the virtual disk 320D to the PBN2 121G.

After the stub 404 and the secure application 402 have been installed, a user of the VM 300D may initiate execution of the stub 404 in a conventional manner. The stub 404 is loaded into the VM memory 119A and it begins to execute. The stub 404 then causes the secure application 402 to be loaded into the private memory 119B, and the secure application begins to execute. FIG. 10B illustrates the loading of the stub 404 into the VM memory 119A and the initial execution of the stub 404, while FIG. 10C illustrates the loading of the secure application 402 into the private memory 119B and the initial execution of the secure application 402.

Thus, referring first to FIG. 10B, when execution of the stub 404 is initiated, the guest OS 20E attempts to load the stub 404, specifically the VBN0 321A, into the virtual system memory 318D, such as into a guest physical page GPPN0 319A. In response to this attempted disk read, the virtualization software 200D adds an entry to the guest address mapping module 220D (not shown in FIG. 10B), mapping the GPPN0 319A to a physical page into which the stub 404 will actually be loaded, such as a physical page PPN0 119D. Based on the mapping 255A in the guest mapping data structure 255, the virtualization software 200D determines that the physical block PBN0 121D corresponds with the virtual block VBN0 321A specified by the guest OS 20E. Thus, the virtualization software 200D loads the physical block PBN0 121D into the physical page PPN0 119D. Next, when execution continues in the guest OS 20E, the guest OS creates a page table entry in the guest OS page table 24 (not shown in FIG. 10B), mapping a guest virtual page number, such as a GVPN0, to the guest physical page GPPN0 319A. Thus, the GPPN0 319A, into which the guest OS 20E believes the stub 404 was loaded, can be accessed using the GVPN0.

Next, the guest OS 20E attempts to initiate execution of the stub 404 at the GPPN0 319A, which the virtualization software 200D converts into the corresponding PPN0 119D, so that execution of the stub 404 begins at the PPN0 119D. When the stub 404 first uses a virtual address in the GVPN0 a page fault occurs because the shadow page table 224, which is currently the active page table, does not yet contain a mapping for the GVPN0. The virtualization software 200D responds to this page fault and adds an entry 224D to the shadow page table 224, mapping the GVPN0 to the PPN0 119D, based on the mapping in the guest OS page table 24 from the GVPN0 to the GPPN0 319A and the mapping in the guest address mapping module 220D from the GPPN0 319A to the PPN0 119D. This page fault may be referred to as a "hidden" page fault because it is handled by the virtualization software 200D, without any software within the VM 300D even being aware that the fault occurred.

Now, execution continues in the stub 404, at the PPN0 119D. The stub 404 makes a hypervisor call through the bridge 410 to the virtualization software 200D as described above, to initiate execution of the secure application 402. In response to the hypervisor call, the virtualization software 200D switches the hardware context to the IEE 400, including activating the private page table 422, instead of the shadow page table 224. In this implementation, execution resumes in the IEE at the next instruction of the stub 404 within the PPN0 119D. Again, the stub 404 will use a virtual address in the GVPN0, and again, a page fault will occur, this time because the private page table 422 does not yet contain a mapping for the GVPN0. The virtualization software 200D responds to this page fault and adds an entry 422D to the private page table 422, also mapping the GVPN0 to the PPN0 119D, again based on the mapping in the guest OS page table 24 from the GVPN0 to the GPPN0 319A and the mapping in the guest address mapping module 220D from the GPPN0 319A to the PPN0 119D. Now, the PPN0 119D is accessible both from within the VM 300D and from within the IEE 400. Thus, the PPN0 119D can be considered a part of the shared memory 119C of FIG. 8, or it can be considered part of the VM memory 119A as well as a part of the private memory 119B, as illustrated in FIG. 10B. Instead of the general case in which the pages of the VM memory 119A and the pages of the private memory 119B are mutually exclusive, this implementation of the invention involves at least one memory page that is shared between the VM memory 119A and the private memory 119B. Of course, any such shared memory pages preferably contain no private code or data of the secure application 402. In this example, the shared page 119D contains the code and data of the stub 404, which was already available (or vulnerable) to software modules in the VM 300D. FIG. 10B also shows that, from the perspective of the IEE 400, the GVPN0 provides access to the virtual system memory 318D, as represented by a block 319C. In this example, using the GVPN0 from within the IEE 400 provides access to the PPN0 119D. After the mapping 422D is added to the private page table 422, execution continues in the IEE 400 in the stub 404, on the PPN0 119D.

At this point, the main object of the code of the stub 404 is to initiate the loading and execution of the secure application 402. FIG. 10C illustrates this process of loading the secure application 402 into the private memory 119B, along with the initial execution of the secure application. To begin the process, a reference is made to a GVPN that maps to the code and/or data of the secure application 402. In this case, the appropriate GVPN is the GVPN1. When the GVPN1 is first referenced, a page fault occurs because the private page table 422 does not contain a mapping for this GVPN1. The virtualization software 200D responds to the page fault and determines that there are no mappings for the GVPN1 in the private page table 422, in the shadow page table 224 or in the guest OS page table 24. Because there is no mapping for the GVPN1 in the guest OS page table 24, it is appropriate to forward the page fault to the guest OS 20E. Thus, the virtualization software 200D saves the current hardware context and switches to the hardware context of the VM 300D, including activating the shadow page table 224 instead of the private page table 422. Execution then resumes within the stub 404.

Now the stub 404 references the GVPN1 to raise the same page fault to the guest OS 20E. The guest OS 20E believes that the GVPN1 corresponds with the VBN1 321B, so the guest OS attempts to load the VBN1 321B into a GPPN, such as a GPPN1 319B. As described above, the VBN1 321B is not backed by a physical data block, as indicated by the mapping 255B in the guest mapping data structure 255. When the virtualization software 200D attempts to find a physical block corresponding to the virtual block VBN1 321B, the virtualization software discovers the mapping 255B and begins handling the attempted disk read in a special manner. In particular, the virtualization software 200D maps the GPPN1 319B to a physical page, such as a PPN1 119E, in the guest address mapping module 220D, but then preferably loads special data into the PPN1 119E that can be used to detect an error condition. The PPN1 119E should not be accessed for any substantive reason because it corresponds with the VBN1 321B, which does not contain real data. There is no reason for any software module within the computer system to attempt to access the actual data of the PPN1 119E. Thus, the PPN1 119E can be written with particular code or data that causes an error condition if the page is accessed, so that the virtualization software 200D can determine that an error has occurred. In some embodiments, to conserve memory, one or more physical pages containing "error" code or data may be shared, in the sense that multiple GPPNs may be mapped to a given PPN, because the contents of the physical page(s) are not important, except to cause an error condition.

Also, because the mapping 255B indicates that the VBN1 321B is not backed by a physical data block in the environment of the VM 300D, the virtualization software 200D determines that a corresponding data block actually needs to be loaded in the IEE 400 instead. Specifically, the virtualization software 200D determines from the mapping 257B in the private mapping data structure 257 that, in the IEE 400, the VBN1 321D is backed by the PBN2 121G. Thus, in addition to loading "error" data into the PPN1 119E, the virtualization software 200D also effectively loads the VBN1 321D within the IEE 400 into the private memory of the secure application 402. More specifically, the virtualization software 200D adds an entry to the private address mapping module 420 (not shown in FIG. 10C), mapping the GPPN1 to a physical page in the private memory 119B, such as a PPN2 119G. Then, the virtualization software 200D loads the PBN2 121G into the PPN2 119G.

When execution returns to the guest OS 20E, the guest OS adds an entry to the guest OS page table 24, mapping the GVPN1 to the GPPN1 319B. Next, execution continues on the PPN0 119D. Again, a page fault occurs at the GVPN1 because the shadow page table 224 still does not contain a mapping for the GVPN1. In response to this page fault, the virtualization software 200D adds an entry 224E to the shadow page table 224, mapping the GVPN1 to the PPN1 119E, based on the mapping in the guest OS page table 24 from the GVPN1 to the GPPN1 319B and the mapping in the guest address mapping module 220D from the GPPN1 to the PPN1 119E. Also in response to this page fault, the virtualization software 200D adds an entry 422E to the private page table 422, mapping the GVPN1 to the PPN2 119G, based on the mapping in the guest OS page table 24 from the GVPN1 to the GPPN1 319B and the mapping in the private address mapping module 420 from the GPPN1 to the PPN2 119G. Now, from the perspective of the IEE 400, the GVPN1 corresponds to a guest physical page in the virtual system memory 318D, as illustrated by a block 319D in FIG. 10C. This page is backed in the physical memory 119 by the PPN2 119G, as indicated by the entry 422E of the private page table 422.

Now, when execution resumes, the reference to the GVPN1 does not cause a page fault because the shadow page table 224 contains a mapping for the GVPN1. As the stub 404 continues to execute, it issues another hypervisor call, which again causes the secure application 402 to resume execution. Thus, in response to the hypervisor call, the virtualization software 200D switches the hardware context to the IEE 400, including activating the private shadow page table 422. Now, when the secure application 402 resumes execution, it can proceed into the GVPN1 because of the entry 422E in the private shadow page table 422. Thus, the secure application code can now be executed in the PPN2 119G.

Referring now to FIGS. 11A, 11B and 11C, this indirection embodiment is substantially the same as the dual mapping embodiment of FIGS. 10A, 10B and 10C, except as described below. Assume again that neither the stub 404 nor the secure application 402 have been installed initially. FIG. 11A illustrates the installation of the stub 404 into the VM storage 121A and the installation of the secure application 402 into the private storage 121B. In this embodiment, the secure installer installs the secure application 402 into the private storage 121B first. Thus, the secure installer writes the secure application 402 into a block of the private storage 121B, such as the block PBN2 121G. The virtualization software 200D returns a pointer value to the installer that indicates, in some manner, the location within the private storage 121B at which the secure application 402 was written. Thus, in this example, the virtualization software 200D returns some value to the installer that indicates that the secure application 402 was written to the PBN2 121G. This pointer value is described in greater detail below. From the perspective of the IEE 400, the secure application 402 again occupies the VBN1 of the virtual disk 320D, which is identified as the VBN1 321D in the IEE. In this embodiment, however, the private mapping data structure 257 is not used, so, unlike the dual mapping embodiment, the disk emulator 254D does not establish a mapping from the VBN1 321D of the virtual disk 320D to the PBN2 121G.

Next, the secure installer initiates or activates a process within the VM 300D, which interfaces with the guest OS 20E to attempt to install the stub 404 into the virtual disk 320D. Again, although the stub 404 only occupies a single block, the installer process requests two blocks from the guest OS 20E in the virtual disk 320D. Suppose again that the guest OS 20E allocates the VBN0 321A and the VBN1 321B. The installer process then attempts to write the stub 404 into the VBN0 321A, and the disk emulator 254D translates this attempted disk write into a corresponding write to the VM storage 121A, such as to the block PBN0 121D. The disk emulator 254D also adds an entry 255A into the guest mapping data structure 255, mapping the VBN0 321A of the virtual disk 320D to the PBN0 121D of the VM storage 121A.

Now in this embodiment, the installer process actually writes meaningful data to the VBN1 321B, even though the entire stub 404 has already been written to the VBN0 321A. Specifically, the installer process writes to the VBN1 321B a block of data containing the pointer value that was returned by the virtualization software 200D during the installation of the secure application 402. Again, the disk emulator 254D translates this attempted disk write to a corresponding write to a block of the VM storage 121A, such as the block PBN1 121E. The disk emulator 254D also adds another entry 255B into the guest mapping data structure 255, mapping the VBN1 321B of the virtual disk 320D to the PBN1 121E of the VM storage 121A.

Now the pointer value that is written into the PBN1 121E may be any value that may be interpreted by the virtualization software 200D to indicate where in the private storage 121B the secure application 402 was written. However, the pointer value preferably does not provide any meaningful information to any software module within the VM 300D that may access the PBN1 121E. Thus, for example, the pointer value could be an encrypted value that can be decrypted to determine the physical block number at which the secure application 402 was written. As another alternative, an array may be maintained by the virtualization software 200D that indicates all of the physical blocks of the disk 121 that constitute the private storage 121B. Then, the pointer value could simply be the index value into the array that points to the physical block into which the secure application 402 was written.

As another alternative, a pointer value that points to the secure application 402 within the private storage 121B may be included within the executable file of the stub 404, which may extend into the PBN1 121E. The executable file may contain a bit vector that indicates which blocks of the disk 121 constitute the private storage 121B. The bit vector may then be used to load blocks from either the VM storage 121A or the private storage 121B, and the bit vector may be used to determine the location of the secure application 402 within the private storage 121B. In this alternative, as well as in other embodiments of the invention, the stub 404, as contained in the VM storage 121A, may be accessible to other software modules within the VM 300D. Therefore, these other software modules could modify the stub 404. As a safeguard against this possibility, after execution is switched from the stub 404 to the secure application 402, the secure application 402, for example, may verify the integrity of the stub 404 in some way, such as by performing a hash function on the PBN0 121D and/or the PBN1 121E and comparing the results against expected results. As another alternative, one or more checksums may be kept in the private storage 121B that may be used to verify the integrity of the PBN0 121D and/or the PBN1 121E. As yet another alternative, identical copies of the contents of the PBN0 121D and/or the PBN1 121E may also be kept in the private storage 121B, so that the secure application 402, for example, may verify the integrity of the stub 404 by comparing the different copies of the code and data of the stub.

Again, after the stub 404 and the secure application 402 have been installed, a user of the VM 300D may initiate execution of the stub 404 in a conventional manner. The stub 404 is loaded into the VM memory 119A and it begins to execute. The stub 404 then causes the secure application 402 to be loaded into the private memory 119B, and the secure application begins to execute. FIG. 11B illustrates the loading of the stub 404 into the VM memory 119A and the initial execution of the stub 404, while FIG. 11C illustrates the loading of the secure application 402 into the private memory 119B and the initial execution of the secure application 402.

Referring first to FIG. 11B, when execution of the stub 404 is initiated, the guest OS 20E attempts to load the stub 404, specifically the VBN0 321A, into the virtual system memory 318D, such as into the GPPN0 319A. In response to this attempted disk read, the virtualization software 200D adds an entry to the guest address mapping module 220D (not shown in FIG. 11B), mapping the GPPN0 319A to a physical page into which the stub 404 will actually be loaded, such as the PPN0 119D. Based on the mapping 255A in the guest mapping data structure 255, the virtualization software 200D determines that the physical block PBN0 121D corresponds with the virtual block VBN0 321A specified by the guest OS 20E. Thus, the virtualization software 200D loads the physical block PBN0 121D into the physical page PPN0 119D. Next, when execution continues in the guest OS 20E, the guest OS creates a page table entry in the guest OS page table 24 (not shown in FIG. 11B), mapping a guest virtual page number, such as a GVPN0, to the guest physical page GPPN0 319A. Thus, the GPPN0 319A, into which the guest OS 20E believes the stub 404 was loaded, can be accessed using the GVPN0.

Next, the guest OS 20E attempts to initiate execution of the stub 404 at the GPPN0 319A, which the virtualization software 200D converts into the corresponding PPN0 119D, so that execution of the stub 404 begins at the PPN0 119D. When the stub 404 first uses a virtual address in the GVPN0 a page fault occurs because the shadow page table 224, which is currently the active page table, does not yet contain a mapping for the GVPN0. The virtualization software 200D responds to this page fault and adds an entry 224D to the shadow page table 224, mapping the GVPN0 to the PPN0 119D, based on the mapping in the guest OS page table 24 from the GVPN0 to the GPPN0 319A and the mapping in the guest address mapping module 220D from the GPPN0 319A to the PPN0 119D.

Now, execution continues in the stub 404, at the PPN0 119D. The stub 404 makes a hypervisor call to the virtualization software 200D as described above, to initiate execution of the secure application 402. In response to the hypervisor call, the virtualization software 200D switches the hardware context to the IEE 400, including activating the private page table 422, instead of the shadow page table 224. In this embodiment also, execution resumes in the IEE at the next instruction of the stub 404 within the PPN0 119D. In other embodiments, however, the virtualization software 200D may immediately begin to execute the secure application 402 after switching to the IEE 400.

Again, the stub 404 will use a virtual address in the GVPN0, and again, a page fault will occur because the private page table 422 does not yet contain a mapping for the GVPN0. The virtualization software 200D responds to this page fault and adds an entry 422D to the private page table 422 mapping the GVPN0 to the PPN0 119D, again based on the mapping in the guest OS page table 24 from the GVPN0 to the GPPN0 319A and the mapping in the guest address mapping module 220D from the GPPN0 319A to the PPN0 119D. Now, again, the PPN0 119D is accessible both from within the VM 300D and from within the IEE 400, and the PPN0 119D can be considered a part of the shared memory 119C of FIG. 8, or as a part of the VM memory 119A as well as a part of the private memory 119B, as illustrated in FIG. 11B. FIG. 11B also shows that, from the perspective of the IEE 400, the GVPN0 provides access to the virtual system memory 318D, as represented by the block 319C. In this example, using the GVPN0 from within the IEE 400 provides access to the PPN0 119D. After the mapping 422D is added to the private page table 422, execution continues in the IEE 400 in the stub 404, in the PPN0 119D.

Again, at this point, the main object of the code of the stub 404 is to initiate the loading and execution of the secure application 402. FIG. 11C illustrates this process of loading the secure application 402 into the private memory 119B, along with the initial execution of the secure application. To begin the process, a reference is made to a GVPN that maps to the code and/or data of the secure application 402. In this case, the appropriate GVPN is the GVPN1. When the GVPN1 is first referenced, a page fault occurs because the private page table 422 does not contain a mapping for the GVPN1. The virtualization software 200D responds to the page fault and determines that there are no mappings for the GVPN1 in the private page table 422, in the shadow page table 224 or in the guest OS page table 24, and forwards the page fault to the guest OS 20E by causing the stub 404 to raise the same page fault within the VM 300D, as described above.

When the stub 404 references the GVPN1 to raise the same page fault to the guest OS 20E, the guest OS attempts to load the VBN1 321B into a GPPN, such as the GPPN1 319B. In this embodiment, the VBN1 321B corresponds with the PBN1 121E, which contains the pointer to the secure application 402 in the private storage 121B. In response to this attempted disk read, the virtualization software 200D adds another entry to the guest address mapping module 220D (not shown in FIG. 11C), mapping the GPPN1 319B to a physical page into which the pointer value will actually be loaded, such as the PPN1 119E. Based on the mapping 255B in the guest mapping data structure 255, the virtualization software 200D determines that the physical block PBN1 121E corresponds with the virtual block VBN1 321B specified by the guest OS 20E. Thus, the virtualization software 200D loads the physical block PBN1 121E into the physical page PPN1 119E.

When execution returns to the guest OS 20E, the guest OS adds an entry to the guest OS page table 24, mapping the GVPN1 to the GPPN1 319B. Execution then continues on the PPN0 119D, and a page fault occurs again at the GVPN1 because the shadow page table 224 still does not contain a mapping for the GVPN1. The virtualization software 200D again adds an entry 224E to the shadow page table 224, mapping the GVPN1 to the PPN1 119E, based on the mapping in the guest OS page table 24 from the GVPN1 to the GPPN1 319B and the mapping in the guest address mapping module 220D from the GPPN1 319B to the PPN1 119E. Now, the stub 404 is able to continue executing, and it issues another hypervisor call, which again causes the virtualization software 200D to switch to the IEE 400.

When execution resumes in the IEE 400, another reference is made to the GVPN1, and another page fault occurs because the private page table 422 does not yet contain a mapping for the GVPN1. Now the virtualization software 200D checks the shadow page table 224 and finds the mapping 224E from the GVPN1 to the PPN1 119E. The virtualization software 200D then reads the PPN1 119E and determines the pointer value that has been stored in that page. At this point, the virtualization software 200D may verify the integrity of the contents of the PPN1 119E in some manner (or at least the integrity of the pointer value), such as by comparing hash values, checksums or the actual contents with corresponding data stored in the private storage 121B, as described above. The virtualization software 200D then uses this pointer value to determine the location of the secure application 402 within the private storage 121B. Thus, in this example, the virtualization software 200D determines that the secure application 402 was loaded into the PBN2 121G. Next, the virtualization software 200D adds an entry to the private address mapping module 420 (not shown in FIG. 11C), mapping the GPPN1 to a physical page in the private memory 119B into which the secure application 402 will be loaded, such as the PPN2 119G. The virtualization software 200D also adds an entry 422E to the private page table 422, mapping the GVPN1 to the same PPN2 119G. Then, the virtualization software 200D loads the PBN2 121G into the PPN2 119G.

Now, from the perspective of the IEE 400, the GVPN1 corresponds to a guest physical page in the virtual system memory 318D, as illustrated by the block 319D in FIG. 11C. This page is backed in the physical memory 119 by the PPN2 119G, as indicated by the entry 422E of the private page table 422. Now, when the secure application 402 resumes execution, it can proceed into the GVPN1 because of the entry 422E in the private shadow page table 422. Thus, the secure application code can now be executed in the PPN2 119G.

FIGS. 10A to 10C and 11A to 11C illustrate two particular methods that may be used for installing, loading and executing the stub 404 and the secure application 402. These methods may be modified in a large number of ways, including the overall sequence of steps involved and the particular details of the individual steps. Entirely different methods may also be used. The technical literature in the field of computer science contains a vast amount of information that may be used to formulate different methods that may be used to accomplish these objectives, depending on the particular circumstances of a given computer system.

Although the example illustrated in FIGS. 10A to 10C and 11A to 11C is simple, it can easily be extended to more realistic computer systems. Thus, in a real computer system, in which the stub 404 and the secure application 402 may comprise additional storage blocks and memory pages, the same techniques may be used to load and execute the additional blocks/pages in both the IEE 400 and the environment of the VM 300D. In both the dual mapping embodiment and the indirection embodiment, every memory page in the IEE 400 will generally have a corresponding memory page in the environment of the VM 300D. In each of these embodiments, except for the memory pages that are used for the stub 404, none of the corresponding memory pages in the environment of the VM 300D are used within the VM 300D. In the dual mapping embodiment, these unused corresponding memory pages contain "error" data, while, in the indirection embodiment, they contain pointers to physical blocks in the private storage 121B. For each of these embodiments, depending on the implementation and the circumstances, some of these unused memory pages may be reclaimed for other uses. Even if the guest OS 20E believes that the unused memory pages are loaded into the virtual system memory 318D, the virtualization software 200D may not need to allocate corresponding pages of the physical system memory 119 to back these pages. In this case, the virtualization software 200D may use these pages for other purposes.

In the isolated execution embodiments, including both the dual mapping embodiment and the indirection embodiment, the guest OS 20E manages the hardware resources for the guest applications 40H and the secure application 402, in a conventional manner from the perspective of the guest OS 20E, without being able to access or even detect the presence of the private storage 121B or the private memory 119B of the secure application 402. The virtualization software 200D also responds to actions by the secure application 402, the stub 404 and the guest OS 20E in a relatively straightforward manner to facilitate the interaction and communication between the IEE 400 and the environment of the VM 300D, while maintaining the isolation between the two environments. The virtualization software 200D also responds to faults and interrupts, and either handles them itself, or the virtualization software effectively forwards the faults and interrupts to the guest OS 20E for handling.

During these various system calls, hypervisor calls, interactions and communications, faults, interrupts, etc., the virtualization software 200D switches back and forth between the IEE 400 and the environment of the VM 300D, as needed, saving and restoring the respective CPU contexts at each switch. In addition, the virtualization software 200D may periodically switch from the IEE 400 to the environment of the VM 300D to allow the guest OS 20E to schedule the times when different software modules within the VM 300D are allowed to execute. When the secure application 402 is pending execution, the stub 404 is also pending execution within the VM 300D. Whenever the guest OS 20E schedules the stub 404 to execute, the stub 404 makes another hypervisor call to allow the secure application 402 to execute during that time slot. This allows the guest OS 20E to effectively include the secure application 402 in its ordinary scheduling algorithm, along with all the processes within the VM 300D, even though switching to the IEE 400 involves a complete hardware context switch from which the guest OS 20E could not otherwise regain control.

Although in these embodiments, the guest OS 20E manages hardware resources for the secure application 402, in other embodiments, the virtualization software 200D may be designed to provide more system services to the secure application 402, instead of relying so much on the guest OS 20E. In such embodiments, the computer systems will likely have better overall performance because there will be fewer context switches, but the virtualization software 200D will also be more complex, which could make the virtualization software more vulnerable to malicious software.

The isolated execution embodiment may be utilized under at least two distinct strategies. One strategy is to try to maintain the integrity of the IEE 400, accepting the possibility that the software in the VM 300D may become compromised. Another strategy is to use the IEE 400 for software that may involve security risks, while attempting to maintain the integrity of the software within the VM 300D.

Under the first strategy, for example, applications that involve particularly sensitive data may be executed in the IEE 400. For example, a financial program such as Quicken financial software, from Intuit Inc., may be run in the IEE 400 so that sensitive financial data is isolated from the software modules in the VM 300D. As another example, the IEE 400 may be used for digital rights management purposes. An application for playing digital content, such as a movie, a song or a video game, may be run in the IEE, so that the content may be enjoyed within the particular computer system, but the digital content cannot otherwise be accessed for copying or for further distribution.

Under the second strategy, applications that involve potential security risks are executed in the IEE 400, while all other applications run in the VM 300D or in other VMs. For example, Internet applications, such as web browsers and email clients, may be run in the IEE 400. Then, before any data is transferred from the IEE 400 to the VM 300D, it can be scanned for viruses, etc., to avoid contaminating the software within the VM 300D. Also, the integrity of the software within the IEE 400 may be verified from time to time, such as by running a hash operation on the private memory 119B and/or the private storage 121B and comparing the results to expected values.

As described above, in addition to memory pages in the VM memory 119A that are only accessible from within the VM 300D and memory pages in the private memory 119B that are only accessible from within the IEE 400, there may also be one or more memory pages in the shared memory 119C that are accessible both from within the VM 300D and from within the IEE 400. There are a wide variety of reasons why the invention might be implemented with such shared memory pages. For example, one or more memory pages may be shared between the IEE 400 and the environment of the VM 300D, so that data may be passed between the environments by the secure application 402 and the software modules in the VM 300D. As another example, one or more memory pages that are used by software modules in the VM 300D may also be mapped into the IEE 400, making such memory pages shared memory pages, so that they may be accessed by the secure application 402, for example. As a specific example of such a use of shared memory pages, the secure application 402 may implement a virus scanner, which scans all of the memory pages used by the software modules in the VM 300D (i.e. all of the PPNs corresponding to the GPPNs of the VM 300D). In this case, all of the memory pages used by the software modules in the VM 300D are also mapped into the IEE 400, so that they may be scanned by the secure application 402. As a means of protecting the memory pages used by the software modules in the VM 300D, in this example, the PTEs in the private shadow page table 422 for these memory pages may be marked as read-only or non-executable. Such a virus scanner would need to interface with the virtualization software 200D to access all of the GPPNs of the VM 300D. Depending on the implementation, system calls from the secure application 402 to access the GPPNs can either be forwarded to the guest OS 20E, or they may be handled by the virtualization software 200D using its own API. In this example, the secure application 402 is protected from the software modules in the VM 300D, but it is able to gain access to the memory pages used by these software modules to inspect them for viruses. In some implementations, too, only a relatively small portion of the data used by the secure application 402 may be isolated in the private memory 1196, while the rest of the data used by the secure application 402 may be located in the shared memory 119C. For example, only a few pages of physical memory (or even just one page) may be isolated in the private memory 119B to store sensitive data, such as passwords or encryption keys.

Finally, the isolated execution embodiment may be implemented in a wide variety of virtual computer systems, including a hosted virtual computer system, such as the system 2X of FIG. 3, or a kernel-based virtual computer system, such as the system 2Y of FIG. 4. If the embodiment is implemented in the system 2Y of FIG. 4, then the virtualization software 200Y facilitates and controls all interactions between the VM 300Y and the system hardware 100Y. So long as the virtualization software 200Y is not compromised, malicious software should not be able to compromise the IEE 400. One possible vulnerability for such an implementation could arise if third party modules or drivers are included in the loadable modules and drivers 240Y in the kernel 202Y. Depending on the circumstances, different measures may be taken to limit the risk of such a vulnerability, including possibly not allowing the loading of third party modules and drivers or possibly requiring some form of authentication before loading any third party software.

If the isolated execution embodiment is implemented in the system 2X of FIG. 3, the precautions described in the preceding paragraph can generally be applied to any third party drivers 29W and any third party applications 40W that are loaded into the execution environment of the host system software 19W. Additional measures may also be taken such as encrypting sensitive data before switching to the host environment.

This invention may also be implemented using system hardware that implements Nested Page Tables (NPTs). For example, Intel Corporation is developing a NPT implementation referred to as Extended Page Tables (EPT), while Advanced Micro Devices, Inc. is developing a NPT implementation referred to as Nested Paging Facility (NPF). Documentation regarding these and other implementations of NPTs are publicly available. Generally, a first page table (a guest page table) containing guest address mappings is maintained by a guest OS, and maps from GVPNs to GPPNs, while a second page table (a nested page table) containing virtualization address mappings is maintained by virtualization software, and maps from GPPNs to PPNs. A hardware MMU uses both the guest page table and the nested page table to map a GVPN issued by guest software to a PPN. The guest and nested page tables may be located through the use of a first and second pointer, respectively, which may be stored in respective first and second control registers, for example.

In such an NPT implementation, there is no need for virtualization software to maintain software shadow page tables, such as the shadow page table 222D or the private page table 422 of FIG. 8, for example. Instead, address mapping modules, such as the guest address mapping module 220D and the private address mapping module 420, could be used as nested page tables. Then, using the example of FIG. 8, when a software module from within the VM 300D executes that is using the second guest virtual address space 332, the virtualization software 200D activates the guest address mapping module 220D as the nested page table, by loading the second control register with an address pointing to the guest address mapping module 220D. When the secure application 402 executes, the virtualization software 200D activates the private address mapping module 420 as the nested page table, by loading the second control register with an address pointing to the private address mapping module 420.

Multiple Isolated Execution Environments

Figure 12:
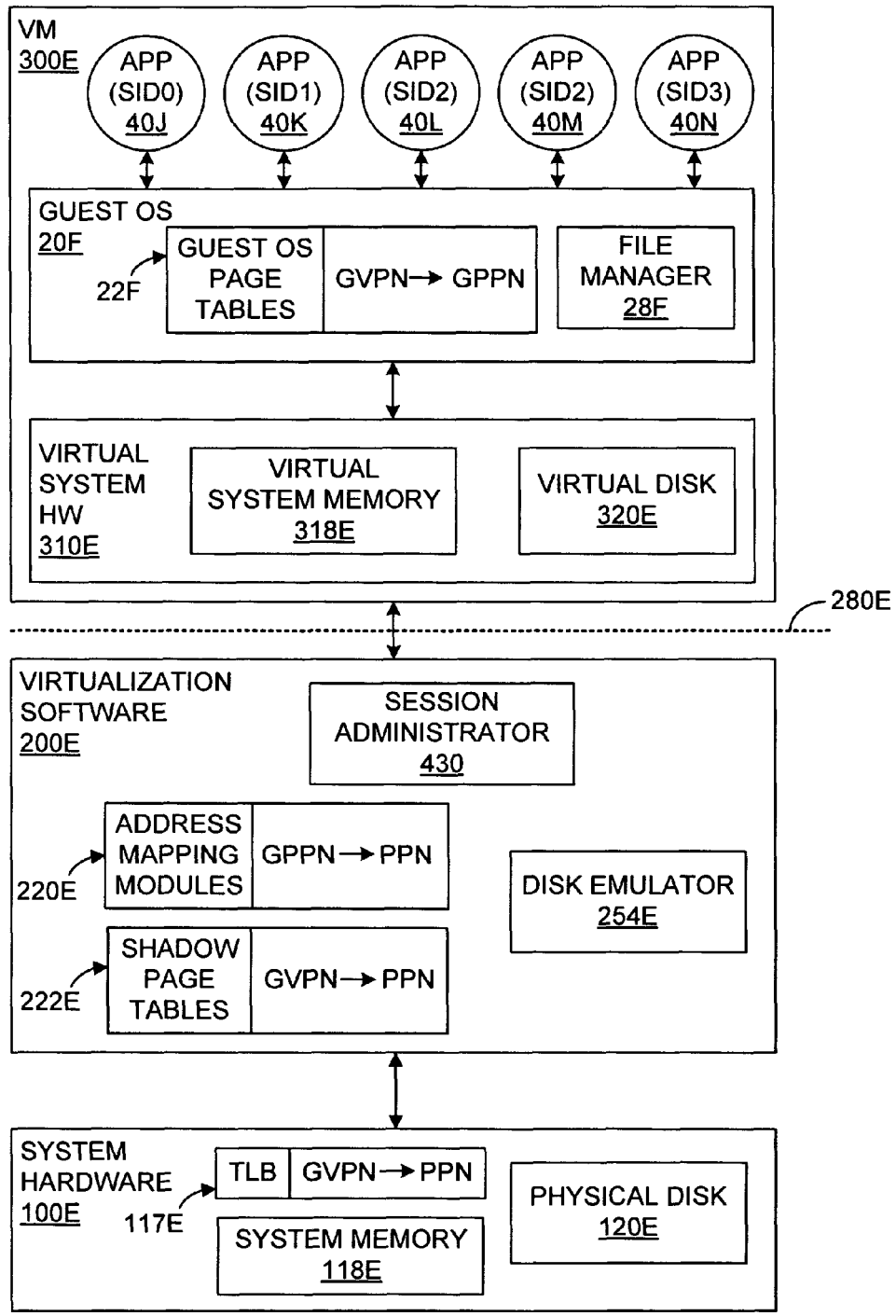
FIG. 12 illustrates another embodiment of the invention, in which multiple isolated execution environments are implemented within a VM using multiple sets of private shadow mappings.

This invention may also be used to implement multiple isolated execution environments (IEEs) within a single virtual computer system, so that software modules within each of the execution environments cannot access the code or data, in either primary or secondary storage, of any of the other execution environments. FIG. 12 illustrates one embodiment of the invention involving the implementation of multiple IEEs.

Much of what is illustrated in FIG. 12 may be substantially the same as corresponding elements that have been described above, in connection with FIGS. 3 through 8. Thus, FIG. 12 shows a system hardware 100E, which includes a TLB 117E, a system memory 118E and one or more disks 120E. The system hardware 100E may be substantially the same as the system hardware 100X of FIG. 3, the system hardware 100Y of FIG. 4, the system hardware 100C of FIG. 5, or the system hardware 100D of FIG. 8. FIG. 12 also shows virtualization software 200E, which, except as described below, may be substantially the same as the virtualization software 200X of FIG. 3, the virtualization software 200Y of FIG. 4, the virtualization software 200B of FIG. 5, or the virtualization software 200D of FIG. 8.

FIG. 12 also shows a VM 300E, which includes a virtual system hardware 310E, a guest OS 20F, one or more guest OS page tables 22F, and a plurality of applications, such as a first application 40J, a second application 40K, a third application 40L, a fourth application 40M and a fifth application 40N. Except as described below, the VM 300E may be substantially the same as the VM 300X of FIG. 3, the VM 300Y of FIG. 4, the VM 300C of FIG. 5, or the VM 300O of FIG. 8. The virtual system hardware 310E may be substantially the same as the virtual system hardware 310X of FIG. 3, the virtual system hardware 310Y of FIG. 4, the virtual system hardware 310C of FIG. 5, or the virtual system hardware 310D of FIG. 8. The guest OS 20F may be substantially the same as the guest OS 20X of FIG. 3, the guest OS 20Y of FIG. 4, the guest OS 20D of FIG. 5, or the guest OS 20E of FIG. 8. The guest OS page tables 22F may be substantially the same as the guest OS page tables 22D of FIG. 5 or the guest OS page tables 22E of FIG. 8. FIG. 12 also shows a file manager 28F within the guest OS 20F. The file manager 28F may be a conventional file manager as is generally included in conventional OSs. The other guest OSs described above may also have substantially similar file managers, although these file managers are not shown in the previous drawings. The virtual system hardware 310E also includes a virtual system memory 318E and one or more virtual disks 320E. The virtual system memory 318E may be substantially the same as the virtual memory 318X of FIG. 3, the virtual memory 318Y of FIG. 4, the virtual memory of FIG. 5 (not shown), or the virtual memory 318D of FIG. 8. The virtual disk(s) 320E may be substantially the same as the virtual disk 320X of FIG. 3, the virtual disk 320Y of FIG. 4, or the virtual disk 320D of FIG. 8.

All of the elements of FIG. 12 that have been identified thus far are generally found in existing virtual computer systems. These elements (and other elements that are not illustrated for simplicity) generally implement a virtual computer system that, except as described below, may be substantially the same as existing virtual computer systems. The virtualization software 200E supports a VM 300E that, for example, may be a virtualization of an ordinary x86 computer; the guest OS 20F may be an ordinary, general-purpose OS, such as a Windows OS or a Linux OS.

The virtualization software 200E establishes a virtualization barrier 280E between itself and the VM 300E. The virtualization software 200E also establishes one or more additional virtualization barriers between the plurality of applications 40J, 40K, 40L, 40M and 40N, although these virtualization barriers are not illustrated in FIG. 12. These additional virtualization barriers establish different secure sessions or isolated sessions within different IEEs. Each application executing in the VM 300E generally belongs to a single isolated session, executing in a single IEE, but more than one application may belong to the same isolated session in the same IEE. Each of the isolated sessions may be identified by a different Session IDentifier (SID). Thus, as illustrated in FIG. 12, the first application 40J may belong to a first isolated session having a SID of zero (SID0), executing in a first IEE; the second application 40K may belong to a second isolated session having a SID of one (SID1), executing in a second IEE; the third application 40L and the fourth application 40M may belong to a third isolated session having a SID of two (SID2), executing in a third IEE; and the fifth application 40N may belong to a fourth isolated session having a SID of three (SID3).

Thus, one of the additional virtualization barriers isolates the first application 40J from all of the other applications within the VM 300E that are not within the first isolated session, another virtualization barrier isolates the second application 40K from all of the other applications within the VM 300E that are not within the second isolated session, another virtualization barrier isolates the third application 40L and the fourth application 40M, as a group, from all of the other applications within the VM 300E that are not within the third isolated session, and another virtualization barrier isolates the fifth application 40N from all of the other applications within the VM 300E that are not within the fourth isolated session. Thus, each application within the VM 300E can access its own code and data, in either primary or secondary storage, and possibly the code and data of other applications, if any, within its own isolated session; but each application generally cannot access the code and data of any applications that are in other isolated sessions. Each of the applications running in the different IEEs within the VM 300E may generally be an ordinary application that can run in other execution environments, such as on a conventional physical computer and a conventional OS. Alternatively, these applications may be customized in one or more ways for execution in the IEEs.

In the single IEE embodiment illustrated in FIG. 8, a set of address mapping modules (the guest address mapping module 220D and the private address mapping module 420) and a set of shadow pages tables (the shadow page tables 222D and the private shadow page table 422) generally divide the system memory 119 into a first set of memory pages that can be accessed from within the VM 300D and a second set of memory pages that can only be accessed from within the IEE 400, as well as possibly some shared memory pages and some other memory pages that are used for other purposes. In a similar manner, in the multiple IEE embodiment of FIG. 12, a set of address mapping modules 220E and a set of shadow page tables 222E generally divide the system memory 118E into a first set of memory pages that can only be accessed from within the first IEE, a second set of memory pages that can only be accessed from within the second IEE, a third set of memory pages that can only be accessed from within the third IEE, and a fourth set of memory pages that can only be accessed from within the fourth IEE. There may also be additional memory pages that are shared between two or more of the IEEs and/or other memory pages that are used for other purposes.

Also, in the single IEE embodiment illustrated in FIG. 8, the disk emulator 254D maintains a set of disk block mapping data structures (the guest mapping data structure 255 and the private mapping data structure 257 (see FIG. 10)) that are used to generally divide the physical disk(s) 121 into a first set of data blocks that can be accessed from within the VM 300D and a second set of data blocks that can only be accessed from within the IEE 400, as well as possibly some shared data blocks and some other data blocks that are used for other purposes. In a similar manner, in the multiple IEE embodiment of FIG. 12, a disk emulator 254E maintains a set of disk block mapping data structures (not shown) that are used to generally divide the physical disk 120E into a first set of data blocks that can only be accessed from within the first IEE, a second set of data blocks that can only be accessed from within the second IEE, a third set of data blocks that can only be accessed from within the third IEE, and a fourth set of data blocks that can only be accessed from within the fourth IEE. There may also be additional data blocks that are shared between two or more of the IEEs and/or other data blocks that are used for other purposes.

The virtualization software 200E also includes a session administrator 430. The session administrator 430 determines and/or controls which isolated session is active, and activates the appropriate address mapping module 220E and shadow page table 222E, as described in greater detail below, as well as causing the disk emulator 254E to use the appropriate mapping data structure.

Figure 13A:
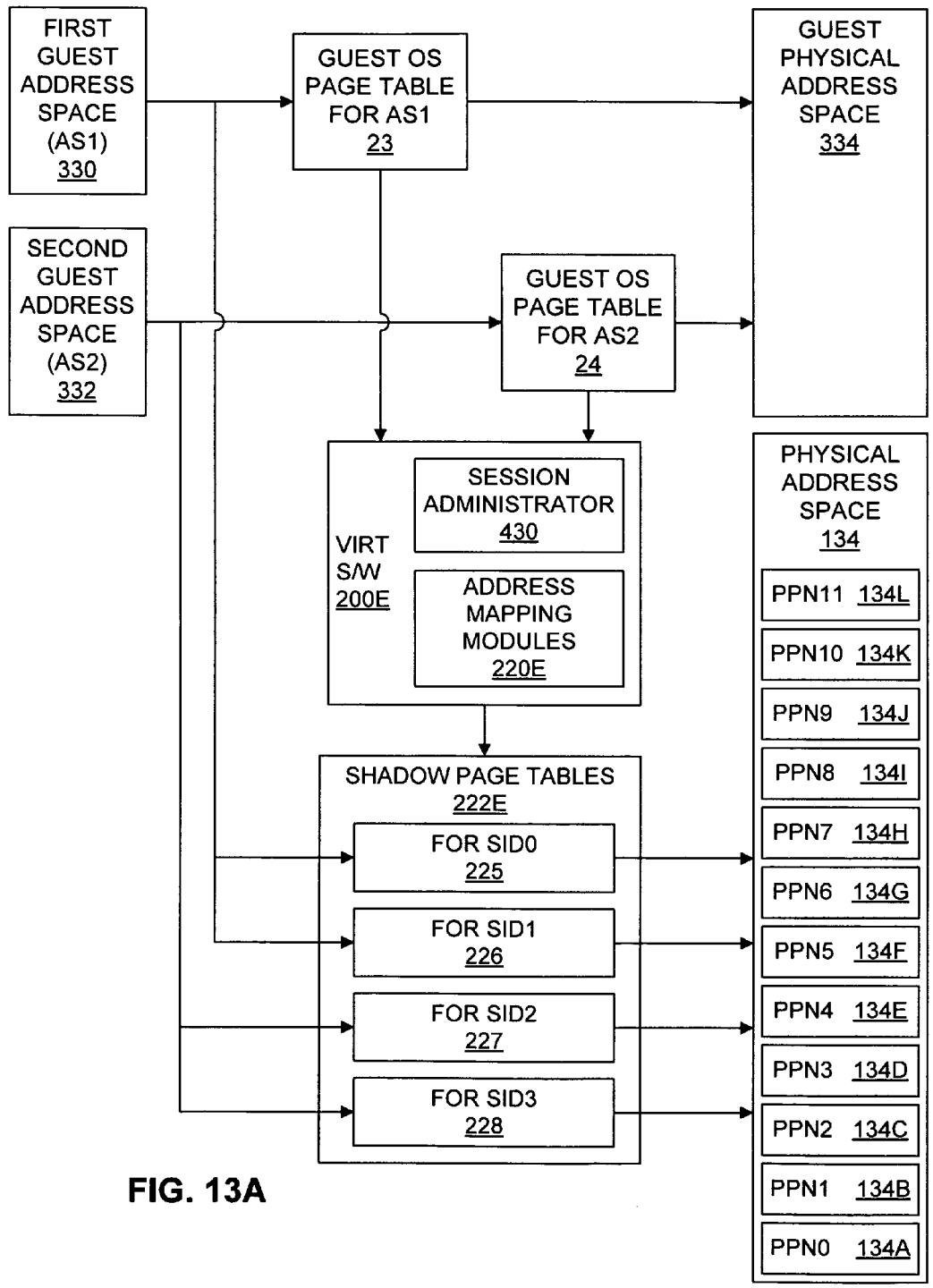
FIG. 13A illustrates the mapping of guest virtual addresses to actual physical addresses for the multiple isolated execution environment embodiment of FIG. 12.
Figure 13B:
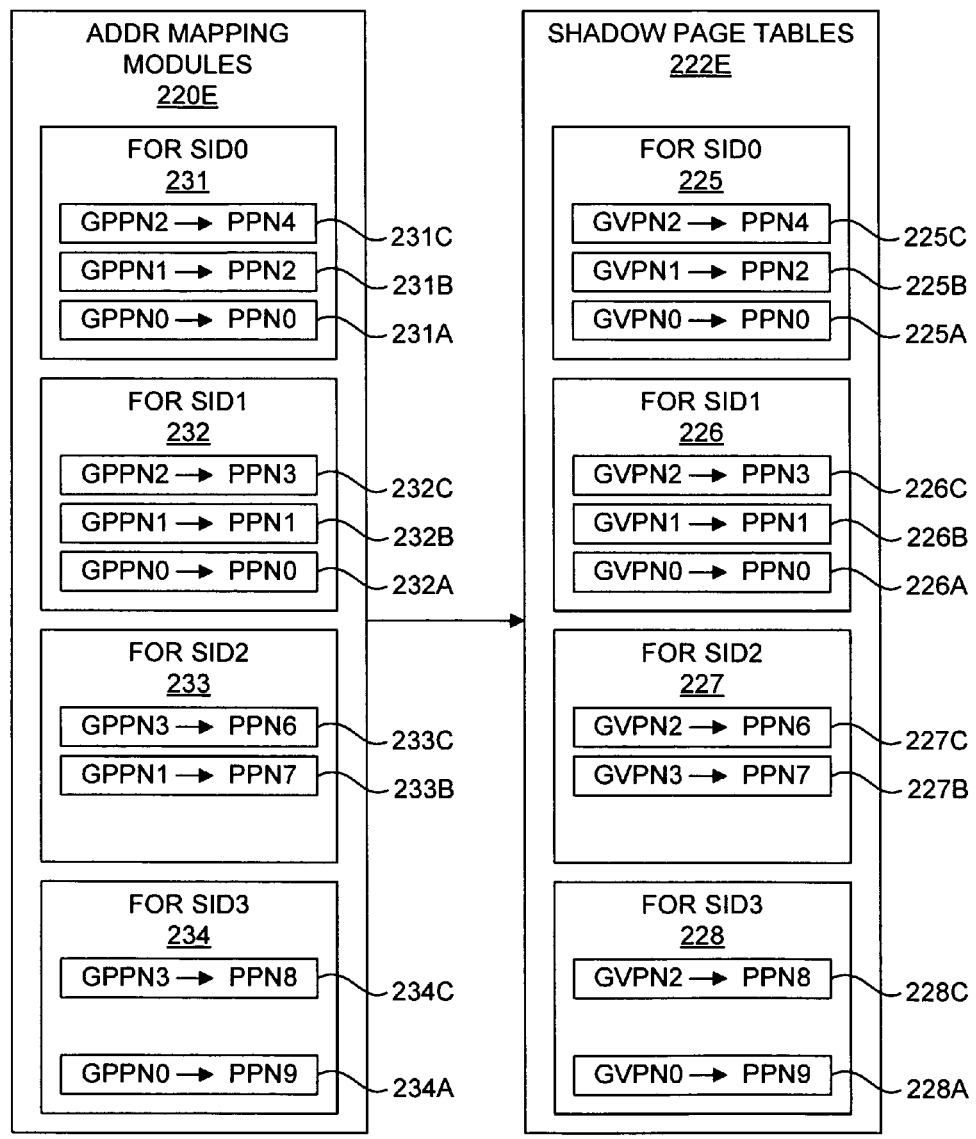
FIG. 13B illustrates multiple address mapping modules and multiple shadow page tables of FIG. 13A in greater detail.

The use of the address mapping modules 220E and the shadow page tables 222E to isolate the memory pages of the system memory 118E that belong to each of the IEEs is illustrated in FIGS. 13A and 13B. These figures extend the example of address mapping that was begun in FIGS. 6 and 7, and they apply the extended example to the virtual computer system of FIG. 12 to show how the virtualization software 200E maps virtual addresses to a physical address space of a computer system.

FIG. 13A shows many of the same elements that are shown in FIGS. 6 and 7, namely, the first guest virtual address space (AS1) 330, the second guest virtual address space (AS2) 332, the first guest OS page table 23, the second guest OS page table 24, the guest physical address space 334 and the physical address space 134. FIG. 13A does not show the details of most of these elements, but these details may be assumed to be the same as shown in FIGS. 6 and 7. FIG. 13A does show the physical address space 134 as containing the same set of twelve physical memory pages as shown in FIG. 7, namely the PPN0 134A, the PPN1 134B, the PPN2 134C, the PPN3 134D, the PPN4 134E, the PPN5 134F, the PPN6 134G, the PPN7 134H, the PPN8 134I, the PPN9 134J, the PPN10 134K, and the PPN11 134L. FIG. 13A also shows the same virtualization software 200E as is shown in FIG. 12, including the session administrator 430 and the address mapping modules 220E. FIG. 13A also shows the set of shadow page tables 222E as including a first shadow page table 225, which is used for the first IEE, or for SID0; a second shadow page table 226, which is used for the second IEE, or for SID1; a third shadow page table 227, which is used for the third IEE, or for SID2; and a fourth shadow page table 228, which is used for the fourth IEE, or for SID3.

FIG. 13B shows the address mapping modules 220E and the shadow page tables 222E in greater detail. Thus, the address mapping modules 220E comprise a first address mapping module 231, a second address mapping module 232, a third address mapping module 233 and a fourth address mapping module 234. The first address mapping module 231 and the first shadow page table 225 are used for the first IEE, or for SID0; the second address mapping module 232 and the second shadow page table 226 are used for the second IEE, or for SID1; the third address mapping module 233 and the third shadow page table 227 are used for the third IEE, or for SID2; and the fourth address mapping module 234 and the fourth shadow page table 228 are used for the fourth IEE, or for SID3.

In this case, again, the guest OS page tables 22F of FIG. 12 comprise the first guest OS page table 23 and the second guest OS page table 24. The guest OS 20F creates the first guest OS page table 23 to map addresses from the first guest virtual address space 330 to the guest physical address space 334; and the guest OS 20F creates the second guest OS page table 24 to map addresses from the second guest virtual address space 332 to the guest physical address space 334. In the SCENARIO illustrated in FIGS. 12, 13A and 13B, the first guest application 40J and the second guest application 40K both use the first guest virtual address space 330, while the third guest application 40L, the fourth guest application 40M and the fifth guest application 40N all use the second guest virtual address space 332.

In existing computer systems, each application typically has its own virtual address space. Even separate processes of a single application typically have separate virtual address spaces. However, this example, in which multiple applications share a common virtual address space, is used to illustrate some of the capabilities of different possible embodiments of the invention. In existing computer systems, however, multiple threads of a given process may share a common virtual address space. Therefore, this example may also be applied to typical existing computer systems by considering the guest applications 40J, 40K, 40L, 40M and 40N as threads, instead of applications. Thus, a first thread (represented by the first guest application 40J) and a second thread (represented by the second guest application 40K) may both use the first guest virtual address space 330, while a third thread (represented by the third guest application 40L), a fourth thread (represented by the fourth guest application 40M) and a fifth thread (represented by the fifth guest application 40N) may all use the second guest virtual address space 332.

The virtualization software 200E creates the address mapping modules 220E to map addresses in the guest physical address space 334 to the actual physical address space 134 for each of the respective isolated sessions. Thus, the first address mapping module 231 maps addresses in the guest physical address space 334 to the actual physical address space 134 for SID0, the second address mapping module 232 maps addresses in the guest physical address space 334 to the actual physical address space 134 for SID1, the third address mapping module 233 maps addresses in the guest physical address space 334 to the actual physical address space 134 for SID2, and the fourth address mapping module 234 maps addresses in the guest physical address space 334 to the actual physical address space 134 for SID3.

The virtualization software 200E also creates the shadow page tables 222E for mapping addresses from the guest virtual address spaces 330 and 332 to the physical address space 134 for each of the respective isolated sessions. More specifically, the first shadow page table 225 maps addresses from the first guest virtual address space 330 to the physical address space 134 for SID0, the second shadow page table 226 maps addresses from the first guest virtual address space 330 to the physical address space 134 for SID1, the third shadow page table 227 maps addresses from the second guest virtual address space 332 to the physical address space 134 for SID2, and the fourth shadow page table 228 maps addresses from the second guest virtual address space 332 to the physical address space 134 for SID3.

The contents of the address mapping modules 220E are shown in FIG. 13B. Thus, the first address mapping module 231 contains three entries or mappings, namely a first entry 231A that maps the GPPN0 334A to the PPN0 134A, a second entry 231B that maps the GPPN1 334B to the PPN2 134C, and a third entry 231C that maps the GPPN2 334C to the PPN4 134E. What this means is that, during the first isolated session, having SID0, the code and/or data that the guest OS believes to be stored in the GPPN0 334A is actually stored in the PPN0 134A; the code and/or data that the guest OS believes to be stored in the GPPN1 334B is actually stored in the PPN2 134C; and the code and/or data that the guest OS believes to be stored in the GPPN2 334C is actually stored in the PPN4 134E.

The second address mapping module 232 also contains three entries or mappings, namely a first entry 232A that maps the GPPN0 334A to the PPN0 134A, a second entry 232B that maps the GPPN1 334B to the PPN1 134B, and a third entry 232C that maps the GPPN2 334C to the PPN3 134D. What this means is that, during the second isolated session, having SID1, the code and/or data that the guest OS believes to be stored in the GPPN0 334A is actually stored in the PPN0 134A; the code and/or data that the guest OS believes to be stored in the GPPN1 334B is actually stored in the PPN1 134B; and the code and/or data that the guest OS believes to be stored in the GPPN2 334C is actually stored in the PPN3 134D.

The third address mapping module 233 contains two entries or mappings, namely a first entry 233B that maps the GPPN1 334B to the PPN7 134H, and a second entry 233C that maps the GPPN3 334D to the PPN6 134G. What this means is that, during the third isolated session, having SID2, the code and/or data that the guest OS believes to be stored in the GPPN1 334B is actually stored in the PPN7 134H; and the code and/or data that the guest OS believes to be stored in the GPPN3 334D is actually stored in the PPN6 134G.

The fourth address mapping module 234 also contains two entries or mappings, namely a first entry 234A that maps the GPPN0 334A to the PPN9 134J, and a second entry 234C that maps the GPPN3 334D to the PPN8 134I. What this means is that, during the fourth isolated session, having SID3, the code and/or data that the guest OS believes to be stored in the GPPN0 334A is actually stored in the PPN9 134J; and the code and/or data that the guest OS believes to be stored in the GPPN3 334D is actually stored in the PPN8 134I.

In the single IEE embodiment of FIG. 8, as described above, if the set of PPNs of the actual physical address space 134 to which the private address mapping module 420 maps the GPPNs of the guest physical address space 334 is mutually exclusive with the PPNs to which the guest address mapping module 220D maps the guest physical address space 334, then the memory pages that are accessible from within the VM 300D are mutually exclusive with the memory pages that are accessible from within the IEE 400. Similarly, in the multiple IEE embodiment of FIG. 12, if the different sets of PPNs to which the different address mapping modules 220E map the GPPNs are all mutually exclusive with respect to one another, then the memory pages that are accessible from within each of the IEEs will also be mutually exclusive with respect to one another.

Thus, if the set of PPNs to which the first address mapping module 231 maps the GPPNs are mutually exclusive with the PPNs to which the second address mapping module 232 maps the GPPNs, then the memory pages that are accessible from within the first isolated session having SID0 are mutually exclusive with the memory pages that are accessible from within the second isolated session having SID1; if the set of PPNs to which the first address mapping module 231 maps the GPPNs are mutually exclusive with the PPNs to which the third address mapping module 233 maps the GPPNs, then the memory pages that are accessible from within the first isolated session having SID0 are mutually exclusive with the memory pages that are accessible from within the third isolated session having SID2; if the set of PPNs to which the first address mapping module 231 maps the GPPNs are mutually exclusive with the PPNs to which the fourth address mapping module 234 maps the GPPNs, then the memory pages that are accessible from within the first isolated session having SID0 are mutually exclusive with the memory pages that are accessible from within the fourth isolated session having SID3; if the set of PPNs to which the second address mapping module 232 maps the GPPNs are mutually exclusive with the PPNs to which the third address mapping module 233 maps the GPPNs, then the memory pages that are accessible from within the second isolated session having SID1 are mutually exclusive with the memory pages that are accessible from within the third isolated session having SID2; if the set of PPNs to which the second address mapping module 232 maps the GPPNs are mutually exclusive with the PPNs to which the fourth address mapping module 234 maps the GPPNs, then the memory pages that are accessible from within the second isolated session having SID1 are mutually exclusive with the memory pages that are accessible from within the fourth isolated session having SID3; and if the set of PPNs to which the third address mapping module 233 maps the GPPNs are mutually exclusive with the PPNs to which the fourth address mapping module 234 maps the GPPNs, then the memory pages that are accessible from within the third isolated session having SID2 are mutually exclusive with the memory pages that are accessible from within the fourth isolated session having SID3.

With the address mapping modules 220E as illustrated in FIG. 13B, the different sets of PPNs to which the different address mapping modules 220E map the GPPNs are all mutually exclusive with respect to one another, except that both the first address mapping module 231 and the second address mapping module 232 map the GPPN0 334A to the PPN0 134A. Thus, the memory page PPN0 134A is a shared memory page, accessible from within both the first isolated session having SID0 and the second isolated session having SID1. Otherwise, all of the memory pages that are accessible from within each of the isolated sessions are mutually exclusive with respect to one another. More specifically, in the example of FIGS. 12, 13A and 13B, the memory pages PPN0 134A, PPN2 134C and PPN4 134E are accessible from within the first isolated session having SID0; the memory pages PPN0 134A, PPN1 134B and PPN3 134D are accessible from within the second isolated session having SID1; the memory pages PPN7 134H and PPN6 134G are accessible from within the third isolated session having SID2; and the memory pages PPN9 134J and PPN8 134I are accessible from within the fourth isolated session having SID3.

The mappings in the address mapping modules 220E may be viewed as establishing a separate private memory for each of the isolated sessions, so that the memory pages in a private memory for a particular isolated session are only accessible from within that isolated session; as well as possibly one or more shared memories, which contain memory pages that are shared between two or more isolated sessions. Thus, the address mapping modules 220E establish a first private memory for the first isolated session having SID0, including the memory pages PPN2 134C and PPN4 134E; a second private memory for the second isolated session having SID1, including the memory pages PPN1 134B and PPN3 134D; a third private memory for the third isolated session having SID2, including the memory pages PPN7 134H and PPN6 134G; a fourth private memory for the fourth isolated session having SID3, including the memory pages PPN9 134J and PPN8 134I; and a shared memory that is shared between the first isolated session having SID0 and the second isolated session having SID1, including the memory page PPN0 134A.

The entries in the shadow page tables 222E are derived from the entries in the corresponding guest OS page tables 23 and 24 and the entries in the corresponding address mapping modules 220E in the same manner as described above for the shadow page tables 223 and 224 of FIG. 7. Thus, the entries in the first shadow page table 225 are derived from the entries in the first guest OS page table 23 and the entries in the first address mapping module 231; the entries in the second shadow page table 226 are derived from the entries in the first guest OS page table 23 and the entries in the second address mapping module 232; the entries in the third shadow page table 227 are derived from the entries in the second guest OS page table 24 and the entries in the third address mapping module 233; and the entries in the fourth shadow page table 228 are derived from the entries in the second guest OS page table 24 and the entries in the address mapping module 234; all in the same manner as described above.

Thus, as shown in FIG. 13B, the first shadow page table 225 contains three mappings or PTEs mapping GVPNs to PPNs, namely, a PTE 225A that maps the GVPN0 330A to the PPN0 134A, a PTE 225B that maps the GVPN1 330B to the PPN2 134C, and a PTE 225C that maps the GVPN2 330C to the PPN4 134E. The second shadow page table 226 also contains three PTEs mapping GVPNs to PPNs, namely, a PTE 226A that maps the GVPN0 330A to the PPN0 134A, a PTE 226B that maps the GVPN1 330B to the PPN1 134B, and a PTE 226C that maps the GVPN2 330C to the PPN3 134D. The third shadow page table 227 contains two PTEs, mapping GVPNs to PPNs, namely, a PTE 227B that maps the GVPN3 332D to the PPN7 134H, and a PTE 227C that maps the GVPN2 332C to the PPN6 134G. The fourth shadow page table 228 also contains two PTEs, mapping GVPNs to PPNs, namely, a PTE 228A that maps the GVPN0 332A to the PPN9 134J, and a PTE 228C that maps the GVPN2 332C to the PPN8 134I.

All of the elements of FIG. 12 operate in substantially the same manner as corresponding elements of FIGS. 7 and 8, except as described herein. Thus, suppose that a scenario is applied to FIGS. 12, 13A and 13B that is analogous to the scenario that was applied to FIG. 7 above, so that the guest OS page tables 23 and 24 are created by the guest OS 20F of FIG. 12. In this scenario, however, as described above, the first guest virtual address space 330 is used by the first guest application 40J and the second guest application 40K, while the second guest virtual address space 332 is used by the third guest application 40L, the fourth guest application 40M and the fifth guest application 40N. The guest address mapping modules 220E and the shadow page tables 222E are created by a memory manager in the virtualization software 200E.

Now when the first guest application 40J is executed, the guest OS 20F attempts to ensure that the first guest OS page table 23 is active, but the virtualization software 200E ensures instead that the first shadow page table 225 is active, to ensure that the first isolated session having SID0 is active. If the first guest application 40J generates an attempted memory access to the GVPN0 330A, a MMU (not shown) in the physical system hardware 100E maps the virtual address to the PPN0 134A based on the PTE 225A; if the first guest application 40J generates an attempted memory access to the GVPN1 330B, the MMU maps the virtual address to the PPN2 134C based on the PTE 225B; and, if the first guest application 40J generates an attempted memory access to the GVPN2 330C, the MMU maps the virtual address to the PPN4 134E based on the PTE 225C.

When the second guest application 40K is executed, the guest OS 20F also attempts to ensure that the first guest OS page table 23 is active, but the virtualization software 200E ensures instead that the second shadow page table 226 is active, to ensure that the second isolated session having SID1 is active. If the second guest application 40K generates an attempted memory access to the GVPN0 330A, the MMU maps the virtual address to the PPN0 134A based on the PTE 226A; if the second guest application 40K generates an attempted memory access to the GVPN1 330B, the MMU maps the virtual address to the PPN1 134B based on the PTE 226B; and, if the second guest application 40K generates an attempted memory access to the GVPN2 330C, the MMU maps the virtual address to the PPN3 134D based on the PTE 226C.

When the third guest application 40L or the fourth guest application 40M is executed, the guest OS 20F attempts to ensure that the second guest OS page table 24 is active, but the virtualization software 200E ensures instead that the third shadow page table 227 is active, to ensure that the third isolated session having SID2 is active. If the third guest application 40L or the fourth guest application 40M generates an attempted memory access to the GVPN3 332D, the MMU maps the virtual address to the PPN7 134H based on the PTE 227B; and, if the third guest application 40L or the fourth guest application 40M generates an attempted memory access to the GVPN2 332C, the MMU maps the virtual address to the PPN6 134G based on the PTE 227C.

When the fifth guest application 40N is executed, the guest OS 20F also attempts to ensure that the second guest OS page table 24 is active, but the virtualization software 200E ensures instead that the fourth shadow page table 228 is active, to ensure that the fourth isolated session having SID3 is active. If the fifth guest application 40N generates an attempted memory access to the GVPN0 332A, the MMU maps the virtual address to the PPN9 134J based on the PTE 228A; and, if the fifth guest application 40N generates an attempted memory access to the GVPN2 332C, the MMU maps the virtual address to the PPN8 134I based on the PTE 228C.

Thus, more generally, when a software module executes in the first isolated session having SID0, using the first guest virtual address space 330, the virtualization software 200E activates the first shadow page table 225, so that the MMU in the system hardware 100E uses this page table for address translations; when a software module executes in the second isolated session having SID1, again using the first guest virtual address space 330, the virtualization software 200E activates the second shadow page table 226, so that the MMU in the system hardware 100E uses this page table for address translations; when a software module executes in the third isolated session having SID2, using the second guest virtual address space 332, the virtualization software 200E activates the third shadow page table 227, so that the MMU in the system hardware 100E uses this page table for address translations; and when a software module executes in the fourth isolated session having SID3, again using the second guest virtual address space 332, the virtualization software 200E activates the fourth shadow page table 228, so that the MMU in the system hardware 100E uses this page table for address translations.

Now suppose that malicious software is able to execute within the first IEE, in the first isolated session having SID0. Because the isolation barriers provided by the guest OS 20F are typically relatively weak in comparison to a virtualization barrier, the malicious software may gain full access to the guest OS page tables 23 and 24, and it may then use the guest OS page tables 23 and 24 to gain access to any memory page in the guest physical address space 334. The guest physical address space 334 constitutes the entire system memory 318E of the VM 300E, which is the only memory that is "visible" from within the VM 300E. Accordingly, the only actual physical memory that is accessible from within the VM 300E is the physical memory to which the guest physical address space 334 is mapped. Thus, in this example, the only physical memory pages that would be accessible to the malicious software, despite the malicious software having defeated the isolation barriers provided by the guest OS 20F, are the memory pages to which the guest physical address space 334 is mapped by the first address mapping module 231. As long as the virtualization software 200E is well designed and well implemented, there will be no way for any software in the first IEE to determine that there is any memory in the computer system besides the physical memory to which the guest system memory 318E is mapped during the isolated session having SID0. And yet, accessing the entire system memory 318E does not give any access to the private memory of any of the other IEEs. Similarly, if malicious software is able to execute within any of the other IEEs, the malicious software would only be able to access the physical memory pages to which the guest physical address space 334 is mapped during that particular isolated session.

Malicious software within an IEE may obtain full access to the guest virtual address spaces 330 and 332, the guest OS page tables 23 and 24, and the guest physical address space 334. However, the virtualization barriers, including the virtualization barrier 280E and the additional virtualization barriers that isolate the multiple isolated sessions from one another, prevent such malicious software from accessing or directly affecting the operation of the virtualization software 200E, the session administrator 430, the address mapping modules 220E and the shadow page tables 222E, all of which restrict access to the physical address space 134 as described above. So long as these virtualization barriers are able to protect these software modules and data structures, the private memory of each of the IEEs will be effectively isolated from software modules in all of the other IEEs.

Also, although the multiple IEE embodiment illustrated in FIGS. 12, 13A and 13B involves the use of specific data structures and software modules to maintain the data needed to isolate the private memory of the multiple IEEs, other data structures and software modules could be used in other embodiments.

A method was described above for dividing the physical disk(s) 121 of FIG. 8 into a first set of data blocks constituting the VM storage 121A, a second set of data blocks constituting the private storage 121B, a third set of data blocks constituting the shared storage 121C, and possibly other sets of data blocks that are used for other purposes. The virtualization software 200E may use substantially the same method for dividing the physical disk 120E into different sets of data blocks, some of which provide private storage for each of the isolated sessions, others of which may be shared between multiple isolated sessions, and some of which may be used for other purposes. This method may be performed, in particular, by the disk emulator 254E, which may be substantially the same as the disk emulator 254D of FIG. 8, except as required to maintain private and shared storage for the multiple IEEs.

The device emulator 254E may use a plurality of disk block mapping data structures, with one mapping data structure for each IEE, each of which may be substantially the same as the guest mapping data structure 255 of FIG. 10, so that each mapping data structure contains mappings from virtual block numbers to physical block numbers for a different IEE. Thus, a first mapping data structure may be used for the first isolated session having SID0 that maps the virtual block numbers of the virtual disk 320E to the physical data blocks in the physical disk 120E that contain the code and/or data of the first IEE, a second mapping data structure may be used for the second isolated session having SID1 that maps the virtual block numbers of the virtual disk 320E to the physical data blocks in the physical disk 120E that contain the code and/or data of the second IEE, a third mapping data structure may be used for the third isolated session having SID2 that maps the virtual block numbers of the virtual disk 320E to the physical data blocks in the physical disk 120E that contain the code and/or data of the third IEE, and a fourth mapping data structure may be used for the fourth isolated session having SID3 that maps the virtual block numbers of the virtual disk 320E to the physical data blocks in the physical disk 120E that contain the code and/or data of the fourth IEE. The sets of physical data blocks to which each of the four mapping data structures map the virtual block numbers are generally mutually exclusive to ensure that the private storage for the different isolated sessions are generally mutually exclusive. The disk emulator 254E then uses the first mapping data structure during SID0, the second mapping data structure during SID1, the third mapping data structure during SID2, and the fourth mapping data structure during SID3 to isolate the code and data of each IEE, stored in the physical disk 120E, from software modules within each of the other IEEs.

Many of the same issues that arose in the single IEE embodiment also arise in this multiple IEE embodiment. The methods used to resolve these issues in the single IEE embodiment may generally be extended by a person of skill in the art to resolve the same issues in the multiple IEE embodiment. The vast technical literature in the field of computer science may also be consulted for descriptions and explanations of a wide variety of methods and configurations that may be used to address these issues, or similar, analogous issues, to implement the multiple IEE embodiment in a wide variety of hardware and software implementations. Different techniques may be appropriate in different embodiments of the invention, depending on the particular hardware and software configurations and the relative importance that is placed on a variety of factors, including the degree of security desired and the amount and nature of communication and interaction that is desired between the multiple IEEs.

One particular issue that should be addressed for the multiple IEE embodiment, however, is how to handle the guest OS 20F relative to the multiple IEEs. When an application is running on an OS, the OS must typically access some of the data of the application in various circumstances, such as in response to a system call by the application. Thus, to provide support to the applications, the guest OS 20F must generally have some sort of access to data belonging to each of the IEEs in the VM 300E. However, if the guest OS 20F is simply given access to data in each of the IEEs, then all of the IEEs are vulnerable again to attacks from malicious software. Malicious software could infiltrate the guest OS 20F to gain access to data in any of the IEEs. Therefore, the guest OS 20F is preferably given only limited access to private data belonging to each of the IEEs in the VM 300E, with the access restricted in some manner, that protects against misuse of the private data. Depending on the particular implementation involved, a variety of approaches may be used. One such approach is illustrated in FIG. 14, and another such approach is illustrated in FIG. 15.

Figure 14:
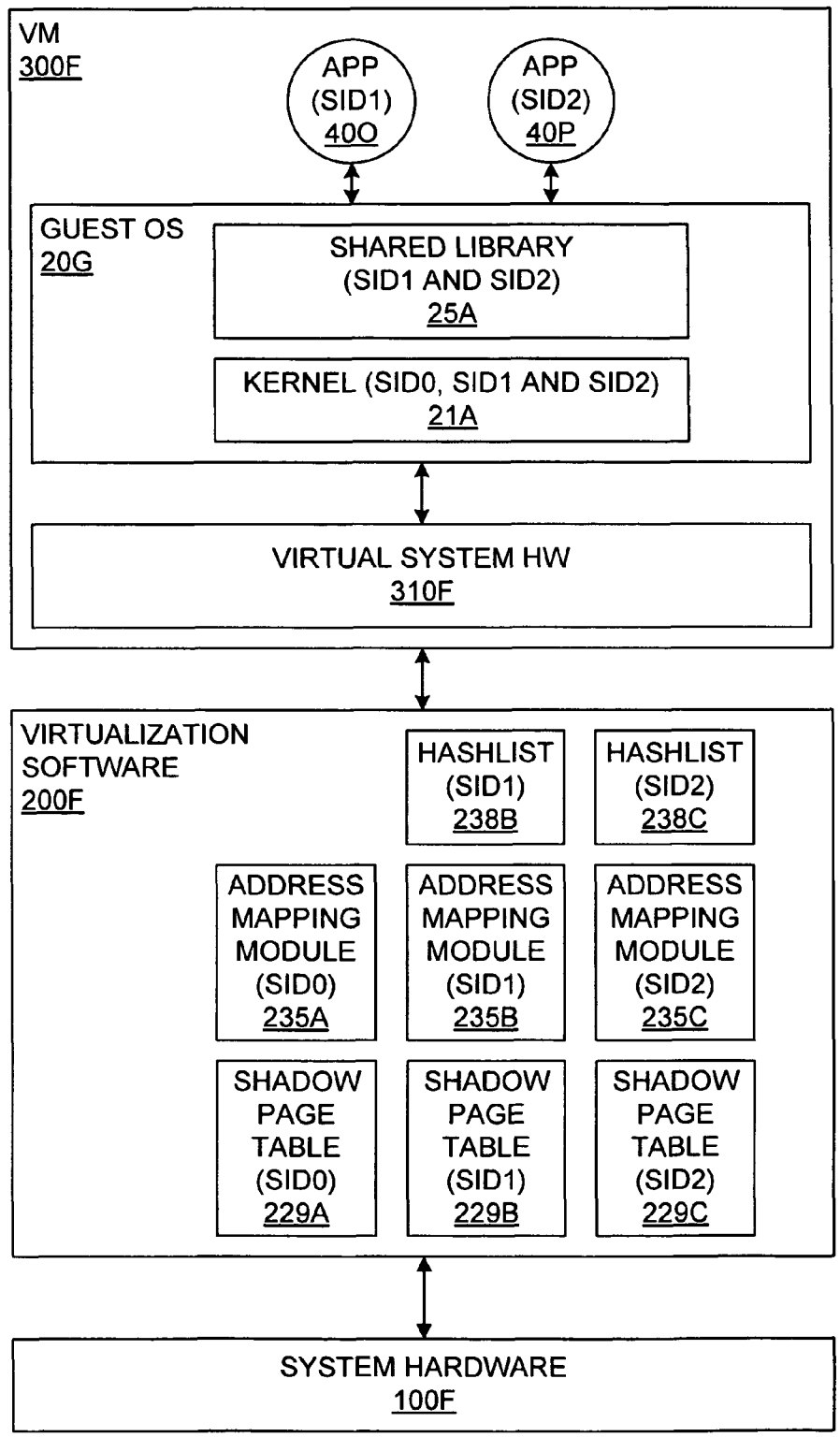
FIG. 14 illustrates a first specific implementation of the embodiment of FIG. 12, in which a guest OS is given restricted access to private data within the multiple isolated execution environments using a first method.
Figure 15:
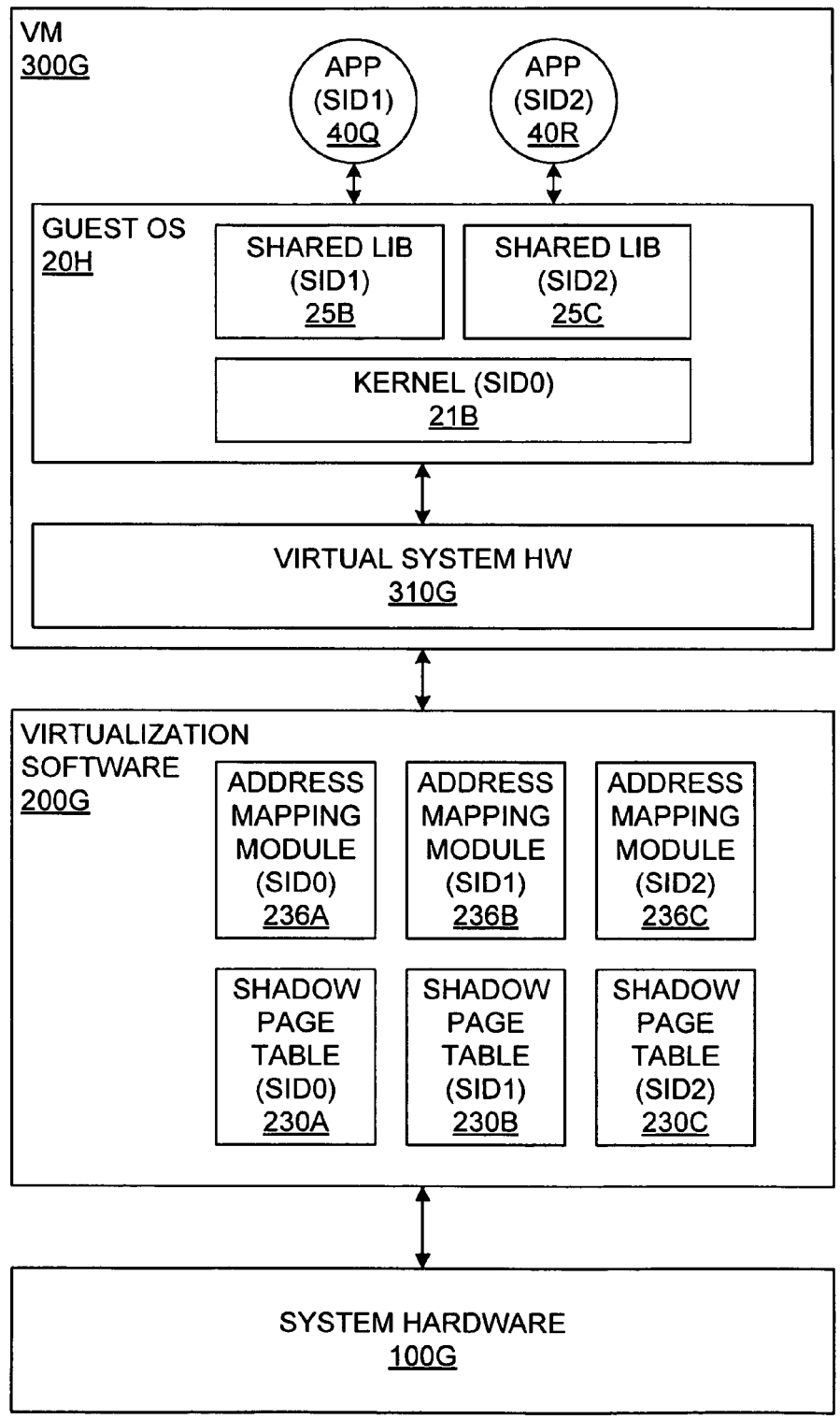
FIG. 15 illustrates a second specific implementation of the embodiment of FIG. 12, in which a guest OS is given restricted access to private data within the multiple isolated execution environments using a second method.

FIG. 14 shows a system hardware 100F that may be substantially the same as the system hardware 100E of FIG. 12. FIG. 14 also shows virtualization software 200F, which, except as described below, may be substantially the same as the virtualization software 200E of FIG. 12. FIG. 14 also shows a VM 300F, which includes a virtual system hardware 310F, a guest OS 200, and a plurality of applications, such as a first application 40O and a second application 40P. The VM 300F may be substantially the same as the VM 300E of FIG. 12; the virtual system hardware 310F may be substantially the same as the virtual system hardware 310E of FIG. 12; the guest OS 20G may be substantially the same as the guest OS 20F of FIG. 12; and the applications 40O and 40P may be substantially the same as the applications shown in FIG. 12.

The virtual computer system of FIG. 14 may also have additional components that are substantially the same as corresponding components of FIG. 12, so that, except as described below, the virtual computer system illustrated in FIG. 14 is substantially the same as the virtual computer system illustrated in FIG. 12. For example, the virtual computer system may include a system memory, such as the system memory 118E of FIG. 12; a physical disk, such as the physical disk 120E of FIG. 12; a virtual system memory, such as the virtual system memory 318E of FIG. 12, a virtual disk, such as the virtual disk 320E of FIG. 12; a session administrator, such as the session administrator 430 of FIG. 12; a set of address mapping modules, such as the address mapping modules 220E of FIG. 12; a set of shadow page tables, such as the shadow page tables 222E of FIG. 12; a disk emulator, such as the disk emulator 254E of FIG. 12; a set of guest OS page tables, such as the guest OS page tables 22F of FIG. 12; and a file manager, such as the file manager 28F of FIG. 12; although these components are not illustrated in FIG. 14 for simplicity.

As shown in FIG. 14, the virtualization software 200F maintains at least three address mapping modules, including a first address mapping module 235A, a second address mapping module 235B and a third address mapping module 235C, and at least three corresponding shadow page tables, including a first shadow page table 229A, a second shadow page table 229B and a third shadow page table 229C. In the same manner as described above, each of the address mapping modules 235A, 235B and 235C separately maps the guest physical address space into the actual physical address space. Through these mappings, the first address mapping module 235A specifies which physical memory pages are accessible from within a first IEE during a first isolated session having SID0, the second address mapping module 235B specifies which physical memory pages are accessible from within a second IEE during a second isolated session having SID1, and the third address mapping module 235C specifies which physical memory pages are accessible from within a third IEE during a third isolated session having SID2. The three sets of physical memory pages to which the respective address mapping modules 235A, 235B and 235C map the guest physical address space are generally mutually exclusive from one another, so that each address mapping module generally defines a private memory for the respective isolated session, with each private memory including physical memory pages that are only accessible from within the respective isolated session. Thus, the first address mapping module 235A defines a first private memory for the first isolated session having SID0 that is only accessible from within the first isolated session, the second address mapping module 235B defines a second private memory for the second isolated session having SID1 that is only accessible from within the second isolated session, and the third address mapping module 235C defines a third private memory for the third isolated session having SID2 that is only accessible from within the third isolated session. The address mapping modules 235A, 235B and 235C may also jointly specify physical memory pages that are shared between multiple isolated sessions, but, for simplicity, this description assumes that there are no such shared memory pages, except for a shared library, as described below.

The mappings in the first shadow page table 229A are derived from the mappings in the first address mapping module 235A and the mappings in a guest OS page table; the mappings in the second shadow page table 229B are derived from the mappings in the second address mapping module 235B and the mappings in a guest OS page table; and the mappings in the third shadow page table 229C are derived from the mappings in the third address mapping module 235C and the mappings in a guest OS page table; all in the same manner as described above. As described above, the first shadow page table 229A is active during the first isolated session having SID0, the second shadow page table 229B is active during the second isolated session having SID1, and the third shadow page table 229C is active during the third isolated session having SID2. As shown in FIG. 14, the first application 40O executes in the second IEE during the second isolated session having SID1 and the second application 40P executes in the third IEE during the third isolated session having SID2.

A person of skill in the art may devise a variety of techniques for ensuring that the desired shadow page table is active whenever a given isolated session is active, such as ensuring that the second shadow page table 229B is active whenever the first application 40O is executing and ensuring that the third shadow page table 229C is active whenever the second application 40P is executing. The particular technique used for any given implementation may depend on a variety of factors. One such technique that may be used is to switch shadow page tables in response to the guest OS attempting to switch guest OS page tables. In many OSs, such as in Windows and Linux OSs, a separate virtual address space is typically defined for each application running on the OS, with each application having its own page table. Whenever the OS switches from the execution of a first application to the execution of a second application, the OS switches page tables from that of the first application to that of the second application. Although having a separate page table and virtual address space for each application running on an OS is a common practice, this practice differs from the example illustrated in FIGS. 12, 13A and 13B, because in that example, multiple applications share the same guest OS page table and virtual address space. The example of FIGS. 12, 13A and 13B is intended to show more of the possibilities for implementing the invention.

Assume, however, that for the virtual computer system illustrated in FIG. 14, each guest application has a separate guest OS page table and a separate virtual address space. Thus, the guest OS 20G creates and maintains a first guest OS page table for the first application 40O, defining a first virtual address space; and a second guest OS page table for the second application 40P, defining a second virtual address space. Now, when the guest OS 20G is going to execute the first application 40O, the guest OS attempts to ensure that the first guest OS page table is active; and, when the guest OS is going to execute the second application 40P, the guest OS attempts to ensure that the second guest OS page table is active. The virtualization software 200F detects any attempt to change which guest OS page table is active and the virtualization software activates the corresponding shadow page table. Thus, if the guest OS 20G attempts to activate the first guest OS page table before allowing the first application 40O to execute, the virtualization software 200F detects this attempted activation and instead activates the second shadow page table 229B; and if the guest OS 20G attempts to activate the second guest OS page table before allowing the second application 40P to execute, the virtualization software 200F detects this attempted activation and instead activates the third shadow page table 229C. In an x86 system, for example, the virtualization software 200F detects an attempt by the guest OS 20G to write to control register 3 (CR3) to specify a different guest OS page table. The virtualization software 200F then writes to the physical CR3 to specify the corresponding shadow page table, and updates a virtual CR3 to reflect the attempted write by the guest OS 20G. In other computer systems that use Address Space Idenfitiers (ASIDs), these ASIDs may be tracked and monitored to determine which isolated session is currently active.

As shown in FIG. 14, the guest OS 20G includes a conventional kernel 21A and a conventional shared library 25A. In this specific implementation of the multiple IEE embodiment, when the guest OS 20G executes on behalf of an application, such as in response to a system call or when handling a hardware interrupt on behalf of the application, the guest OS 20G executes in the same IEE as the application. Thus, for example, if the first application 40O calls a routine from the shared library 25A, the called routine executes in the isolated session having SID1, with the second shadow page table 229B active; while, if the second application 40P calls a routine from the shared library 25A, the called routine executes in the isolated session having SID2, with the third shadow page table 229C active. Similarly, if the kernel 21A executes on behalf of the first application 40O, the kernel executes in the isolated session having SID1, with the second shadow page table 229B active; while, if the kernel 21A executes on behalf of the second application 40P, the kernel executes in the isolated session having SID2, with the third shadow page table 229C active. When the kernel 21A executes, and it's not on behalf of a specific application, the kernel executes in the isolated session having SID0, with the first shadow page table 229A active.

Now, as mentioned above, if the kernel 21A or the shared library 25A is infiltrated by malicious software, then this malicious software can gain access to the private memory of the applications 40O and 40P while the kernel or shared library is executing in the respective isolated session SID1 or SID2. Therefore, some restriction is preferably imposed on the execution of the guest OS 20G to reduce the risk that malicious software can gain access to the private memory of the applications 40O and 40P. The restriction that is imposed may depend on the particular implementation of the invention, and on various other factors, such as the importance of maintaining the security of the private memories of the applications and the importance of allowing the guest OS to execute efficiently.

One restriction that may be imposed is represented in FIG. 14 by a first hashlist 238B and a second hashlist 238C. The first hashlist 238B is used during the isolated session having SID1 and the second hashlist 238C is used during the isolated session having SID2. The first hashlist 238B contains expected hash values for all routines in the kernel 21A and the shared library 25A that are expected to be executed during the isolated session having SID1, and the second hashlist 238C contains expected hash values for all routines in the kernel 21A and the shared library 25A that are expected to be executed during the isolated session having SID2. Before executing any routine from the kernel 21A or the shared library 25A during the isolated session having SID1, corresponding hash value(s) for the routine are computed and compared against the expected hash value(s) for the routines from the hashlist 238B; while before executing any routine from the kernel 21A or the shared library 25A during the isolated session having SID2, corresponding hash value(s) for the routine are computed and compared against the expected hash value(s) for the routines from the hashlist 238C. Such a technique is disclosed in U.S. patent application Ser. No. 10/791,602 (Waldspurger et al., "Dynamic Verification Of Validity Of Executable Code", "the '602 application"), which has been assigned to the same assignee as this patent, and which is hereby incorporated herein by reference. If the hash value(s) for a routine compare favorably with the expected hash value(s) for the routine, then it is generally safe to assume that the routine has not been adversely affected by malicious software, and the routine may be executed in the respective isolated session, giving the routine access to the private memory of the isolated session. Other techniques for verifying the integrity of routines prior to execution are also disclosed in the '602 application, and these other techniques may also be used in other embodiments of this invention.

Although this description related to FIG. 14 is limited to isolating the private memories of the different isolated sessions from one another, the same approach may be used to isolate the private disk storage of the different isolated sessions from one another. Based on this description related to FIG. 14, a person of skill in the art will be able to apply the same approach to isolated private disk storage for the isolated sessions.

FIG. 15 shows a system hardware 100G that may be substantially the same as the system hardware 100E of FIG. 12. FIG. 15 also shows virtualization software 200G, which, except as described below, may be substantially the same as the virtualization software 200E of FIG. 12. FIG. 15 also shows a VM 300G, which includes a virtual system hardware 310G, a guest OS 20H, and a plurality of applications, such as a first application 40Q and a second application 40R. The VM 300G may be substantially the same as the VM 300E of FIG. 12; the virtual system hardware 310G may be substantially the same as the virtual system hardware 310E of FIG. 12; the guest OS 20H may be substantially the same as the guest OS 20F of FIG. 12; and the applications 40Q and 40R may be substantially the same as the applications shown in FIG. 12.

The virtual computer system of FIG. 15 may also have additional components that are substantially the same as corresponding components of FIG. 12, so that, except as described below, the virtual computer system illustrated in FIG. 15 is substantially the same as the virtual computer system illustrated in FIG. 12. For example, the virtual computer system may include a system memory, such as the system memory 118E of FIG. 12; a physical disk, such as the physical disk 120E of FIG. 12; a virtual system memory, such as the virtual system memory 318E of FIG. 12, a virtual disk, such as the virtual disk 320E of FIG. 12; a session administrator, such as the session administrator 430 of FIG. 12; a set of address mapping modules, such as the address mapping modules 220E of FIG. 12; a set of shadow page tables, such as the shadow page tables 222E of FIG. 12; a disk emulator, such as the disk emulator 254E of FIG. 12; a set of guest OS page tables, such as the guest OS page tables 22F of FIG. 12; and a file manager, such as the file manager 28F of FIG. 12; although these components are not illustrated in FIG. 15 for simplicity.

As shown in FIG. 15, the virtualization software 200G maintains at least three address mapping modules, including a first address mapping module 236A, a second address mapping module 236B and a third address mapping module 236C, and at least three corresponding shadow page tables, including a first shadow page table 230A, a second shadow page table 230B and a third shadow page table 230C. In the same manner as described above, each of the address mapping modules 236A, 236B and 236C separately maps the guest physical address space into the actual physical address space. Through these mappings, the first address mapping module 236A specifies which physical memory pages are accessible from within a first IEE during a first isolated session having SID0, the second address mapping module 236B specifies which physical memory pages are accessible from within a second IEE during a second isolated session having SID1, and the third address mapping module 236C specifies which physical memory pages are accessible from within a third IEE during a third isolated session having SID2. The three sets of physical memory pages to which the respective address mapping modules 236A, 236B and 236C map the guest physical address space are generally mutually exclusive from one another, so that each address mapping module generally defines a private memory for the respective isolated session, with each private memory including physical memory pages that are only accessible from within the respective isolated session. Thus, the first address mapping module 236A defines a first private memory for the first isolated session having SID0 that is only accessible from within the first isolated session, the second address mapping module 236B defines a second private memory for the second isolated session having SID1 that is only accessible from within the second isolated session, and the third address mapping module 236C defines a third private memory for the third isolated session having SID2 that is only accessible from within the third isolated session. The address mapping modules 236A, 236B and 236C may also jointly specify physical memory pages that are shared between multiple isolated sessions, but, for simplicity, this description assumes that there are no such shared memory pages.

The mappings in the first shadow page table 230A are derived from the mappings in the first address mapping module 236A and the mappings in a guest OS page table; the mappings in the second shadow page table 230B are derived from the mappings in the second address mapping module 236B and the mappings in a guest OS page table; and the mappings in the third shadow page table 230C are derived from the mappings in the third address mapping module 236C and the mappings in a guest OS page table; all in the same manner as described above. As described above, the first shadow page table 230A is active during the first isolated session having SID0, the second shadow page table 230B is active during the second isolated session having SID1, and the third shadow page table 230C is active during the third isolated session having SID2. As shown in FIG. 15, the first application 40Q executes in the second IEE during the second isolated session having SID1 and the second application 40R executes in the third IEE during the third isolated session having SID2.

As described above, a person of skill in the art may devise a variety of techniques for ensuring that the desired shadow page table is active whenever a given isolated session is active, such as ensuring that the second shadow page table 230B is active whenever the first application 40Q is executing and ensuring that the third shadow page table 230C is active whenever the second application 40R is executing. The particular technique used for any given implementation may depend on a variety of factors. A second such technique that may be used is to monitor the code that is being executed and determine when the code that is to be executed next is in a different isolated session from the code that has just been executed, and switching to an appropriate isolated session for the code that is to be executed next. For example, code that is about to be executed may be run through a hash algorithm, and the results may be compared with known hash values for code in the different isolated sessions.

As shown in FIG. 15, the guest OS 20H includes a conventional kernel 21B, a first conventional shared library 25B and a second conventional shared library 25C. In this specific implementation of the multiple IEE embodiment, the kernel 21B always executes in the isolated session having SID0, with the first shadow page table 230A active. Also, each isolated session, other than the isolated session having SID0, has its own shared library. Thus, the first shared library 25B is associated with the application 40Q and executes in the second isolated session having SID1, while the second shared library 25C is associated with the application 40R and executes in the third isolated session having SID2. Thus, when the virtualization software 200G determines that code belonging to the kernel 21B is to execute, the virtualization software 200G ensures that the first shadow page table 230A is active; when the virtualization software 200G determines that code belonging to either the application 40Q or the shared library 25B is to execute, the virtualization software 200G ensures that the second shadow page table 230B is active; and when the virtualization software 200G determines that code belonging to either the application 40R or the shared library 25C is to execute, the virtualization software 200G ensures that the third shadow page table 230C is active. In this specific embodiment, there is no need to verify the integrity of the shared libraries 25B and 25C because each shared library is specific to its own isolated session. There is also no need to verify the integrity of the kernel 21B because the kernel executes in its own isolated session. However, any time the kernel 21B is executing, and there is a reference to memory that belongs to an isolated session other than the first isolated session having SID0, a fault will occur. The virtualization software 200G can handle such faults and virtualize the execution of the kernel code, while protecting the memory of the other isolated sessions.

Although this description related to FIG. 15 is limited to isolating the private memories of the different isolated sessions from one another, the same approach may be used to isolate the private disk storage of the different isolated sessions from one another. Based on this description related to FIG. 15, a person of skill in the art will be able to apply the same approach to isolated private disk storage for the isolated sessions.

What is claimed is:

1. A computer system comprising:
   system hardware, the system hardware including a system memory containing a plurality of memory locations;
   virtualization software supporting a virtual machine (VM), the virtualization software making a portion of the system memory available for access as guest physical memory within the VM, the guest physical memory of the VM being located by guest physical addresses; and
   guest software executing within the VM, the guest software including a guest operating system, a first software entity and a second software entity,
   wherein:
   the first software entity and the second software entity use guest virtual addresses to access the guest physical memory, and the guest operating system provides first guest address mappings to map the guest virtual addresses used by the first software entity, including a first guest virtual address, to the guest physical addresses and second guest address mappings to map the guest virtual addresses used by the second software entity, including a second guest virtual address, to the guest physical addresses, the first guest virtual address and the second guest virtual address being mapped in common to a first guest physical address;
   the virtualization software activates hardware address mappings that are used to map attempted memory accesses to actual physical addresses in the system memory, the attempted memory accesses resulting from the execution of the guest software and being directed to guest physical addresses within the VM according to the first and second guest address mappings provided by the guest operating system;
   the virtualization software activates a first set of hardware address mappings when the first software entity executes within the VM;
   the virtualization software activates a second set of hardware address mappings when the second software entity executes within the VM; and
   the first set of hardware address mappings map attempted memory accesses directed to the first guest physical address to a first actual physical address, while the second set of hardware address mappings map attempted memory accesses directed to the first guest physical address to a second actual physical address, where the second actual physical address is different from the first actual physical address, so that attempted memory accesses directed to the first guest physical address are mapped to the first actual physical address when the first software entity is executing and to the second actual physical address when the second software entity is executing.

2. The computer system of claim 1, wherein the system hardware further comprises a physical secondary storage and the VM comprises a virtual secondary storage, and wherein an attempted access to a first location of the virtual secondary storage is mapped to a second location of the physical secondary storage when the first software entity executes within the VM and an attempted access to the first location of the virtual secondary storage is mapped to a third location of the physical secondary storage when the second software entity executes within the VM, where the third a location of the physical secondary storage is different from the second location of the physical secondary storage.

3. The computer system of claim 1, wherein the first and second guest address mappings map third and fourth guest virtual addresses used respectively by the first and second software entities in common to a second guest physical address, and the first set of hardware address mappings and the second set of hardware address mappings each map attempted memory accesses directed to the second guest physical address to a third actual physical address, so that both the first software entity and the second software entity may access the third actual physical address by directing attempted memory accesses to the second guest physical address.

4. The computer system of claim 1, wherein there is a first virtualization barrier between the VM, on a first side of the first virtualization barrier, and the virtualization software and the first and second sets of hardware address mappings, on a second side of the first virtualization barrier.

5. The computer system of claim 4, wherein there is a second virtualization barrier between the first software entity, on a first side of the second virtualization barrier, and the second software entity, on a second side of the second virtualization barrier.

6. The computer system of claim 1, wherein the hardware address mappings in both the first set of hardware address mappings and the second set of hardware address mappings are shadow address mappings.

7. The computer system of claim 6, wherein the first set of hardware address mappings is contained in a first shadow page table, the second set of hardware address mappings is contained in a second shadow page table, activating the first set of hardware address mappings comprises activating the first shadow page table, and activating the second set of hardware address mappings comprises activating the second shadow page table.

8. The computer system of claim 6, wherein the first set of hardware address mappings is derived from the first guest address mappings and a first set of virtualization address mappings, the second set of hardware address mappings is derived from the second guest address mappings and a second set of virtualization address mappings, and wherein the first set of virtualization address mappings maps the first guest physical address to the first actual physical address and the second set of virtualization address mappings maps the first guest physical address to the second actual physical address.

9. The computer system of claim 8, wherein the first set of virtualization address mappings is contained in a first address mapping module and the second set of virtualization address mappings is contained in a second address mapping module.

10. The computer system of claim 1, wherein the hardware address mappings in both the first set of hardware address mappings and the second set of hardware address mappings are virtualization address mappings.

11. The computer system of claim 10, wherein the first set of hardware address mappings is contained in a first nested page table, the second set of hardware address mappings is contained in a second nested page table, activating the first set of hardware address mappings comprises activating the first nested page table, and activating the second set of hardware address mappings comprises activating the second nested page table.

12. The computer system of claim 1, wherein the virtualization software determines whether the first software entity is executing and whether the second software entity is executing by monitoring attempts to activate different page tables.

13. The computer system of claim 1, wherein the virtualization software determines whether the first software entity is executing and whether the second software entity is executing by monitoring use of address space identifiers.

14. The computer system of claim 1, wherein the virtualization software determines whether the first software entity is executing and whether the second software entity is executing by monitoring code that is being executed.

15. The computer system of claim 1, further comprising an application stub and a bridge, where the stub executes within the VM to facilitate operation of the first software entity, where the bridge enables communications between the stub and the virtualization software and between the first software entity and the virtualization software, and where the communications between the first software entity and the virtualization software takes place through a secure application programming interface.

16. In a computer system comprising system hardware that includes a system memory containing a plurality of memory locations, virtualization software supporting a virtual machine (VM), the virtualization software making a portion of the system memory available for access as guest physical memory within the VM, the guest physical memory of the VM being located by guest physical addresses, and guest software executing within the VM, the guest software including a guest operating system, a first software entity and a second software entity, wherein the first software entity and the second software entity use guest virtual addresses to access the guest physical memory, and the guest operating system provides first guest address mappings to map the guest virtual addresses used by the first software entity, including a first guest virtual address, to the guest physical addresses and second guest address mappings to map the guest virtual addresses used by the second software entity, including a second guest virtual address, to the guest physical addresses, the first guest virtual address and the second guest virtual address being mapped in common to a first guest physical address, a method for inhibiting access to a first set of data by the second software entity, where the first set of data is stored in the system memory and where the first set of data is used by the first software entity, the method comprising:

activating by the virtualization software, hardware address mappings that are used to map attempted memory accesses to actual physical addresses in the system memory, the attempted memory accesses resulting from the execution of the guest software and being directed to guest physical addresses within the VM according to the first and second guest address mappings provided by the guest operating system, wherein the virtualization software activates a first set of hardware address mappings when the first software entity executes within the VM, and a second set of hardware address mappings when the second software entity executes within the VM; and mapping attempted memory accesses directed to the first guest physical address to a first actual physical address when the virtualization software activates the first set of hardware address mappings, and mapping attempted memory accesses directed to the first guest physical address to a second actual physical address when the virtualization software activates the second set of hardware address mappings, where the second actual physical address is different from the first actual physical address, so that attempted memory accesses directed to the first guest physical address are mapped to the first actual physical address when the first software entity is executing and to the second actual physical address when the second software entity is executing.

17. The method of claim 16, wherein the system hardware further comprises a physical secondary storage and the VM comprises a virtual secondary storage, and wherein an attempted access to a first location of the virtual secondary storage is mapped to a second location of the physical secondary storage when the first software entity executes within the VM and an attempted access to the first location of the virtual secondary storage is mapped to a third location of the physical secondary storage when the second software entity executes within the VM, where the third a location of the physical secondary storage is different from the second location of the physical secondary storage.

18. The method of claim 16, wherein the first and second guest address mappings map third and fourth guest virtual addresses used respectively by the first and second software entities in common to a second guest physical address, and the first set of hardware address mappings and the second set of hardware address mappings each map attempted memory accesses directed to the second guest physical address to a third actual physical address, so that both the first software entity and the second software entity may access the third actual physical address by directing attempted memory accesses to the second guest physical address.

19. A computer program product embodied in a non-transitory computer readable storage medium, the computer program product containing instructions executable in a computer system comprising system hardware that includes a system memory containing a plurality of memory locations, virtualization software supporting a virtual machine (VM), the virtualization software making a portion of the system memory available for access as guest physical memory within the VM, the guest physical memory of the VM being located by guest physical addresses, and guest software executing within the VM, the guest software including a guest operating system, a first software entity and a second software entity, wherein the first software entity and the second software entity use guest virtual addresses to access the guest physical memory, and the guest operating system provides first guest address mappings to map the guest virtual addresses used by the first software entity, including a first guest virtual address, to the guest physical addresses and second guest address mappings to map the guest virtual addresses used by the second software entity, including a second guest virtual address, to the guest physical addresses, the first guest virtual address and the second guest virtual address being mapped in common to a first guest physical address, the computer program product performing a method of inhibiting access to a first set of data by the second software entity, where the first set of data is stored in the system memory and where the first set of data is used by the first software entity, the method comprising:

activating by the virtualization software, hardware address mappings that are used to map attempted memory accesses to actual physical addresses in the system memory, the attempted memory accesses resulting from the execution of the guest software and being directed to guest physical addresses within the VM according to the first and second guest address mappings provided by the guest operating system, wherein the virtualization software activates a first set of hardware address mappings when the first software entity executes within the VM, and a second set of hardware address mappings when the second software entity executes within the VM; and mapping attempted memory accesses directed to the first guest physical address to a first actual physical address when the virtualization software activates the first set of hardware address mappings, and mapping attempted memory accesses directed to the first guest physical address to a second actual physical address when the virtualization software activates the second set of hardware address mappings, where the second actual physical address is different from the first actual physical address, so that attempted memory accesses directed to the first guest physical address are mapped to the first actual physical address when the first software entity is executing and to the second actual physical address when the second software entity is executing.

20. The computer program product of claim 19, wherein the first and second guest address mappings map third and fourth guest virtual addresses used respectively by the first and second software entities in common to a second guest physical address, and the first set of hardware address mappings and the second set of hardware address mappings each map attempted memory accesses directed to the second guest physical address to a third actual physical address, so that both the first software entity and the second software entity may access the third actual physical address by directing attempted memory accesses to the second guest physical address.

* * * * *